US010669653B2

(12) United States Patent
Kremeyer

(10) Patent No.: US 10,669,653 B2
(45) Date of Patent: Jun. 2, 2020

(54) DIRECTED ENERGY DEPOSITION TO FACILITATE HIGH SPEED APPLICATIONS

(71) Applicant: Kevin Kremeyer, Kamuela, HI (US)

(72) Inventor: Kevin Kremeyer, Kamuela, HI (US)

(*) Notice: Subject to any disclaimer, the term of this patent is extended or adjusted under 35 U.S.C. 154(b) by 40 days.

(21) Appl. No.: 15/737,713

(22) PCT Filed: Jun. 20, 2016

(86) PCT No.: PCT/US2016/038421
§ 371 (c)(1),
(2) Date: Dec. 18, 2017

(87) PCT Pub. No.: WO2016/205816
PCT Pub. Date: Dec. 22, 2016

(65) Prior Publication Data
US 2019/0003086 A1    Jan. 3, 2019

Related U.S. Application Data

(63) Continuation-in-part of application No. PCT/US2016/038239, filed on Jun. 17, 2016, and a
(Continued)

(51) Int. Cl.
*D03D 47/30* (2006.01)
*D03D 47/27* (2006.01)
(Continued)

(52) U.S. Cl.
CPC ....... *D03D 47/278* (2013.01); *D03D 47/3033* (2013.01); *D03D 47/3066* (2013.01);
(Continued)

(58) Field of Classification Search
CPC .. B65H 2701/31; B65H 9/22; B65H 2555/13; B65H 59/24; B65H 59/26;
(Continued)

(56) References Cited

U.S. PATENT DOCUMENTS 2,202,323 A  *  5/1940  Sullivan ................ B65H 59/32
                                                139/370.2
2,888,216 A  *  5/1959  Simons, Jr. ........... B65H 59/22
                                                188/65.1
(Continued)

FOREIGN PATENT DOCUMENTS

WO   WO 2006/134050   12/2006

OTHER PUBLICATIONS

Department of the Navy, U.S. Naval Research Laboratory, Correspondence dated Mar. 1, 2011 regarding patentability of U.S. Appl. No. 12/289,261 over U.S. Pat. No. 7,260,023 to Jones et al.
(Continued)

*Primary Examiner* — Robert H Muromoto, Jr.
(74) *Attorney, Agent, or Firm* — Jones Day

(57) ABSTRACT

The present invention relates to methods, apparatuses, and systems for controlling the density of a fluid near a functional object in order to improve one or more relevant performance metrics. In certain embodiments, the present invention relates to forming a low density region near the object utilizing a directed energy deposition device to deposit energy along one or more paths in the fluid. In certain embodiments, the present invention relates to synchronizing energy deposition with one or more parameters impacting the functional performance of the object.

20 Claims, 22 Drawing Sheets

Figure 1A:
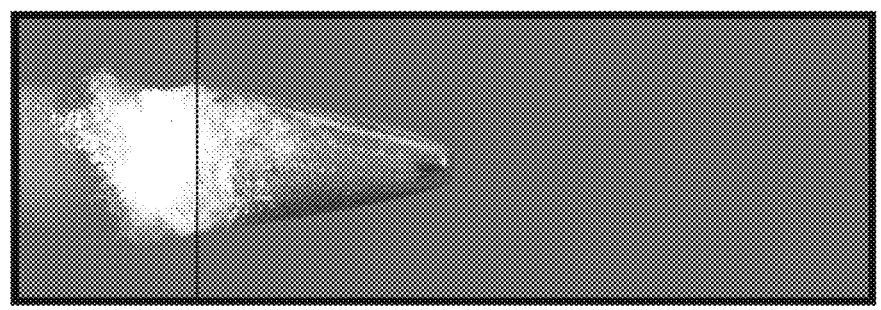

Related U.S. Application Data continuation-in-part of application No. 15/186,337, filed on Jun. 17, 2016.

(60) Provisional application No. 62/181,625, filed on Jun. 18, 2015.

(51) Int. Cl.

| | |
|---|---|
| *F42B 10/42* | (2006.01) |
| *F42B 10/38* | (2006.01) |
| *F42B 10/46* | (2006.01) |
| *F41A 13/04* | (2006.01) |
| *F41H 7/04* | (2006.01) |
| *D03D 49/00* | (2006.01) |
| *F41H 5/007* | (2006.01) |
| *F02K 7/02* | (2006.01) |
| *B64C 30/00* | (2006.01) |

(52) U.S. Cl.
CPC .............. *F41A 13/04* (2013.01); *F41H 7/042* (2013.01); *F42B 10/38* (2013.01); *F42B 10/42* (2013.01); *F42B 10/46* (2013.01); *B64C 30/00* (2013.01); *F02K 7/02* (2013.01); *F41H 5/007* (2013.01)

(58) Field of Classification Search
CPC ............ B65H 2555/23; B65H 2515/31; B65H 2515/34; B65H 59/40; D03D 47/34; D03D 47/00; D03D 47/306; D03D 47/364; D03D 51/34; D03D 47/302; D03D 47/3033; D03D 47/308; D03D 2700/1413; D03D 2700/1436; D03D 2700/1445; D03D 2700/1454; D03D 2700/1495; D03D 2700/31; D03D 47/3013; D03D 47/3053; D03D 47/362; D03D 47/368; D03D 49/04; D03D 49/12; D03D 49/60; D03D 49/68; D03D 47/28; D03D 47/30; D03D 47/347; D03D 49/42
See application file for complete search history.

(56) References Cited

U.S. PATENT DOCUMENTS

| | | | |
|---|---|---|---|
| 3,392,368 A | 7/1968 | Brewer et al. | |
| 3,404,403 A | 10/1968 | Vallese et al. | |
| 3,408,832 A * | 11/1968 | Renpei ................... | B65H 59/30 112/254 |
| 3,483,881 A | 12/1969 | Pike et al. | |
| 3,620,484 A | 11/1971 | Schoppe | |
| 3,633,711 A * | 1/1972 | Pfarrwaller ............ | B65H 59/22 139/450 |
| 3,709,446 A | 1/1973 | Espy | |
| 3,719,829 A * | 3/1973 | Vaill ................... | F41H 13/0012 307/149 |
| 3,775,638 A | 11/1973 | Tidman | |
| 3,799,475 A | 3/1974 | Mitchell et al. | |
| 3,872,279 A | 3/1975 | Fairbairn | |
| 3,926,224 A * | 12/1975 | Vermeulen ............ | D03D 47/00 139/453 |
| 4,010,915 A * | 3/1977 | Strutz .................... | B65H 59/10 242/147 R |
| 4,146,061 A * | 3/1979 | Gotoh ..................... | D06H 1/00 112/131 |
| 4,294,417 A * | 10/1981 | Camardella ........... | B65H 59/22 242/149 |
| 4,303,845 A | 12/1981 | Davis | |
| 4,313,576 A * | 2/1982 | Claret ................... | B65H 54/34 242/476.1 |
| 4,347,872 A * | 9/1982 | Brouwer ................ | D03D 5/00 139/435.1 |
| 4,359,068 A * | 11/1982 | Loepfe .................. | D03D 51/34 139/370.2 |
| 4,369,817 A | 1/1983 | Mizuno | |
| 4,453,196 A | 6/1984 | Herr | |
| 4,605,182 A * | 8/1986 | Zollinger ............. | B65H 59/225 242/149 |
| 4,641,688 A * | 2/1987 | Gehring ................ | B65H 59/22 139/450 |
| 4,850,275 A | 7/1989 | Utreja et al. | |
| 4,875,506 A * | 10/1989 | Gacsay ................. | B65H 59/22 139/450 |
| 4,905,741 A | 3/1990 | Wahhoud et al. | |
| 4,912,367 A | 3/1990 | Schumacher et al. | |
| 4,917,335 A | 4/1990 | Tidman | |
| 4,937,552 A | 6/1990 | Lam | |
| 4,991,795 A | 2/1991 | Koncsek | |
| 4,998,420 A * | 3/1991 | Scavino ................ | D04B 15/58 139/453 |
| 5,050,648 A * | 9/1991 | Pezzoli .................. | D03D 47/34 139/370.2 |
| 5,109,670 A | 5/1992 | Hershman | |
| 5,179,279 A | 1/1993 | Millard et al. | |
| 5,179,980 A * | 1/1993 | Hubner ................. | B65H 59/22 112/255 |
| 5,234,183 A | 8/1993 | Hammer | |
| 5,244,164 A * | 9/1993 | Gacsay ................. | B65H 59/22 139/450 |
| 5,263,661 A | 11/1993 | Riley | |
| 5,305,966 A * | 4/1994 | Motta .................... | B65H 59/22 139/450 |
| 5,329,822 A * | 7/1994 | Hartel ................... | B65H 59/24 73/862.391 |
| 5,398,731 A * | 3/1995 | Schuster ............... | B65H 59/22 139/194 |
| 5,417,251 A * | 5/1995 | Josefsson .............. | B65H 59/26 139/450 |
| 5,462,094 A * | 10/1995 | Josefsson .............. | B65H 59/26 139/194 |
| 5,476,122 A * | 12/1995 | Schuster ............... | B65H 59/22 139/194 |
| 5,483,997 A * | 1/1996 | Corain .................. | B65H 59/22 139/194 |
| 5,492,286 A * | 2/1996 | Motta .................... | B65H 59/22 139/450 |
| 5,553,641 A * | 9/1996 | Zenoni .................. | D03D 47/34 139/452 |
| 5,660,213 A * | 8/1997 | Tholander .............. | D03D 47/34 139/452 |
| 5,726,855 A | 3/1998 | Mourou et al. | |
| 5,791,599 A | 8/1998 | Blackburn et al. | |
| 5,797,563 A * | 8/1998 | Blackburn ............ | B63B 1/34 244/130 |
| 5,806,301 A | 9/1998 | Aubuchon et al. | |
| 5,842,661 A * | 12/1998 | Hohne ................... | B65H 59/24 242/419.1 |
| 5,963,169 A | 10/1999 | Anderson et al. | |
| 6,006,795 A * | 12/1999 | Corain ................ | B65H 54/2833 139/438 |
| 6,026,864 A * | 2/2000 | Corain ................ | B65H 54/2833 139/449 |
| 6,087,993 A | 7/2000 | Anderson et al. | |
| 6,105,627 A * | 8/2000 | Covelli ................. | D03D 47/34 139/194 |
| 6,118,407 A | 9/2000 | Anderson et al. | |
| 6,155,306 A | 12/2000 | Katsukura et al. | |
| 6,161,595 A * | 12/2000 | Shaw .................... | B65H 59/22 139/194 |
| 6,211,617 B1 | 4/2001 | Deegan et al. | |
| 6,247,671 B1 | 6/2001 | Saeks et al. | |
| 6,370,219 B1 | 4/2002 | Peale et al. | |
| 6,377,436 B1 | 4/2002 | Margolin et al. | |
| 6,401,589 B1 | 6/2002 | Pinkus et al. | |
| 6,418,976 B2 * | 7/2002 | Loehr ................... | B65H 59/22 139/194 |
| 6,418,977 B1 * | 7/2002 | Tholander ............. | D03D 47/34 139/194 |
| 6,459,205 B1 | 10/2002 | Schell et al. | |

(56) References Cited

U.S. PATENT DOCUMENTS

| | | | |
|---|---|---|---|
| 6,460,578 B2* | 10/2002 | Lindblom | B65H 59/22 139/194 |
| 6,483,077 B1 | 11/2002 | Albright et al. | |
| 6,527,221 B1 | 3/2003 | Kremeyer | |
| 6,539,982 B1* | 4/2003 | De Swart | B65H 59/30 139/194 |
| 6,650,297 B2 | 11/2003 | Anderson et al. | |
| 6,694,808 B2 | 2/2004 | Sawada et al. | |
| 6,782,790 B2 | 8/2004 | Barrett et al. | |
| 6,793,177 B2 | 9/2004 | Bonutti et al. | |
| 6,810,918 B2* | 11/2004 | Birner | B65H 59/18 139/194 |
| 6,824,108 B2 | 11/2004 | Bonutti et al. | |
| 6,978,767 B2 | 12/2005 | Bonutti et al. | |
| 7,040,353 B2* | 5/2006 | Covelli | D03D 47/34 139/194 |
| 7,050,469 B1 | 5/2006 | Lundquist et al. | |
| 7,063,288 B1 | 6/2006 | Kremeyer | |
| 7,073,399 B2* | 7/2006 | Josefsson | D03D 47/34 139/194 |
| 7,077,168 B2* | 7/2006 | Herrlein | B65H 59/24 139/194 |
| 7,121,511 B2 | 10/2006 | Kremeyer | |
| 7,180,081 B2 | 2/2007 | Walker et al. | |
| 7,260,023 B2 | 8/2007 | Jones et al. | |
| 7,274,015 B2 | 9/2007 | Miller et al. | |
| 7,543,610 B2* | 6/2009 | Klaui | D03D 47/23 139/103 |
| 7,584,014 B2* | 9/2009 | Gotti | D03D 47/366 139/194 |
| 7,641,153 B2 | 1/2010 | Smereczniak | |
| 7,648,100 B2 | 1/2010 | Kremeyer | |
| 7,753,084 B2* | 7/2010 | Gielen | B65H 63/088 139/116.1 |
| 7,903,698 B1 | 3/2011 | Lundquist et al. | |
| 7,930,967 B2 | 4/2011 | Marquis et al. | |
| 8,079,544 B2 | 12/2011 | Kremeyer | |
| 8,141,811 B2 | 3/2012 | Kremeyer | |
| 8,203,911 B2 | 6/2012 | Kremeyer | |
| 8,220,500 B2* | 7/2012 | Wang | D03D 47/347 139/116.1 |
| 8,251,312 B1 | 8/2012 | Daso et al. | |
| 8,359,825 B2 | 1/2013 | Alvi et al. | |
| 8,511,612 B2 | 8/2013 | Kremeyer | |
| 8,528,341 B2 | 9/2013 | Grossi | |
| 8,534,595 B2 | 9/2013 | Kremeyer | |
| 8,675,451 B2 | 3/2014 | Kremeyer | |
| 8,827,211 B2* | 9/2014 | Kremeyer | B64C 19/00 244/204 |
| 8,960,596 B2 | 2/2015 | Kremeyer | |
| 9,268,194 B2 | 2/2016 | Kremeyer | |
| 9,533,753 B2 | 1/2017 | Kremeyer | |
| 9,555,876 B2 | 1/2017 | Kremeyer | |
| 10,124,883 B2* | 11/2018 | Kremeyer | B64C 19/00 |
| 2002/0011275 A1 | 1/2002 | Satou et al. | |
| 2003/0070913 A1 | 4/2003 | Miller et al. | |
| 2004/0084568 A1* | 5/2004 | Bonutti | B63B 1/34 244/204 |
| 2004/0118270 A1* | 6/2004 | Barrett | F41H 11/02 89/1.11 |
| 2005/0061908 A1* | 3/2005 | Kremeyer | B64C 23/005 244/1 N |
| 2005/0109879 A1* | 5/2005 | Patterson | F03H 99/00 244/53 R |
| 2005/0145290 A1* | 7/2005 | Jacobsson | B65H 59/22 139/450 |
| 2005/0150371 A1 | 7/2005 | Rickard et al. | |
| 2005/0224706 A1 | 10/2005 | Von Rosenberg | |
| 2006/0000988 A1 | 1/2006 | Stuart et al. | |
| 2006/0006585 A1* | 1/2006 | Suzuki | D02J 1/22 264/479 |
| 2006/0096802 A1 | 5/2006 | Jones et al. | |
| 2006/0182960 A1* | 8/2006 | Suzuki | D02J 1/22 428/364 |
| 2006/0196424 A1* | 9/2006 | Swallow | H05H 1/2406 118/723 E |
| 2007/0040726 A1 | 2/2007 | Kremeyer | |
| 2007/0068053 A1 | 3/2007 | Troitski et al. | |
| 2007/0169830 A1* | 7/2007 | Christe | B65H 59/22 139/448 |
| 2007/0169831 A1* | 7/2007 | Gorris | D03D 47/24 139/450 |
| 2007/0176046 A1 | 8/2007 | Kremeyer | |
| 2008/0185066 A1 | 8/2008 | Berktold et al. | |
| 2008/0225383 A1 | 9/2008 | Theberge et al. | |
| 2008/0277599 A1 | 11/2008 | Soer et al. | |
| 2008/0303375 A1 | 12/2008 | Carver et al. | |
| 2009/0032740 A1 | 2/2009 | Smith et al. | |
| 2009/0074016 A1 | 3/2009 | Mamer et al. | |
| 2009/0084252 A1 | 4/2009 | Marquis et al. | |
| 2009/0101226 A1 | 4/2009 | Colditz et al. | |
| 2009/0103083 A1 | 4/2009 | Kremeyer | |
| 2009/0173837 A1* | 7/2009 | Silkey | B64C 23/005 244/205 |
| 2009/0184258 A1 | 7/2009 | Ting et al. | |
| 2009/0201763 A1 | 8/2009 | Jones et al. | |
| 2010/0090106 A1 | 4/2010 | de Gorordo et al. | |
| 2010/0181503 A1 | 7/2010 | Yanagida et al. | |
| 2010/0236740 A1* | 9/2010 | Mourad | B32B 3/266 162/289 |
| 2011/0030379 A1* | 2/2011 | Kremeyer | F02K 7/14 60/768 |
| 2011/0204265 A1 | 8/2011 | Smith et al. | |
| 2012/0149273 A1* | 6/2012 | Moore | D01D 4/025 442/400 |
| 2012/0243564 A1 | 9/2012 | Payeur et al. | |
| 2012/0250006 A1 | 10/2012 | Kremeyer | |
| 2013/0016449 A1 | 1/2013 | Crandall et al. | |
| 2013/0126762 A1 | 5/2013 | Moriya et al. | |
| 2013/0213481 A1 | 8/2013 | Drayna et al. | |
| 2014/0142255 A1* | 5/2014 | Paulauskas | D01F 9/22 525/388 |
| 2016/0002824 A1* | 1/2016 | Roach | D04H 1/728 442/50 |
| 2016/0362176 A1 | 12/2016 | Kremeyer | |
| 2017/0082124 A1* | 3/2017 | Kremeyer | B61C 7/00 |
| 2017/0313413 A1 | 11/2017 | Kremeyer | |
| 2018/0059028 A1 | 3/2018 | Kremeyer | |
| 2018/0170525 A1 | 6/2018 | Kremeyer | |

OTHER PUBLICATIONS

"(Plasma Power) Drag Factor", Published by Jane's Defence Weekly (UK), Jun. 17, 1998.

A. Michel, M. Lawerence-Snyder, S. M. Angel, A. D. Chave "Oceanic Applications of Laser Induced Breakdown Spectroscopy: Laboratory Validation", 2005 IEEE/MTS Annual Meeting.

A. S. Yuriev, V.Yu. Borzov, I.V. Ryibka, N. P. Savischenko, A.L. Kuranov, "Dependence of High-Speed Elements Aerodynamics on Local Heat Sources in Approaching Flow. Numerical Simulation and Wind Tunnel Tests", Presented at the 2nd Weakly Ionized Gases Workshop, Norfolk, VA Apr. 24-25, 1998. Proceedings published by AIAA.

Vogel, A. et al. "Shock Wave Emission and Cavitation Bubble Generation by Picosecond and Nanosecond Optical Breakdown in Water," *J. Acoust. Soc. Am.* 100:1 (Jul. 1996) 148-165.

Abbott, Ira H., Von Doenhoff, Albert E., and Stivers, Louis S., Jr., "Summary of Airfoil Data," NACAA Rep., 824 (1945).

Aközbek, N. et al. "Extending the Supercontinuum Spectrum Down to 200 nm with Few-Cycle Pulses," *New Journal of Physics*, 8:177 (2006) 1-12.

Aközbek, N. et al. "White-Light Continuum Generation and Filamentation During the Propagation of Ultra-Short Laser Pulses in Air," *Optics Communications*, 191 (May 8, 2001) 353-362.

Arissian, Ladan et al. "The Effect of Propagation in Air on the Filament Spectrum," *Optics Express*, 20:8 (Apr. 9, 2012) 8337-8343.

(56) References Cited

OTHER PUBLICATIONS

B.N. Ganguly, P. Bletzinger, A. Garscadden, "Shock Wave Damping and Dispersion in Nonequilibrium Low Pressure Argon Plasmas," Elsevier Press, *Physics Letters* A 230 (1997) 218-222.

B.V. Potapkin, R.I. Asisov, G.S. Baronov, V.K. Jivotov, M.F. Krotov, V.D. Rusanov, "Non-Equilibrium Microwave Discharges in the Fast Gas Flows", Presented at the Workshop on Weakly Ionized Gases, US Air Force Academy, Jun. 9-13, 1997. Printed with restricted dissemination by the Department of Defense.

Sacchi, C. A. "Laser-Induced Electric Breakdown in Water." *J. Opt. Soc. Am.* B 8:2 (Feb. 1991) 337-345.

C. Bruno, V.I. Golovitchev, P.K. Tretjakov, "New Trends in Improving Hypersonic Vehicles Aerodynamics and Propulsion: Flow Control by External Energy Supply", Presented at the 21st International Symposium on Space Technology and Science, Sonic City, Omiya, Japan, May 24-31, 1998. Japan Society for Aeronautical and Space Sciences.

Chalus, Olivier et al. "Propagation of Non-Diffracting Intense Ultraviolet Beams," *Optics Communications*, 281 (2008) 3356-3360.

Chen, Y.H. et al. "Single-Shot, Space- and Time-Resolved Measurement of Rotational Wavepacket Revivals in $H_2$, $D_2$, $N_2$, $O_2$ and $N_2O$," Optics Express, 15:18 (Sep. 3, 2007) 11341-11357.

Cheng, Y.H. et al. "The Effect of Long Timescale Gas Dynamics on Femtosecond Filamentation," *Optics Express*, 21:4 (Feb. 25, 2013) 4740-4751.

Chin, See teang, *Femtosecond Laser Filamentation*, Springer Series on Atomic; Optical and Plasma Physics, vol. 55 (2010) 1-138.

Clark, T.R. et al. "Time- and Space-Resolved Density Evolution of the Plasma Waveguide," *Physical Review Letters*, 78:12 (Mar. 24, 1997) 2373-2376.

Clark, T.R. et al. "Time-Evolution and Guiding Regimes of the Laser-Produced Plasma Waveguide," *Physics of Plasmas*, 7:5:2192 (May 2000) 2192-2197.

Couairon et al. "Propagation of twin laser pulses in air and concatenation of plasma strings produced by femtosecond infrared filaments," *Optics Communications*, 225:1 (2003) 177-192.

D. W. Riggins, H.F. Nelson, E. Johnson, "Blunt Body Wave Drag Reduction Using Focused Energy Deposition", Presented at the AIAA 8th International Space Planes and Hypersonics Systems and Technology Conference, Norfolk, VA Apr. 27-30, 1998. Proceedings published by AIAA.

Daigle, J.F. et al. "A Simple Method to Significantly Increase Filaments' Length and Ionization Density," *Appl Phys B*, 94 (2009) 249-257.

Egerev, S. V. "In Search of a Noncontact Underwater Acoustic Source," *Acoustical Physics* 49:1 (2003) 51-61.

Erkintalo, M. et al. "Rogue-Wave-Like Characteristics in Femtosecond Supercontinuum Generation," *Optics Letters*, 34:16 (Aug. 15, 2009) 2468-2470.

G. G. Chernyi, "The Impact of Electromagnetic Energy Addition to Air Near the Flying Body on its Aerodynamic Characteristics (Russian Contribution)", Presented at the 2nd Weakly Ionized Gases Workshop, Norfolk, VA Apr. 24-25, 1998. Proceedings published by AIAA.

G. Tchernyi, "Aerodynamics of Flying Body with Energy Release Near its Surface", Presented at the Workshop on Weakly Ionized Gases, US Air Force Academy, Jun. 9-13, 1997. Printed with restricted dissemination by the Department of Defense.

Igor Adamovich et al., "Studies of Anomalous Shock Wave Propagation and Dispersion in Weakly Ionized Plasmas", Presented at the 2nd Weakly Ionized Gases Workshop, Norfolk, VA Apr. 24-25, 1998. Proceedings published by AIAA.

J. H. Mullen, R.J. Kashuba, J.D. Kelley, P. Vogel, P. Smereczniak, "Recent Progress in Plasma Aerodynamics", Presented at the 2nd Weakly Ionized Gases Workshop, Norfolk, VA Apr. 24-25, 1998. Proceedings published by AIAA.

J.A. Johnson III, R. Appartaim, J. Tate, F. Hunte, "Drag Reduction from Non-Equilibrium Plasma Chemistry for Shock-Free Supersonic Flight", Presented at the Workshop on Weakly Ionized Gases, US Air Force Academy, Jun. 9-13, 1997. Printed with restricted dissemination by the Department of Defense.

J.W. Rich, I.V. Adamovich, V. V. Subramaniam, S.O. Macharet, "Shockwave Propagation in Weakly Ionized Plasmas", Presented at the Workshop on Weakly Ionized Gases, US Air Force Academy, Jun. 9-13, 1997. Printed with restricted dissemination by the Department of Defense.

Jones, Theodore G. et al. "Laser-Generated Shocks and Bubbles as Laboratory-Scale Models of Underwater Explosions," *Shock and Vibration* 10 (2003) 147-157.

K. V. Khodataev, "Physics of Under-Critical Microwave Discharge and its Influence on Supersonic Aerodynamics and Shock Waves", Presented at the Workshop on Weakly Ionized Gases, US Air Force Academy, Jun. 9-13, 1997. Printed with restricted dissemination by the Department of Defense.

Kennedy, Paul K. "A First-Order Model for Computation of Laser-Induced Breakdown Thresholds in Ocular and Aqueous Media: Part I—Theory," *IEEE Journal of Quantum Electronics* 31:12 (Dec. 1995) 2241-2249.

Kennedy, Paul K. et al. "A First-Order Model for Computation of Laser-Induced Breakdown Thresholds in Ocular and Aqueous Media: Part II—Comparison to Experiment," *IEEE Journal of Quantum Electronics* 31:12 (Dec. 1995) 2250-2257.

Kevin Kremeyer, Sergey Nazarenko, Alan Newell, "The Role of Vorticity in Shock Propagation Through Inhomogeneous Media", Presented at the 37th Aerospace Sciences Meeting and Exhibit, Reno, NV Jan. 11-14, 1999. Proceedings published by AIAA.

Kiril V. Khodataev, "The Plasma Effects in Air Dynamics. The Gas Discharge Theory Model in Aerodynamic Calculations", Presented at the 2nd Weakly Ionized Gases Workshop, Norfolk, VS Apr. 24-25, 1998. Proceedings published by AIAA.

Kosareva, O.G. et al. "Conical Emission from Laser-Plasma Interactions in the Filamentation of Powerful Ultrashort Laser Pulses in Air," Optics Letters, 22:17 (Sep. 1, 1997) 1332-1334.

Köstli et al. "Optoacoustic Tomography: Time-Gated Measurement of Pressure Distributions and Image Reconstruction" *Applied Optics*, 40:22 (Aug. 2001) pp. 3800-3809.

L. J. Mullen, P. R. Herczfeld, and V. M. Contarino, IEEE Trans. Microwave Theory Tech. 44, 2703 (1996).

L. N. Myrado, "Air Spike, Pulsed Detonation Engine and MHD Slipstream Accelerator Research", Presented at the Workshop on Weakly Ionized Gases, US Air Force Academy, Jun. 9-13, 1997. Printed with restricted dissemination by the Department of Defense.

Lachowicz, J. M., Yao, C. S., and Wlezien, Richard W., "Flow field characterization of a jet and vortex actuator," *Experiments in Fluids*, vol. 27, Issue 1 (1999) 12-20.

Levin V.A., Afonina N.E., Gromov V.G., Georgievsky P.Yu., Terntjeva L.V., "Influence of Energy Input by Electric Discharge on Supersonic Flows around Bodies", Presented at the 2nd Weakly Ionized Gases Workshop, Norfolk, VA Apr. 24-25, 1998. Proceedings published by AIAA.

Strand, Michael P. "Underwater Electro-Optical System for Mine Identification," *SPIE* 2496 (1995) 487-497.

Maioli, P. et al. "Ultraviolet-Visible Conical Emission by Multiple Laser Filaments," *Optics Express*, 17:6 (Mar. 16, 2009) 4726-4731.

Manuel E. Zevallos L., S. K. Gayen, M. Alrubaiee, and R. R. Alfano, "Time-gated backscattered ballistic light imaging of objects in turbid water", *Appl. Phys. Lett.* 86, 011115 (2005).

Y. P. Raizer, N.N. Shneider, "Drag Reduction of Hypersonic Blunt Body Due to Power Source", Presented at the Workshop on Weakly Ionized Gases, US Air Force Academy, Jun. 9-13, 1997. Printed with restricted dissemination by the Department of Defense.

Mullen, Linda J. "Hybrid Lidar-Radar Ocean Experiment," *IEEE Transactions on Microwave Theory and Techniques* 44:12 (Dec. 1996) 2703-2710.

N. Malmuth, "Basic Physical Mechanisms Associated with Plasma Aerodynamic Flow Control", Presented at the Workshop on Weakly Ionized Gases, US Air Force Academy, Jun. 9-13, 1997. Printed with restricted dissemination by the Department of Defense.

Nibbering, E.T.J. et al. "Conical Emission from Self-Guided Femtosecond Pulses in Air," *Optics Letters*, 21:1 (Jan. 1, 1996) 62-65.

P. G. P. Toro, L.N. Myrabo, H.T. Nagamatsu, "Experimental Investigation of Hypersonic 'Directed-Energy Air Spike' Inlet at Mach

(56) References Cited

OTHER PUBLICATIONS 10-20", Presented at the 35th Aerospace Sciences Meeting and Exhibit, Reno, NV Jan. 6-10, 1997. Proceedings published by AIAA.
P. K. Tretjakov, V.I. Golovitchev, C. Bruno, "Experimental and Numerical Study of Counterflow Jet Flame Stabilization in Supersonic Air Stream", Presented at the XII ISABE, Melbourne, Australia Sep. 10-15, 1995. Proceedings published by AIAA.
P. Sprangle, J. R, Penano, and B. Hafizi discuss propagation of intense short laser pulses in the atmosphere in *Physical Review E*, vol. 66, 2002, pp. 046418-1-046418-21.
Palastro, J.P. et al. "Compression, Spectral Broadening, and Collimation in Multiple, Femtosecond Pulse Filamentation in Atmosphere," *Physical Review A*, 86:033834 (2012) 1-7.
Papadogiannis, N. A. et al. "Kilohertz Extreme-Ultraviolet Light Source Based on Femtosecond High-Order Harmonic Generation from Noble Gases," *Applied Physics B*, 73 (2001) 687-692.
R. McEwen, "Plasma Generation for Drag Reduction Applications at Low Supersonic Speeds", Presented at the Workshop on Weakly Ionized Gases, US Air Force Academy, Jun. 9-13, 1997. Printed with restricted dissemination by the Department of Defense.
R.B. Miles, S.O. Macheret, P.Efthimion, "Mechanisms of Shock Propagation and Stability Control in Low Temperature Plasmas", Presented at the Workshop on Weakly Ionized Gases, US Air Forse Academy, Jun. 9-13, 1997. Printed with restricted dissemination by the Department of Defense.
Rosenthal, E.W. et al. "Collection of Remote Optical Signals by Air Waveguides," *Optica*, 1:1 (Jul. 2014) 5-9.
S. J. Scott, E. Thornton, C.R. Spikings, "Further Studies of Plasma Generators for Aerodynamic Drag Reduction—Characterization of Erosive Plasma Jet Generators", Presented at the 2nd Weakly Ionized Gases Workshop, Norfolk, VA Apr. 24-25, 1998. Proceedings published by AIAA.
S.N. Chuvachev, "Ambient Air Modification for Drag Reduction: DC Discharges in Rarefied Supersonic Air Flow", Presented at the Workshop on Weakly Ionized Gases, US Air Force Academy, Jun. 9-13, 1997. Printed with restricted dissemination by the Department of Defense.
Schewe, G., "Reynolds-numver effects in flow around more-or-less bluff bodies," *Journal of Wind Engineering and Industrial Aerodynamics*, 89 (2001) 1267-1289.
Shneider, M.N. et al. "Tailoring the Air Plasma with a Double Laser Pulse," *Physics of Plasmas*, 18:063509 (2011) 1-9.
Siegman "Pulse Propagation in Nonlinear Dispersive Systems," *Lasers*, Chapter 10 (1986) 375-386.
Smetana, Frederick O., Summey, Delbert C., Smith, Neill S., and Carden, Ronald K., "Light Aircraft Lift, Drag, and Moment Prediction—A Review and Analysis," *NASA* CR-2523 (1975).

Sprangle, P. et al. "Propagation of Intense Short Laser Pulses in the Atmosphere," *Physical Review E* 66 (2002) 046418.
Stelmaszczyk, Kamil et al. "Long-Distance Remote Laser-Induced Breakdown Spectroscopy Using Filamentation in Air," *Applied Physics Letters*, 85:18 (Nov. 1, 2004) 3977-3979.
Yu. Z. Ionikh, N. V. Chernysheva, A.P. Yalin, S.O. Macheret, L. Martinelli, and R. B. Miles, "Shock Wave Propgation Through Glow Discharge Plasmas: Evidence of Thermal Mechanism of Shock Dispersion," Presented at the 38th Aerospace Sciences Meeting and Exhibit, Reno, NV Jan. 10-13, 2000. Proceedings published by AIAA.
Tzortzakis, S. et al. "Femtosecond Laser-Guided Electric Discharge in Air," *Physical Review E*, 64:057401 (2001) 1-4.
Tzortzakis, S. et al. "Time-Evolution of the Plasma Channel at the Trail of a Self-Guided IR Femtosecond Laser Pulse in Air," *Optics Communications*, 181 (Jul. 1, 2000) 123-127.
V. Skvortsov et al. "Results of Experimental Investigation in Wind Tunnels of the Electric Discharge Influence on Aerodynamic Drag and Flow over Models" combined with N. Makashev, "The First Results and Conclusions in 'Plasma Aerodynamics'", Presented at the Workshop on Weakly Ionized Gases, US Air Force Academy, Jun. 9-13, 1997. Printed with restricted dissemination by the Department of Defense.
Vladimir Bychkov, "Theoretical Analysis of Plasma Aerodynamic Experiments", Presented at the Workshop on Weakly Ionized Gases, US Aif Force Academy, Jun. 9-13, 1-997. Printed with restricted dissemination by the Department of Defense.
W. Beaulieu, A. I. Klimov, S.B. Leonov, "Physical Background of Plasma Flight Test Experiment", Presented at the Workshop on Weakly Ionized Gases, US Air Force Academy, Jun. 9-13, 1997. Printed with restricted dissemination by the Department of Defense.
Wahlstrand, J.K. et al. "Optical Nonlinearity in Ar and $N_2$ near the Ionization Threshold," *Physical Review Letters*, 107:103901 (Sep. 2, 2011) 1-5.
Wlezien, Richard W. and Ferraro, P. J., "Aeroacoustic Environment of an Advanced STOVL Aircraft in Hover," *AIAA J.*, 30:11 (1992) 2606-2612.
Wlezien, Richard W., Parekh, D. E., and Island, T., "Measurement of Acoustic Receptivity at Leading Edges and Porous Strips," *Applied Mechanics Reviews*, 43:5 Part 2 (1990) S167-S174.
W. Beaulieu, V. Brovkin, I. Goldberg, A. Klimov, Yu. Kolesnichenko, A. Krylov, V Lashkov, S. Leonov, I. Mashek, M. Ryvkin, Yu. Serov, "Microwave Plasma Influence on Aerodynamic Characteristics of body in Airflow", Presented at the 2nd Weakly Ionized Gases Workshop, Norfolk, VA Apr. 24-25, 1998. Proceedings published by AIAA.
S.N. Chuvashev et al., "Flow Around Body and Characteristics of AC/DC Discharges in Plasma Aerodynamic Experiment," Presented at the 2nd Weakly Ionized Gases Workshop, Norfolk, VA Apr. 24-25, 1998. Proceedings published by AIAA.

* cited by examiner

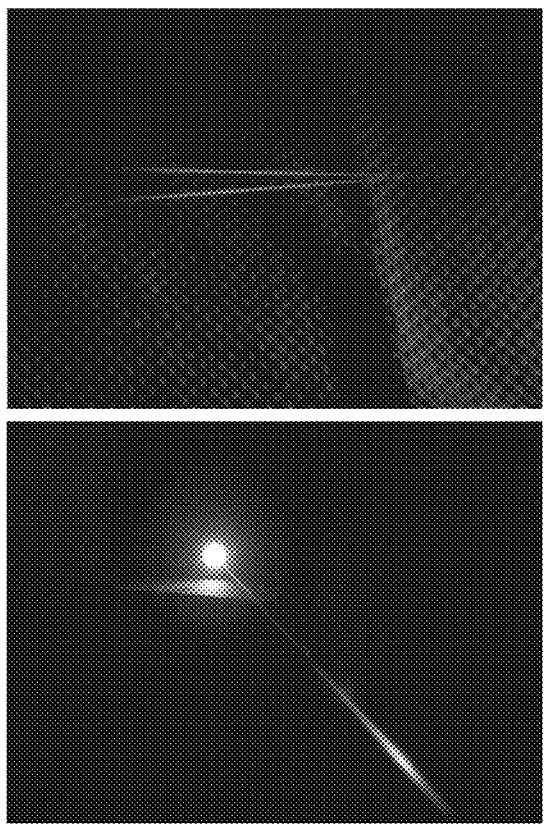
Fig. 6
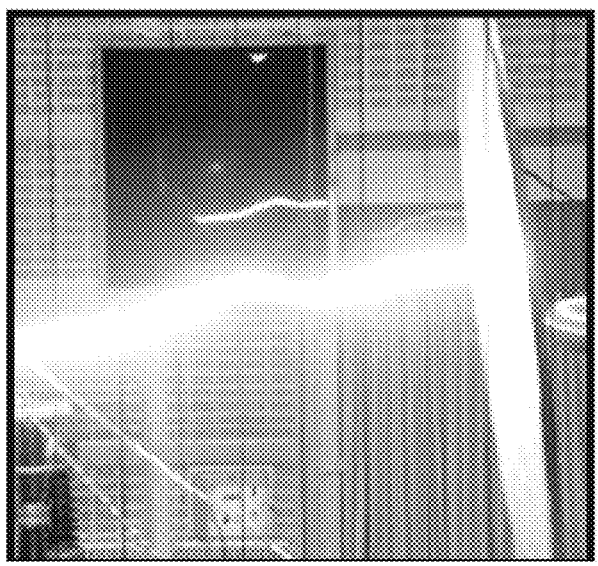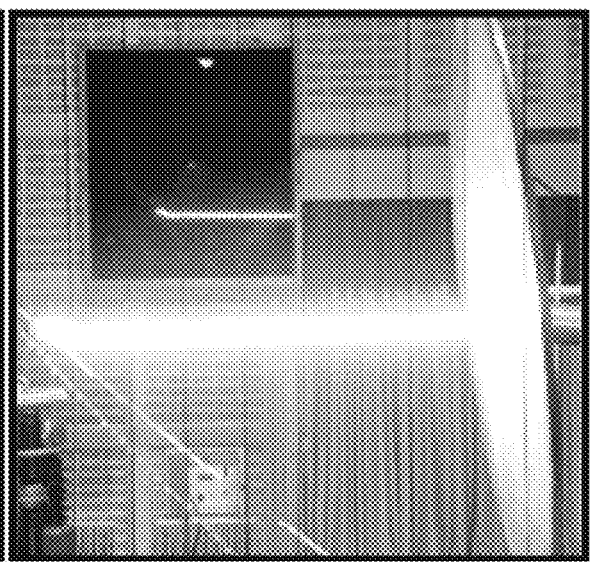
Fig. 7A                    Fig. 7B Fig. 14A
Fig. 14B
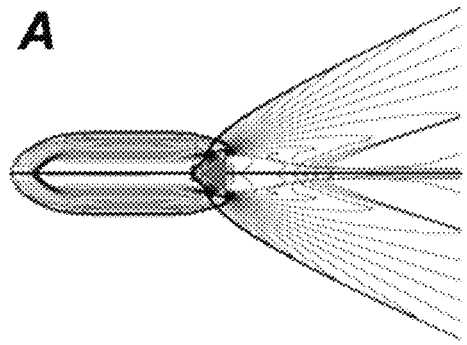
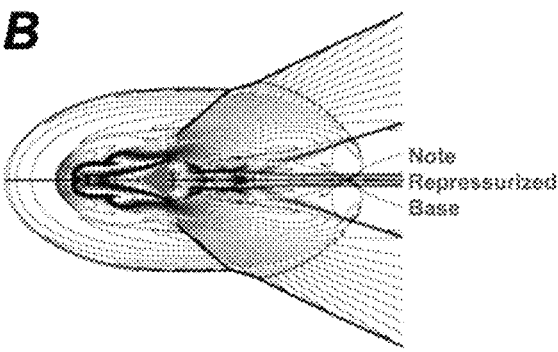
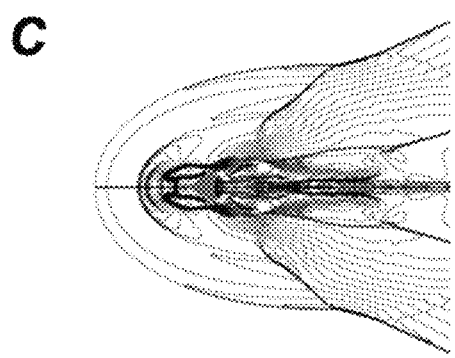
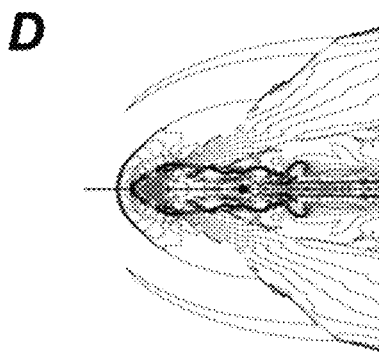
Fig. 14C
Fig. 14D
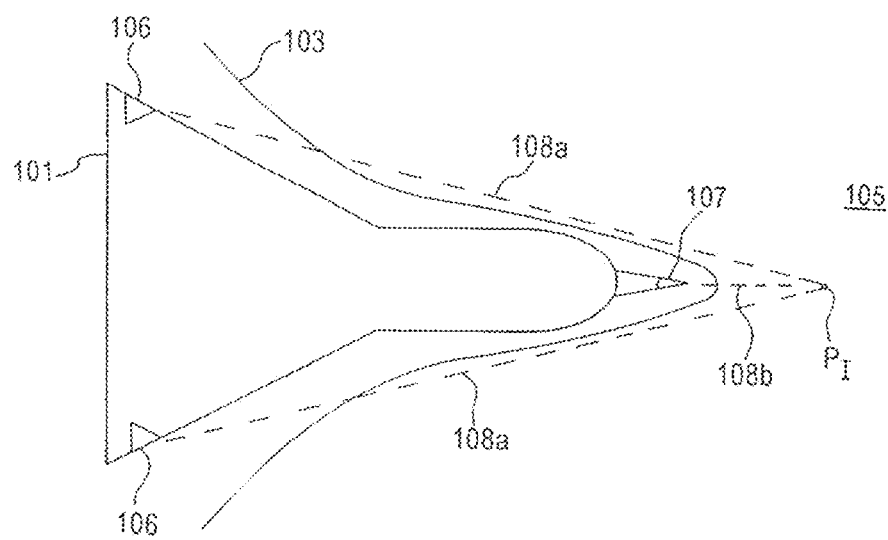
Fig. 15

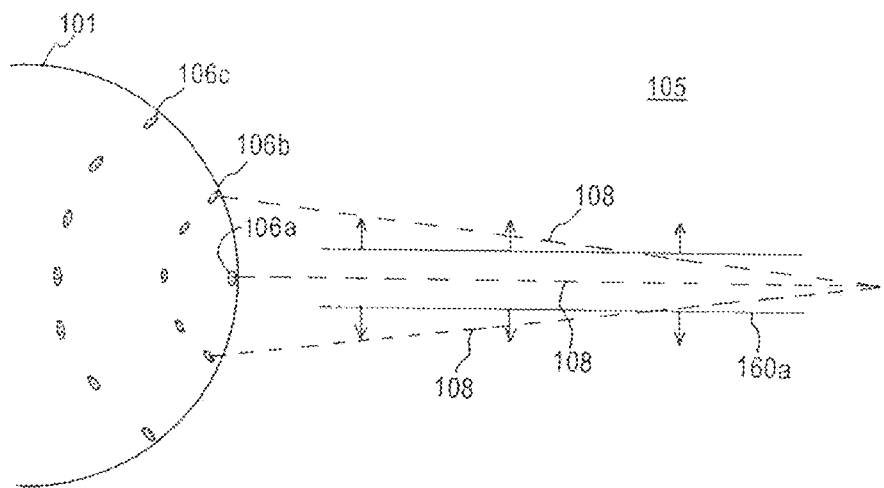
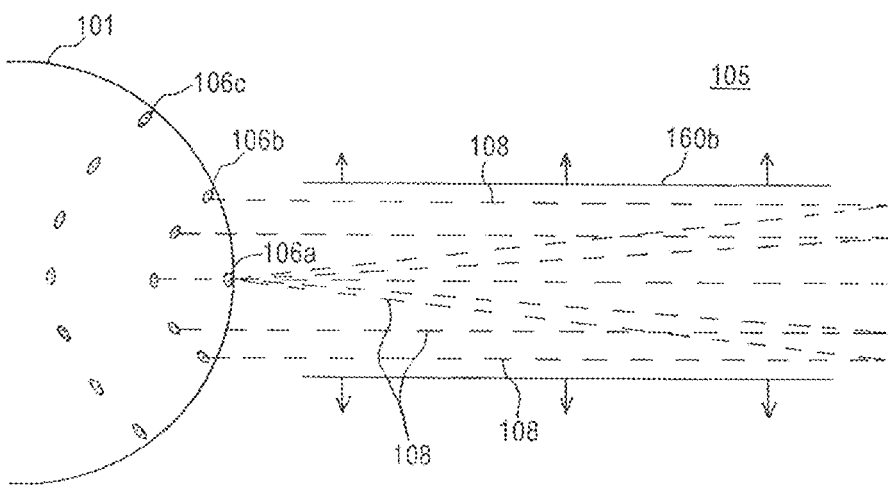
Fig. 18

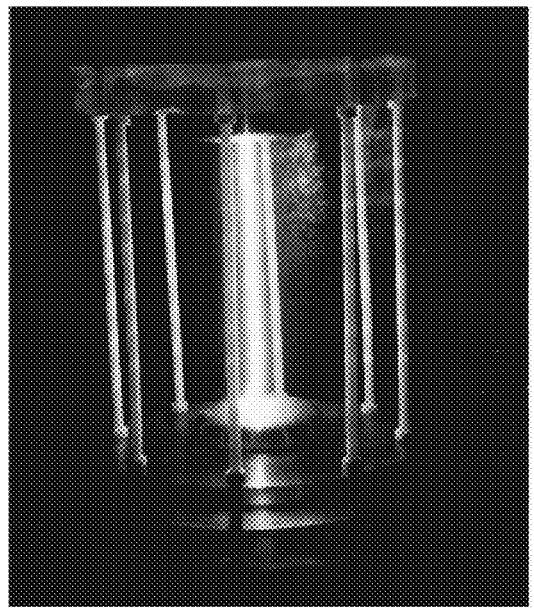
Fig. 32
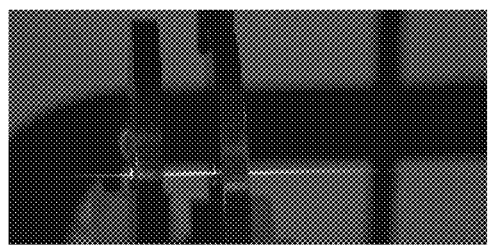 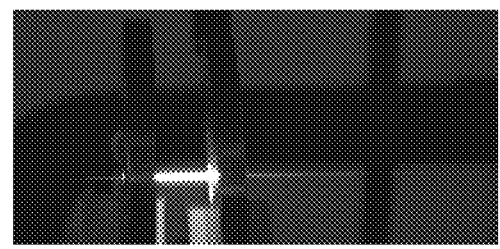
Fig. 33A Fig. 33B
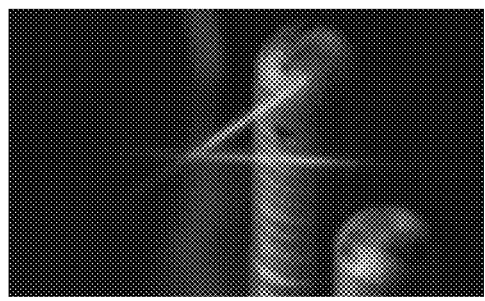 
Fig. 33C Fig. 33D

Figs. 36A-H

DIRECTED ENERGY DEPOSITION TO FACILITATE HIGH SPEED APPLICATIONS

CROSS REFERENCE TO RELATED APPLICATIONS

This application is the National Phase application of International Application No. PCT/US2016/038421, filed Jun. 20, 2016, which designates the United States and was published in English, and which further claims the benefit of priority from: 1) International Application No. PCT/US2016/038239, filed Jun. 17, 2016; 2) U.S. application Ser. No. 15/186,337, filed Jun. 17, 2016; and 3) U.S. Provisional Application No. 62/181,625, filed Jun. 18, 2015. All of the foregoing related applications, in their entirety, are incorporated herein by reference.

In addition, each of the following U.S. patents, in their entirety, are hereby incorporated by reference: U.S. Pat. No. 6,527,221 granted Mar. 4, 2003, U.S. Pat. No. 7,063,288 granted Jun. 20, 2006, U.S. Pat. No. 7,121,511 granted Oct. 17, 2006, U.S. Pat. No. 7,648,100 granted Jan. 19, 2010, U.S. Pat. No. 8,079,544 granted Dec. 20, 2011, U.S. Pat. No. 8,141,811 granted Mar. 27, 2012, U.S. Pat. No. 8,511,612 granted Aug. 20, 2013, U.S. Pat. No. 8,534,595 granted Sep. 17, 2013, U.S. Pat. No. 8,827,211 granted Sep. 9, 2014, and U.S. Pat. No. 8,960,596 granted Feb. 24, 2015.

FIELD OF THE INVENTION

Energy deposition techniques have been disclosed in the past, in order to achieve dramatic effects in a number of applications, such as flow control, drag reduction, and vehicle control, among many others. In studying the dramatic benefits of depositing energy, a number of modifications can be made in how and/or when the energy is deposited, in order to enhance the benefits derived from depositing energy when not implementing these modifications. One such modification is to coordinate the energy deposition with one or more other processes, in order to synchronize, "time", or "phase" the effects of the energy deposition with such other processes, in order to achieve additional benefits or maximize the effect of interest (the terms "synchronize", "time", and "phase" may be used relatively interchangeably to indicate timing an event or process with respect to one or more other events and/or processes). Such events and/or processes include, but are not limited to: propulsive processes; fluid dynamic processes; chemical processes; specific motions; injection, addition, and/or deposition of additional energy; injection, addition, and/or deposition of additional material; removal of energy; removal of material; pressure changes; application of one or more forces; combustion processes; ignition processes; detonation processes; among many others. Furthermore, the concept of energy deposition is broadly interpreted to include any process which adds energy into a medium, or results in heating of a medium. This heating or energy deposition can be performed sufficiently quickly (for example, impulsively) to result in expansion of a medium faster than the speed of sound in said medium, resulting in a region left behind by the expansion, of lower density than the original medium. Another possibility is that the energy deposition and/or the process resulting in heating can result in a phase change in a medium, which can modify the density and/or other properties of said heated medium or media, such as viscosity and/or strength, among others. These changes to a medium or media, including density, viscosity, and/or strength, among others, can result in modifications to the flow properties of the medium or media, as well as modifications to other properties and responses of said affected media.

Increasing the transit speed in loom applications of Air Jets, Water Jets, shuttles, picks, etc, by reducing drag in traversing the loom. Synchronizing the energy deposition to coincide with the transit of the material being woven by the loom. Reducing drag on a ground vehicle, by synchronizing the energy deposition with the ground vehicle's motion and transient levitation and propulsive forces, and the energies used to establish these forces. Depositing energy in the barrel of a gun, firearm, or breacher, among other types of barrels used to propel a projectile, in order to force air out of the barrel. The decreased drag on the projectile will enable a greater muzzle speed with the same amount of driving energy (e.g. the propellant in a conventional gun or the electrical driving energy in a rail gun). The reduced drag will also allow attainment of speeds, comparable to the speeds attained without modification, by using less driving energy (for example, a smaller charge such as a charge less than 90%, for example between 50% and 90%, less than 70% or less than 80% charge compared to the standard charge for that particular device. In a conventional gun, this means that the same performance can be achieved with less propellant. The lower propellant requirement then leads to a reduced muzzle blast when the projectile exits the barrel. This reduced acoustic signature is useful to minimize deleterious effects on the hearing of nearby individuals, including the operator(s). This reduced acoustic signature can also mitigate detection by acoustic means (similar to an acoustic suppressor). The energy deposition to force air out of the barrel can be applied in many forms. For example, tow embodiments may include: i) deposition of electromagnetic energy in the interior of the barrel; or ii) the deposition of energy can be chemical in nature; as well as some combination of these two energy deposition approaches. The electromagnetic energy can be, for example. in the form of an electric discharge in the interior of the gun barrel. The chemical energy can be, for example, in the form of additional propellant which expands in front of the projectile when ignited, to drive the gas from the barrel (as opposed to the traditional role of the propellant to expand behind the projectile to propel it out of the barrel). This additional propellant can be incorporated on the round itself. In powder coating, for example supersonic spray deposition applications. phasing the energy deposition with: bursts of powder; application of heating; application of electric discharge; application of laser energy; application of plasma. In supersonic and hyper sonics propulsion, phasing the energy deposition with respect to detonations in the engine (e.g. a pulse detonation engine), which results in fluid dynamic processes being properly phased (the timing will depend on the length scales of the vehicle and propulsion unit(s), as well as the flight conditions and parameters, among other factors). The propulsion pulse can also be synchronized to generate a laser pulse and power to supply a pulsed power source.

BACKGROUND OF THE INVENTION

Since its beginning, PM&AM Research has been pioneering a broad range of energy deposition applications to revolutionize how the world flies and controls high speed flow in particular, how we execute high-speed flight and flow-control, ranging from high subsonic to hypersonic regimes. There are a number of applications to provide an intuitive feel of the many possibilities opened up by this novel approach. The basic effect stems from our approach to rapidly expand gas out of regions, through which we want high-speed/high-pressure gas to flow. As a simple analogy (requiring some imagination and license), consider the difference in effectiveness of trying to make a projectile cross through the Red Sea at high speed, either firing the projectile directly through the water from one side to the other, or first "parting" the Red Sea and then firing the same bullet through a path that contains no water (FIG. 1).

In the first case of firing the bullet directly into the high-density water, even a massive, streamlined, 1000 m/s bullet will penetrate less than 1 m of the water. In the second case, after first "parting" the water (i.e. creating a path, from which the water has been removed), the same bullet even at 300 m/s can easily propagate for very long distances (this heuristic example does not address the drop from gravity, which is addressed later in the paper). It is this concept and geometry that we exploit, in order to achieve revolutionary control over high-speed flow and high-speed vehicles/projectiles.

SUMMARY OF THE INVENTION

Certain embodiments may provide, for example, a method of propelling an object through a fluid, the method comprising: (i) impulsively heating a portion of the fluid to form a lower density region surrounded by a higher density region, said higher density region containing at least a fraction of the heated portion of the fluid; (ii) directing at least a portion of the object into the lower density region; synchronized with (iii) detonating a reactant in a pulsed propulsion unit propelling the object. In certain embodiments, for example, steps (i)-(iii) may be repeated, for example at a rate in the range of 0.1 Hz-100 kHz, for example repeated at a rate in the range of 1 Hz-80 kHz, 10 Hz-50 kHz, 100 Hz-20 kHz, 1-10 kHz, 5-10 kHz, 10-25 kHz, 25-50 kHz, or repeated at a rate in the range of 50-100 kHz.

In certain embodiments, one or more than one (including for instance all) of the following embodiments may comprise each of the other embodiments or parts thereof. In certain embodiments, for example, the reactant may be present in the higher density region. In certain embodiments, for example, the heating may comprise depositing in the range of 1 kJ-10 MJ of energy into the fluid, for example in the range of 10 kJ-1 MJ, 100-750 kJ, or in the range of 200 kJ to 500 kJ. In certain embodiments, for example, the heating may comprise depositing in the range of 10-1000 kJ of energy into the fluid per square meter of cross-sectional area of the object, for example in the range of 10-50 kJ, 50-100 kJ, 100-250 kJ, 250-500 kJ, or in the range of 500-1000 kJ/per square meter. In certain embodiments, for example, the heating may comprise generating a shock wave. In certain embodiments, for example, the lower density region may have a density in the range of 0.01-10% relative to the density of the ambient fluid, for example a density in the range of 0.5-5%, 1.0-2.5%, or a density in the range of 1.2-1.7% relative to the density of the ambient fluid. In certain embodiments, for example, the portion of the fluid may be heated along at least one path. In certain embodiments, the at least one path may be formed by energy deposited from a laser, for example a laser filament guided path. In certain embodiments, the laser deposition may comprise a laser pulse lasting for a time in the range of 1 femtosecond and 100 nanoseconds, for example a time lasting in the range of 10 femtoseconds to 20 picoseconds, 100 femtoseconds to 25 picoseconds, 100 picoseconds to 20 nanoseconds, or a time lasting in the range of 100 femtoseconds to 30 picoseconds. In certain embodiments, the amount of energy deposited by the laser pulse may be in the range of 0.2 mJ to 1 kJ, for example in the range of 1 mJ to 10 mJ, 10 mJ to 3 J, 100 mJ to 10 J, 10 J to 100 J, 100 J to 1000 J, or in the range of 500 mJ to 5 J. In certain embodiments, the laser may generate light in the ultraviolet, infrared, or visible portion of the spectrum. In certain embodiments, the at least one path may be parallel to the direction of motion of the object. In certain embodiments, the lower density region may comprise a volume of the portion of the heated fluid expanding outwardly from the at least one path. In certain embodiments, for example, the heated portion of the fluid may be heated by an electrical discharge, for example a pulsed electrical discharge. In certain embodiments, the electrical discharge may travel through the fluid at a speed in the range of $10^6$-$10^7$ m/s. In certain embodiments, the electrical discharge may last for a time in the range of 0.1-100 microseconds, for example a time in the range of 0.1-2 microseconds, 1-5 microseconds, 5-40 microseconds, 10-30 microseconds, or a time in the range of 30-100 microseconds. In certain embodiments, the lower density region may be formed within a time in the range of 10-30 microseconds, for example a time in the range of 20-300 microseconds, 20-200 microseconds, 30-100 microseconds, 100-500 microseconds, 400-1500 microseconds, or a time in the range of 500-3000 microseconds. In certain embodiments, the lower density region may be disrupted by thermal buoyancy forces after a period of time in the range of 10-1000 milliseconds, for example in the range of 20-80 milliseconds, 30-60 milliseconds, 80-120 milliseconds, 150-600 milliseconds, or after a period of time in the range of 400-1000 milliseconds. In certain embodiments, for example, said object may be in communication with a pulse detonation engine, wherein said pulse detonation engine may contain said reactant. In certain embodiments, the detonation may be timed such that an intake nozzle of the pulse detonation engine is present in the higher density region. In certain embodiments, the fluid may be air and the pulse detonation engine may be air-breathing. Certain embodiments, for example, may further comprise: ingesting a quantity of air into the air-breathing pulse detonation engine prior to step (ii). In certain embodiments, the pulse detonation engine may provide at least a portion of the power required to heat said portion of the fluid. In certain embodiments, the pulse detonation engine may supply energy to a pulsed power source. In certain embodiments, the pulsed power source may provide energy to a filamenting laser, said filamenting laser forming said path, said path capable of guiding a pulsed electrical discharge. In certain embodiments, the pulsed power source may provide energy to a pulse electrical discharge generator, said generator used to heat said portion of the fluid. Certain embodiments, for example, may further comprise: heating a further portion of the fluid to form a further lower density region. In certain embodiments, the lower density region and the further lower density region may be separated by a region. Certain embodiments, for example, may further comprise: directing at least a further portion of the object into said region. Certain embodiments, for example, may further comprise: directing at least a further portion of the object into the further lower density region. In certain embodiments, for example, the heated portion of the fluid may define a tube. In certain embodiments, the speed of sound inside the tube may be at least 100% larger than the speed of sound in the ambient fluid, for example at least 150%, 200%, 500%, or at least 1000% larger. In certain embodiments, the motion of the object inside the tube may be subsonic. In certain embodiments, at least a portion of the motion of the object outside the tube may be supersonic. In certain embodiments, the tube may have a diameter of in the range of 5%-100% of the effective cross-sectional diameter of the object, for example in the range of 5%-20%, 20%-75%, 30%-50%, 75%-96%, or in the range of 35%-45%. In certain embodiments, for example, the object may have a base diameter in the range of 0.5-4 m, for example in the range of 1-3 m, or in the range of 1-2 m. In certain embodiments, the object may be traveling in the fluid at a speed in the range of Mach 6-20, for example a speed in the range of Mach 6-15, Mach 6-10, Mach 6-8, or at a speed in the range of Mach 7-8. In certain embodiments, the heating may comprise depositing in the range of 100-750 kJ of energy into the fluid; wherein the object may be characterized by a base diameter in the range of 0.5-4 m. In certain embodiments, the motion of the object may be hypersonic. In certain embodiments, the object may be traveling at a speed in the range of Mach 6-20, for example a speed in the range of Mach 6-15, Mach 6-10, Mach 6-8, or at a speed in the range of Mach 7-8. In certain embodiments, the heating may comprise depositing in the range of 100-200 kJ of energy into the fluid per square meter of cross-sectional area of the object, for example in the range of 125-175 or in the range of 140-160 kJ. In certain embodiments, the tube may have a cross-sectional area of 1-25%, for example in the range of 2-15%, 3-10%, or in the range of 3.5-4.5%, of the cross-sectional area of the object when the object is at an altitude in the range of 10-20 km, for example an altitude in the range of 12.5-17.5 km, 14-16 km, or an altitude in the range of 14.5-15.5 km. In certain embodiments, the tube may have a cross-sectional area of 6.25-56.25% of the cross-sectional area of the object, for example in the range of 10-40%, 20-30%, or in the range of 24-26%, when the object is at an altitude in the range of 20-40 km, for example an altitude in the range of 25-35 km, 28-32 km, or an altitude in the range of 29.5-30.5 km. In certain embodiments, the tube may have a cross-sectional area of 25-225%, for example in the range of 50-200%, 75-150%, or in the range of 95-105%, of the cross-sectional area of the object when the object is at an altitude in the range of 40-60 km, for example an altitude in the range of 40-50 km, 42-48 km, or an altitude in the range of 44-46 km. In certain embodiments, the drag experienced by the object may be reduced by at least 96% in step (ii). In certain embodiments, for example, the object may be in contact with a guide rail. In certain embodiments, for example, the object may be a chamber, tube, or barrel.

Certain embodiments may provide, for example, a vehicle, comprising: i) a filamentation laser configured to generate a path in a portion of a fluid surrounding the vehicle; ii) a directed energy deposition device configured to deposit energy along the path to form a low density region; and iii) a pulse detonation engine. In certain embodiments, one or more than one (including for instance all) of the following embodiments may comprise each of the other embodiments or parts thereof. In certain embodiments, for example, the filamentation laser may comprise a pulsed laser. In certain embodiments, for example, the directed energy deposition device may comprise a pulse electrical discharge generator. Certain embodiments, for example, may further comprise: iv) a sensor configured to detect whether a pre-determined portion of the vehicle is present in the low density region; and v) a synchronizing controller operably connected to the directed energy deposition device and the pulse detonation engine, said synchronizing controller configured to synchronize the relative timing of: a) generating a path; and b) depositing energy along the path; and c) operating the pulse detonation engine.

Certain embodiments may provide, for example, a method of retrofitting a pulse propulsion vehicle with a directed energy deposition sub-assembly. The sub-assembly may operate to achieve and/or include any one or more the embodiments herein.

Certain embodiments may provide, for example, a method of operating the vehicle, said method comprising: repeating the following steps (i)-(iv) at a rate in the range of 0.1-100 times per second: i) firing the filamentation laser; synchronized with ii) discharging the directed energy deposition device; synchronized with iii) directing at least a portion of the object into the low density region; synchronized with iv) detonating the pulse detonation engine when a pre-determined portion of the vehicle enters the low density region.

Certain embodiments may provide, for example, a method to reduce a base drag generated by a low pressure region near the back of a vehicle, said method comprising: i) impulsively depositing energy along at least one path in front of the vehicle, whereby a volume of fluid is displaced from the at least one path; and ii) directing a portion of the displace volume of fluid into the low pressure region, whereby the pressure of the low pressure region is increased. Certain further embodiments, for example, may further comprise: a vehicle propelled by a pulse propulsion unit and synchronizing the discharge of the energy deposition device with generating a propulsion pulse from the pulsed propulsion unit.

Certain embodiments may provide, for example, a method to reduce a wave drag exerted by a fluid against the forward cross-section of a fuselage, said fuselage comprising a plurality of air intake nozzles, said method comprising: i) impulsively heating a portion of the fluid to form a lower density region (for example, aligned or substantially aligned with the longitudinal central axis of the fuselage) surrounded by a higher density region, said higher density region comprising at least a fraction of the portion of heated fluid; ii) directing a first portion of the fuselage into the lower density region, said first portion of the fuselage exclusive of the plurality of fluid intake nozzles; and simultaneously iii) directing a second portion of the fuselage into the higher density region, said second portion of the fuselage comprising at least one of the air intake nozzles.

Certain embodiments may provide, for example, a method for forming a low density region in a fluid, said low density region proximate an object, the system comprising: i) using a directed energy dispersion device equipped with a laser assembly to form a plurality of pulsed laser beams emanating from the object and intersecting at one or more coordinates in the fluid, said one or more coordinates positioned relative to the object; and ii) depositing energy along one or more paths defined by the plurality of laser beams. In certain embodiments, one or more than one (including for instance all) of the following embodiments may comprise each of the other embodiments or parts thereof. In certain embodiments, for example, depositing energy may comprise depositing a pre-determined quantity of energy per unit length of the one or more paths. In certain embodiments, for example, the low density region may have a characteristic diameter along the one or more paths, wherein said characteristic diameter may be proportional to the square root of the deposited quantity of energy per unit length of the one or more paths. In certain embodiments, for example, the tube diameter may be said characteristic diameter. In certain embodiments, for example, the characteristic diameter may be further proportional to the inverse square root of an ambient pressure of the fluid. In certain embodiments, the tube diameter may be said characteristic diameter. In certain embodiments, for example, the at least two of the plurality of pulsed laser beams may be formed by splitting a source laser beam, said source laser beam generated by a laser subassembly of the object. In certain embodiments, for example, a portion of the fluid may be compressed between said low density region and the object. In certain embodiments, for example, at least a portion of the deposited energy may be delivered by at least one electrode and at least a fraction of the deposited energy is recovered by least one other electrode. In certain embodiments, for example, a subassembly of the object may comprise the at least one electrode. In certain embodiments, for example, a subassembly of the object may comprise the at least one other electrode. In certain embodiments, for example, the at least one electrode and/or the at least one other electrode may be positioned in a recessed cavity on a surface of the object.

Certain embodiments may provide, for example, a method for forming a low density region in a fluid, said low density region proximate an object, the system comprising: i) directing a laser beam along a line of sight starting at a coordinate incident with the object and ending at a coordinate removed from the object; and ii) depositing energy along the paths defined by the laser beam.

Certain embodiments may provide, for example, a method to form a low density region in a fluid, said method comprising: i) forming a transmission pathway, said transmission pathway configured to guide a deposition of energy; and ii) depositing energy along the transmission pathway to form the low density region.

In certain embodiments, for example, one or more than one (including for instance all) of the following embodiments may comprise each of the other embodiments or parts thereof. In certain embodiments, for example, the transmission pathway may pass through a fluid, for example an atmosphere, and/or along a solid surface, for example along a surface of a vehicle (such as an airplane, missle, train, torpedo, as well as other high speed vehicles). In certain embodiments, for example, the method may further comprise: repeating steps (i)-(ii) at a rate in the range of 0.1 Hz-100 kHz, for example repeating steps (i)-(ii) at a rate in the range of 1 Hz-80 kHz, 10 Hz-50 kHz, 100 Hz-20 kHz, 1-10 kHz, 5-10 kHz or repeating steps (i)-(ii) at a rate in the range of 10-30 kHz. In certain embodiments, for example, forming the transmission pathway may comprise emitting one or more energy sources, for example one energy source, two energy sources, three energy sources, or four energy sources. In certain embodiments, for example, the one or more emitted energy sources may comprise electromagnetic radiation, for example xrays, ultraviolet rays, visible light, infrared rays, microwaves, and/or radio waves; an RF plasma discharge; an electrical current; an electron beam; a particle beam; a charged particle beam; an electric discharge; and/or a corona discharge. In certain further embodiments, for example, the electromagnetic radiation may be at least one laser beam. In certain further embodiments, for example, the first energy source, second energy source, and/or third energy source may comprise at least one directed energy beam. In certain further embodiments, for example, the electromagnetic radiation may comprise at least one laser beam. In certain further embodiments, for example, the one or more energy sources may comprise at least one directed energy beam. In certain embodiments, for example, forming the transmission pathway comprises emitting a laser beam and an electron beam. In certain further embodiments, for example, the laser beam and the electron beam may be emitted simultaneously. In certain further embodiments, for example, the laser beam and the electron beam may be emitted sequentially. In certain embodiments, for example, emitting the one or more energy sources to form the transmission pathway may comprise emitting one or more pulses, a series of pulses, a series of ultrashort pulses, sporadic pulses, random pulses, an emission approaching a continuous emission, as a continuous emission of energy and/or combinations of any or all of these types of emmisions. In certain embodiments, emitting the one or more energy sources to form the transmission pathway may comprise at least one pulse, for example a plurality of pulses, lasting for a time in the range of 1 attosecond to 1 femtosecond, for example in the range of 100 attoseconds to 1 femtosecond. In certain embodiments, emitting the one or more energy sources to form the transmission pathway may comprise at least one pulse, for example a plurality of pulses, lasting for a time in the range of 1 femtosecond and 100 nanoseconds, for example a time lasting in the range of 10 femtoseconds to 20 picoseconds, 100 femtoseconds to 25 picoseconds, 100 picoseconds to 20 nanoseconds, or a time lasting in the range of 100 femtoseconds to 30 picoseconds. In certain embodiments, emitting the one or more energy sources to form the transmission pathway may comprise at least one pulse, for example a plurality of pulses, lasting for a time in the range of 100 nanoseconds to 1 microsecond, for example a time lasting in the range of 500 nanoseconds to 1 microsecond. In certain embodiments, emitting the one or more energy sources to form the transmission pathway may comprise at least one pulse, for example a plurality of pulses, lasting for a time in the range of 1 microsecond to 10 seconds, for example a time in the range of 10 microseconds to 1 second, or a time in the range of 100 microseconds to 500 microseconds. In certain embodiments, emitting the one or more energy sources to form the transmission pathway may comprise at least one pulse, for example a plurality of pulses, lasting for a time in the range of 10 seconds to 1 minute, for example a time in the range of 20 seconds to 40 seconds. In certain embodiments, for example, forming the transmission pathway may comprise: a) passing a first energy source to disrupt a characteristic of the fluid (for example an area of higher density and/or pressure, such as a wave or wave front); b) introducing a second energy source into the disrupted fluid (for example, via the whole or disruption through the wave or wave front created by the first energy source); followed by c) introducing a third energy source into the fluid. In certain embodiments, for example, forming the transmission pathway may comprise: a) emitting a first energy source to disrupt a standing wave of the fluid proximate a vehicle; b) passing a second energy source through the disrupted portion of the fluid; followed by c) introducing a third energy source into the fluid to form the transmission pathway. In certain embodiments, for example, the first energy source may comprise a laser beam; the second energy source may comprise an electron beam; and the third energy source may comprise a laser beam. In certain embodiments, for example, the disrupted fluid characteristic may be a wave, for example a standing wave or a dynamic wave, for example a wave adjacent to an object, for example a wave formed by motion of a vehicle. In certain embodiments, for example, forming the transmission pathway may comprise a) introducing a first energy source into the fluid; followed by b) introducing a second energy source into the fluid. In certain further embodiments, for example, the first energy source may be a laser beam or an electron beam, and the second energy source may be a microwave beam. In certain embodiments, for example, forming the transmission pathway may comprise forming conductive and/or ionic particles. In certain embodiments, for example, deposited energy may comprise one or more energy sources, for example one energy source, two energy sources, three energy sources, or four energy sources. In certain embodiments, for example, the deposited energy may comprise one or more of forms of energy comprising electromagnetic radiation, for example xrays, ultraviolet rays, visible light, infrared rays, microwaves, and radio waves; an RF plasma discharge; an electrical current; an electron beam; a particle beam; a charged particle beam: an electric discharge; a corona discharge, and/or combinations thereof. In certain further embodiments, for example, the electromagnetic radiation may comprise at least one laser beam. In certain further embodiments, for example, the first energy source, second energy source, and/or third energy source may comprise at least one directed energy beam. In certain further embodiments, for example, the electromagnetic radiation may comprise at least one laser beam. In certain further embodiments, for example, the one or more energy sources may comprise at least one directed energy beam. In certain embodiments, for example, the deposited energy may comprise at least one different form of energy than the one or more energy sources used to form the transmission pathway. In certain embodiments, for example, the deposited energy may comprise at least one common form of energy than the one or more energy sources used to form the transmission pathway. In certain embodiments, for example, the deposited energy may be deposited in one or more pulses, a series of pulses, a series of ultrashort pulses, sporadic pulses, random pulses, a deposition approaching a continuous deposition, or as a continous deposition of energy. In certain embodiments, the energy deposition may comprise at least one pulse, for example a plurality of pulses, lasting for a time in the range of 1 attosecond to 1 femtosecond, for example in the range of 100 attoseconds to 1 femtosecond. In certain embodiments, the energy deposition may comprise at least one pulse, for example a plurality of pulses, lasting for a time in the range of 1 femtosecond and 100 nanoseconds, for example a time lasting in the range of 10 femtoseconds to 20 picoseconds, 100 femtoseconds to 25 picoseconds, 100 picoseconds to 20 nanoseconds, or a time lasting in the range of 100 femtoseconds to 30 picoseconds. In certain embodiments, the energy deposition may comprise at least one pulse, for example a plurality of pulses, lasting for a time in the range of 100 nanoseconds to 1 microsecond, for example a time lasting in the range of 500 nanoseconds to 1 microsecond. In certain embodiments, the energy deposition may comprise at least one pulse, for example a plurality of pulses, lasting for a time in the range of 1 microsecond to 10 seconds, for example a time in the range of 10 microseconds to 1 second, or a time in the range of 100 microseconds to 500 microseconds. In certain embodiments, the energy deposition may comprise at least one pulse, for example a plurality of pulses, lasting for a time in the range of 10 seconds to 1 minute, for example a time in the range of 20 seconds to 40 seconds. In certain embodiments, for example, the energy deposition and the emission of the one or more energy sources to form the transmission pathway may occur on different time scales. In certain embodiments, for example, the energy deposition and the emission of the one or more energy sources to form the transmission pathway may occur on the same time scale or nearly the same time scale. In certain embodiments, for example, the energy deposition may occur on a faster time scale than the emission of the one or more energy sources to form the transmission pathway. In certain embodiments, for example, the energy deposition may occur on a slower time scale than the emission of the one or more energy sources to form the transmission pathway.

Certain embodiments may provide, for example, a method of propelling a vehicle (for example, a transportation vehicle, a delivery vehicle, a cargo plane, supersonic vehicle, hypersonic vehicle, or a high altitude vehicle) through the atmosphere, the method comprising: i) heating a portion of the atmosphere in front of and/or alongside the vehicle to form a low density region, comprising: a) forming an initiating region in front of the vehicle, said initiating region configured to couple with and absorb an energy deposition; and b) depositing energy in the initiating region to form the low density region; ii) directing at least a portion of the object into the low density region; synchronized with iii) detonating a reactant in a pulsed propulsion unit propelling the vehicle.

In certain embodiments, for example, one or more than one (including for instance all) of the following embodiments may comprise each of the other embodiments or parts thereof. In certain embodiments, for example, the initiating region may be in contact with the vehicle. In certain embodiments, for example, the initiating region may not be in contact with the vehicle, for example the initiating region may be position in front of the vehicle in the direction of motion. In certain embodiments, for example, the initiating region may be formed up to 4 seconds in advance of the propelled vehicle, for example up to 3 seconds, 1 second, 500 milliseconds, 10 milliseconds, or 1 milliseconds in advance of the vehicle. In certain embodiments, for example, the initiating region may be formed in the range of 1 millisecond to 4 seconds in advance of the propelled vehicle, for example 10 milliseconds to 3 seconds, 50 milliseconds to 1 second, or may be formed in the range of 100 milliseconds to 500 milliseconds in advance of the propelled vehicle. In certain embodiments, for example, the heated portion of the atmosphere may be formed up to 4 seconds in advance of the propelled vehicle, for example up to 3 seconds, 1 second, 500 milliseconds, 10 milliseconds, or 1 milliseconds in advance of the vehicle. In certain embodiments, for example, the heated portion of the atmosphere may be formed in the range of 1 millisecond to 4 seconds in advance of the propelled vehicle, for example 10 milliseconds to 3 seconds, 50 milliseconds to 1 second, or may be formed in the range of 100 milliseconds to 500 milliseconds in advance of the propelled vehicle. In certain embodiments, for example, forming the initiating region may comprise forming conductive and/or ionic particles. In certain embodiments, for example, the method may further comprise: selecting at least one form of energy for emission to form the initiating region as a function of the altitude of the vehicle. In certain further embodiments, for example, the selected at least one form of energy for emission may comprise a laser beam when the vehicle is traveling below a predetermined threshold altitude. In certain further embodiments, for example, the selected at least one form of energy for emission may comprise an electron beam when the vehicle is traveling at or above a predetermined threshold altitude. In certain embodiments, for example, the method may further comprise: selecting at least one form of energy for deposition in the initiating region to form the low density region. In certain further embodiments, for example, the selected at least one form of energy for deposition may comprise an electric discharge when the vehicle is traveling at below a predetermined threshold speed. In certain further embodiments, for example, the selected at least one form of energy for deposition may comprise microwave energy when the vehicle is traveling at or above a predetermined threshold speed. In certain embodiments, for example, the method may further comprise: repeating steps (i)-(iii) at a rate in the range of 0.1 Hz-100 kHz, for example repeating steps (i)-(ii) at a rate in the range of 1 Hz-80 kHz, 10 Hz-50 kHz, 100 Hz-20 kHz, 1-10 kHz, 5-10 kHz, or repeating steps (i)-(iii) at a rate in the range of 10-30 kHz. In certain embodiments, for example, forming the initiating region may comprise emitting one or more energy sources, for example one energy source, two energy sources, three energy sources, or four energy sources. In certain embodiments, for example, the one or more emitted energy sources may be selected from the group consisting of: electromagnetic radiation, for example xrays, ultraviolet rays, visible light, infrared rays, microwaves, and radio waves; an RF plasma discharge; an electrical current; an electron beam; a particle beam; a charged particle beam; an electric discharge; and a corona discharge. In certain further embodiments, for example, the electromagnetic radiation may be at least one laser beam. In certain further embodiments, for example, the first energy source, second energy source, and/or third energy source may comprise at least one directed energy beam. In certain further embodiments, for example, the electromagnetic radiation may comprise at least one laser beam. In certain further embodiments, for example, the one or more energy sources may comprise at least one directed energy beam. In certain embodiments, for example, forming the initiating region comprises emitting a laser beam and an electron beam. In certain further embodiments, for example, the laser beam and the electron beam may be emitted simultaneously. In certain further embodiments, for example, the laser beam and the electron beam may be emitted sequentially. In certain embodiments, for example, emitting the one or more energy sources to form the initiating region may comprise emitting one or more pulses, a series of pulses, a series of ultrashort pulses, sporadic pulses, random pulses, an emission approaching a continuous emission, as a continuous emission of energy. In certain embodiments, emitting the one or more energy sources to form the initiating region may comprise at least one pulse, for example a plurality of pulses, lasting for a time in the range of 1 attosecond to 1 femtosecond, for example in the range of 100 attoseconds to 1 femtosecond. In certain embodiments, emitting the one or more energy sources to form the initiating region may comprise at least one pulse, for example a plurality of pulses, lasting for a time in the range of 1 femtosecond and 100 nanoseconds, for example a time lasting in the range of 10 femtoseconds to 20 picoseconds, 100 femtoseconds to 25 picoseconds, 100 picoseconds to 20 nanoseconds, or a time lasting in the range of 100 femtoseconds to 30 picoseconds. In certain embodiments, emitting the one or more energy sources to form the initiating region may comprise at least one pulse, for example a plurality of pulses, lasting for a time in the range of 100 nanoseconds to 1 microsecond, for example a time lasting in the range of 500 nanoseconds to 1 microsecond. In certain embodiments, emitting the one or more energy sources to form the initiating region may comprise at least one pulse, for example a plurality of pulses, lasting for a time in the range of 1 microsecond to 10 seconds, for example a time in the range of 10 microseconds to 1 second, or a time in the range of 100 microseconds to 500 microseconds. In certain embodiments, emitting the one or more energy sources to form the initiating region may comprise at least one pulse, for example a plurality of pulses, lasting for a time in the range of 10 seconds to 1 minute, for example a time in the range of 20 seconds to 40 seconds. In certain embodiments, for example, deposited energy may comprise one or more energy sources, for example one energy source, two energy sources, three energy sources, or four energy sources. In certain embodiments, for example, the deposited energy may comprise one or more of forms of energy selected from the group consisting of: electromagnetic radiation, for example xrays, ultraviolet rays, visible light, infrared rays, microwaves, and radio waves; an RF plasma discharge; an electrical current; an electron beam; a particle beam; a charged particle beam; an electric discharge; and a corona discharge. In certain further embodiments, for example, the electromagnetic radiation may be at least one laser beam. In certain further embodiments, for example, the first energy source, second energy source, and/or third energy source may comprise at least one directed energy beam. In certain further embodiments, for example, the electromagnetic radiation may comprise at least one laser beam. In certain further embodiments, for example, the one or more energy sources may comprise at least one directed energy beam. In certain embodiments, for example, the deposited energy may comprise at least one different form of energy than the one or more energy sources used to form the initiating region. In certain embodiments, for example, the deposited energy may comprise at least one common form of energy than the one or more energy sources used to form the initiating region. In certain embodiments, for example, the deposited energy may be deposited in one or more pulses, a series of pulses, a series of ultrashort pulses, sporadic pulses, random pulses, a deposition approaching a continuous deposition, or as a continous deposition of energy. In certain embodiments, the energy deposition may comprise at least one pulse, for example a plurality of pulses, lasting for a time in the range of 1 attosecond to 1 femtosecond, for example in the range of 100 attoseconds to 1 femtosecond. In certain embodiments, the energy deposition may comprise at least one pulse, for example a plurality of pulses, lasting for a time in the range of 1 femtosecond and 100 nanoseconds, for example a time lasting in the range of 10 femtoseconds to 20 picoseconds, 100 femtoseconds to 25 picoseconds, 100 picoseconds to 20 nanoseconds, or a time lasting in the range of 100 femtoseconds to 30 picoseconds. In certain embodiments, the energy deposition may comprise at least one pulse, for example a plurality of pulses, lasting for a time in the range of 100 nanoseconds to 1 microsecond, for example a time lasting in the range of 500 nanoseconds to 1 microsecond. In certain embodiments, the energy deposition may comprise at least one pulse, for example a plurality of pulses, lasting for a time in the range of 1 microsecond to 10 seconds, for example a time in the range of 10 microseconds to 1 second, or a time in the range of 100 microseconds to 500 microseconds. In certain embodiments, the energy deposition may comprise at least one pulse, for example a plurality of pulses, lasting for a time in the range of 10 seconds to 1 minute, for example a time in the range of 20 seconds to 40 seconds. In certain embodiments, for example, the energy deposition and the emission of the one or more energy sources to form the initiating region may occur on different time scales. In certain embodiments, for example, the energy deposition and the emission of the one or more energy sources to form the initiating region may occur on the same time scale or nearly the same time scale. In certain embodiments, for example, the energy deposition may occur on a faster time scale than the emission of the one or more energy sources to form the initiating region. In certain embodiments, for example, the energy deposition may occur on a slower time scale than the emission of the one or more energy sources to form the initiating region.

In certain embodiments, for example, a particular laser assembly may not be effective, or may have reduced effectiveness, to form a pathway for energy deposition in a fluid, for example the laser assembly may not be effective when the fluid has less than a threshold pressure and/or density, and/or when a vehicle is operating above a threshold velocity and/or altitude. In certain further embodiments, for example, a particle beam, for example an electron beam, alone or in combination with another energy source such as a laser beam, may be employed to form a pathway for energy deposition when a particular laser configuration is not completely effective. In certain embodiments, an apparatus, for example a vehicle, may comprise a sensor to detect the reduced effectiveness, and the apparatus may further comprise a controller configured to switch from use of the laser configuration to use of an electron beam (or a combination of energy sources) to increase effectiveness of pathway formation.

Certain embodiments may provide, for example, a method of propelling a ground vehicle (for example a train, magnetic levitation, high-speed train, a bullet train, and hyper-loop train) coupled to a track assembly, the method comprising: i) accumulating a store of electrical energy on board the ground vehicle; ii) impulsively discharging at least a portion of the electrical energy from the ground vehicle to a conducting portion of a track assembly, said portion positioned in front of the fuselage of the ground vehicle, whereby a portion of air in proximity with the discharged electrical energy expands to form a lower density region surrounded by a higher density region; iii) directing at least a portion of the object into the lower density region; synchronized with iv) detonating a reactant in a pulsed propulsion unit propelling the object. In certain embodiments, one or more than one (including for instance all) of the following embodiments may comprise each of the other embodiments or parts thereof. In certain embodiments, for example, the electrical energy store may be impulsively to the ground vehicle from one or more booster sub-assemblies of the track assembly. In certain embodiments, for example, the ground vehicle may be magnetically levitated.

Certain embodiments may provide, for example, a ground vehicle transportation system (for example a train, magnetic levitation, high-speed train, a bullet train, and hyper-loop train), comprising: i) a track assembly comprising: a) a track; b) an electrical supply; ii) a storage device, for example a capacitor, configured to receive and store a portion of the electrical supply; iii) a laser configured to generate at least one path, said path connecting one or more electrodes present on a fuselage of the ground vehicle with a portion of the track assembly, said portion of the track assembly positioned in front of the vehicle; iv) a directed energy deposition device configured to deposit a portion of the stored electrical supply along the at least one path; and v) a controller configured to synchronize receipt of the portion of the electrical supply, generation of the at least one path, and deposition of the portion of store electrical supply.

Certain embodiments may provide, for example, a method of retrofitting a ground vehicle (for example a train, magnetic levitation, high-speed train, a bullet train, hyper-loop train, high-speed passenger vehicle, and automobile) to reduce drag, comprising: installing a directed energy deposition sub-assembly, said sub-assembly configured to receive energy from a power supply of the ground vehicle and to deposit said energy on a path connecting a fuselage of the vehicle with a ground coordinate positioned in front of the fuselage.

Certain embodiments may provide, for example, a method of propelling an object in a barrel (for example, a barrel associated with a firearm, and a rail gun) containing a fluid, the method comprising: i) heating at least a portion of the fluid; ii) discharging at least a fraction of the fluid from the barrel to form a low density region in the barrel; followed by iii) igniting and/or detonating a reactant proximate the object.

In certain embodiments, one or more than one (including for instance all) of the following embodiments may comprise each of the other embodiments or parts thereof. In certain embodiments, for example, the reactant may be an explosive charge and/or a propellant (for example, a chemical propellant). In certain embodiments, for example, the reactant may be attached to the object. In certain embodiments, for example, the fluid may be air. In certain embodiments, for example, the at least a portion of the fluid may be heated by an electrical discharge, for example by electrical arcing between two electrodes (for example, insulated electrodes) positioned in, along or near the bore of the barrel. In certain embodiments, for example, the at least a portion of the fluid may be heated by igniting a chemical reactant. In certain embodiments, the chemical reactant may be attached to or positioned with the object. In certain embodiments, the chemical reactant may be ignited by an electrical pulse. In certain embodiments, the electrical pulse may be supplied by the object. In certain embodiments, the electrical pulse may be supplied by a piezoelectric generator. In certain embodiments, for example, the fluid may be a gas. In certain embodiments, for example, the fluid may be air. In certain embodiments, the fluid may be a liquid. In certain embodiments, the fluid may be compressible. In certain embodiments, the fluid may be incompressible. In certain embodiments, the heated portion of the fluid may be heated to undergo a phase change. In certain embodiments, for example, the portion of the fluid may be heated by igniting and/or detonating a chemical reactant, for example by an electrical pulse. In certain embodiments, the electrical pulse may be supplied by the object, for example by a mechanism partially or fully contained within the object. In certain embodiments, the electrical pulse may be supplied by a piezoelectric generator, for example a piezoelectric generator partially or fully contained within the object. In certain embodiments, for example, the object a projectile, for example a bullet. In certain embodiments, for example, the barrel may be a component of a firearm, or a component of a rail gun. In certain embodiments, for example, the heating may reduce the viscosity of the heated portion of fluid. In certain embodiments, for example, the at least a portion of the fluid may be heated by an electrical discharge having an energy in the range of 5-120 J, for example an energy in the range of 10-100 J, 10-30 J, 25-75 J, or an energy in the range of 25-50 J. In certain embodiments, for example, the method may further comprise discharging the object from the barrel. In certain embodiments, the object may be a projectile. In certain embodiments, the barrel may be a component, for example a component of a rail gun. In certain embodiments, for example, the magnitude of the acoustic signature generated may be at least 10% less, for example between 10% and 50% less, at least 25%, 50% or at least 75% less acoustic signature than that of a conventional 0.30-06 rifle, a conventional 300 magnum rifle, a jet engine at take-off, and/or an M2 Howitzer. In certain embodiments, for example, the magnitude of the acoustic signature generated may be less than 300 dB, for example, between 50 dB and 150 dB, less than 250 dB, 200 dB, 175 dB, 150 dB, or less than 125 dB.

Certain embodiments may provide, for example, a method for delivering a projectile, comprising: i) a barrel, said barrel comprising a breech capable of operably accepting the projectile into a bore of the barrel; ii) a barrel clearing system, said barrel clearing system comprising: a pulse heating system positioned within and/or proximate the bore, said pulse heating system configured to discharge a portion of a fluid present in the bore; and iii) a projectile firing system.

In certain embodiments, one or more than one (including for instance all) of the following embodiments may comprise each of the other embodiments or parts thereof. In certain embodiments, for example, the pulse heating system may be positioned proximate the breech. In certain embodiments, for example, the pulse heating system may further comprise a chemical propellant. In certain embodiments, chemical propellant may be integral to the projectile and/or to a cartridge containing the projectile. In certain embodiments, for example, the pulse heating system may further comprise a pulse electrical discharge generator that may be configured to deposit energy along at least one path in the bore. In certain embodiments, the pulse heating system may further comprise a pulse filamentation laser that may be configured to generate the at least one path. In certain embodiments, the pulse filamentation laser may be powered by a chemical propellant proximate the projectile and/or integral to a cartridge containing the projectile. In certain embodiments, the pulse filamentation laser may be integral to the projectile and/or to a cartridge containing the projectile.

Certain embodiments, for example, may further comprise a synchronizing controller that may be configured to control the relative timing of the operation of the barrel clearing system and the operation of the projectile firing system.

Certain embodiments may provide, for example, a method of retrofitting a projectile delivery system, comprising: installing a directed energy deposition sub-assembly, said sub-assembly configured to deposit energy into the bore of a barrel of the projectile delivery system.

Certain embodiments may provide, for example, a method of propelling a projectile through the bore of a barrel equipped with the barrel clearing system, comprising: i) operating the barrel clearing system to discharge a portion of the fluid from the bore; followed several milliseconds later by ii) initiating a projectile firing system.

Certain embodiments may provide, for example, a method of reducing the acoustic signature of a projectile by equipping the barrel with a clearing system.

Certain embodiments may provide, for example, a gun configured to breach a barrier (sometimes referred to as a breaching gun), for example a door, said gun comprising: i) a ported barrel, said barrel comprising a breech capable of operably accepting a shotgun cartridge into a bore of the barrel; ii) a barrel clearing system, said barrel clearing system comprising: a pulse heating system positioned within the bore, said pulse heating system configured to discharge at least a portion of a fluid present in the bore; and iii) a firing system.

Certain embodiments may provide, for example, a firearm cartridge configured for use in a breaching gun, comprising: i) a propellant proximate a rear portion of the barrel, said propellant also proximate at least one projectile; ii) a directed energy deposition device, for example a pre-propellant, positioned proximate the at least one projectile opposite the propellant, said directed energy deposition device configured to discharge at least 98% of a gas initially at atmospheric conditions from a barrel of the gun upon ignition of the pre-propellant; and iii) a firing system coupler configured to synchronize operation of the directed energy deposition device prior to detonation of the propellant. In certain embodiments, one or more than one (including for instance all) of the following embodiments may comprise each of the other embodiments or parts thereof. In certain embodiments, for example, the firing system coupler may further comprise a pre-propellant priming charge operably connected to a firing system of the gun.

Certain embodiments may provide, for example, a method to modify a shock wave approaching the undercarriage of a vehicle (for example, a military vehicle, armoured vehicle, a humvee, an armoured personnel vehicle, a passenger vehicle, a train, and/or a mine-sweeper) said vehicle in contact with a lower surface and present in a fluid, said method comprising: i) heating a portion of the fluid along at least one path to form at least one volume of heated fluid expanding outwardly from the path, said path running between the undercarriage and the lower surface; and ii) timing the heating to modify said shock wave.

In certain embodiments, one or more than one (including for instance all) of the following embodiments may comprise each of the other embodiments or parts thereof. In certain embodiments, for example, the total momentum imparted to the vehicle by the shock wave may be reduced by at least 10%, for example by at least 20%, 30%, 40%, or by at least 50%. In certain embodiments, for example, the average acceleration experienced by the vehicle as a result of the shock wave may be reduced by at least 40%, for example at least 50%, 60%, 70%, or at least 80%. In certain embodiments, for example, the portion of the fluid may be heated by an electrical discharge. In certain embodiments, for example, the portion of the fluid may be heated by depositing at least 3 P V units of energy, where P is the ambient pressure of the fluid and V is the volume of fluid present between the undercarriage and the lower surface.

Certain embodiments may provide, for example, a method to modify a blast wave approaching a surface, said method comprising: i) heating a portion of the surface to form at least one hole in the surface; and ii) timing the heating whereby the at least one hole is formed prior to the blast wave exiting the surface.

In certain embodiments, one or more than one (including for instance all) of the following embodiments may comprise each of the other embodiments or parts thereof. In certain embodiments, for example, the portion of the surface may be heated by deposition of energy onto the surface. In certain embodiments, for example, the amount of energy deposited onto the surface may be in the range of 1 kJ-10 MJ, for example in the range of 10 kJ-1 MJ, 100-750 kJ, or in the range of 200 kJ to 500 kJ. In certain embodiments, for example, the surface may be a pavement, a soil, and/or a covering present beneath the undercarriage of a vehicle. In certain embodiments, the portion of the surface may be heated by depositing, onto the surface, a quantity of energy in the range of 200-500 kJ per cubic meter of volume present between the undercarriage and the surface, for example in the range of 250-400 kJ, or in the range of 300-350 kJ. In certain embodiments, the blast wave may have an energy in the range of 100-500 MJ, for example in the range of 200-400 MJ. In certain embodiments, the deposited quantity of energy may reduce the energy transmitted from the blast wave to the vehicle by an amount of at least 10 times the deposited quantity of energy, for example at least 20 times, 50 times, 100 times, or at least 200 times the deposited quantity of energy. In certain embodiments, the net acceleration imparted to the vehicle as a result of the blast wave may be reduced by at least 10%, for example at least 20%, 30%, 40%, or at least 50%. In certain embodiments, the portion of the surface may be heated by an electrical emission from the vehicle.

Certain embodiments may provide, for example, a method to mitigate blast gases approaching the undercarriage of a vehicle (for example, a military vehicle, armoured vehicle, a humvee, an armoured personnel vehicle, a passenger vehicle, a train, and/or a mine-sweeper), said vehicle present in a fluid, said method comprising: i) heating a portion of the fluid along at least one path to form at least one low density channel, said path running from the undercarriage and up the outer exterior of the vehicle; and ii) timing the heating whereby the at least one low density channel receives at least a portion of the blast gases.

Certain embodiments may provide, for example, a vehicle equipped with a blast mitigation device, said blast mitigation device comprising: i) a sensor configured to detect an incipient blast wave beneath the undercarriage of the vehicle; ii) a directed energy deposition device configured to deposit energy along at least one path, said at least one path positioned beneath the undercarriage of the vehicle; and iii) a synchronizing controller configured to time the operation of the directed energy deposition device relative to the detection of the incipient blast wave. In certain embodiments, one or more than one (including for instance all) of the following embodiments may comprise each of the other embodiments or parts thereof. In certain embodiments, for example, said energy deposition may be configured to heat a portion of the fluid along the at least one path to form at least one volume of heated fluid expanding outwardly from the path. In certain embodiments, for example, said energy deposition may be configured to form at least one hole in a surface positioned beneath the undercarriage of the vehicle.

Certain embodiments may provide, for example, a vehicle (for example, a military vehicle, armoured vehicle, a humvee, an armoured personnel vehicle, a passenger vehicle, a train, and/or a mine-sweeper) equipped with a blast mitigation device, said blast mitigation device comprising: i) a sensor configured to detect an incipient blast wave beneath the undercarriage of the vehicle; ii) a directed energy deposition device configured to deposit energy along at least one path, said at least one path running from the undercarriage of the vehicle to an outer exterior of the vehicle; and iii) a synchronizing controller configured to time the operation of the directed energy deposition device relative to the detection of the incipient blast wave.

Certain embodiments may provide, for example, a method of mitigating a blast from an improvised explosive device with a vehicle (for example, a military vehicle, armoured vehicle, a humvee, an armoured personnel vehicle, a passenger vehicle, a train, and/or a mine-sweeper) equipped with a blast mitigation device. In certain embodiments, for example, the improvised explosive device may be buried.

Certain embodiments may provide, for example, a method of retrofitting a vehicle to withstand an explosion, comprising: installing a directed energy deposition sub-assembly, said sub-assembly configured to deposit energy beneath the undercarriage of the vehicle.

Certain embodiments may provide, for example, a method of supersonically depositing a spray onto a surface, the method comprising: i) directing at least one laser pulse through a fluid onto the surface to form at least one path through a fluid, said at least one path positioned between a supersonic spray nozzle and the surface; ii) discharging a quantity of electrical energy along the path to form a low density tube; followed several microseconds later by iii) discharging a powder, particulate and/or atomized or aerosolized material from the supersonic spray nozzle into the low density tube. In certain embodiments, one or more than one (including for instance all) of the following embodiments may comprise each of the other embodiments or parts thereof. In certain embodiments, for example, steps (i)-(iii) may be repeated at a rate in the range of 0.1 Hz-100 kHz, for example repeated at a rate in the range of 1 Hz-80 kHz, 10 Hz-50 kHz, 100 Hz-20 kHz, 1-10 kHz, 5-10 kHz, or repeated at a rate in the range of 10-30 kHz.

Certain embodiments may provide, for example, a spray deposition device, comprising: i) a nozzle configured to spray a particulate and/or atomized material onto a surface; ii) a pulse filamentation laser configured to generate at least one path, said path positioned between the nozzle and the surface; iii) a pulse electrical discharge generator configured to deposit energy along the at least one path to form a low density tube; and iv) a synchronizing controller configured to synchronize the relative timing of generating the at least one path, depositing energy, and spraying. In certain embodiments, one or more than one (including for instance all) of the following embodiments may comprise each of the other embodiments or parts thereof. In certain embodiments, for example, the spray may be a supersonic spray.

Certain embodiments may provide, for example, a method of physical vapor deposition with the spray deposition device. Certain embodiments, for example, may comprise depositing a metal powder onto a metal surface.

Certain embodiments may provide, for example, a method of abrasive blasting with the spray deposition device.

Certain embodiments may provide, for example, a method of retrofitting a supersonic spray apparatus, comprising: installing a directed energy deposition sub-assembly, said sub-assembly configured to deposit energy on a path connecting a nozzle of the spray apparatus and the surface.

Certain embodiments may provide, for example, a method of operating an intermittent weaving machine or loom (for example, an air jet weaving machine, water-jet weaving machine, shuttle looms, picks loom, and/or high-speed loom) to form a textile, said air jet weaving machine configured to receive a weft yarn and further configured to form a warp span, said method comprising: depositing energy to form a low density guide path for the weft yarn to pass through the span.

In certain embodiments, one or more than one (including for instance all) of the following embodiments may comprise each of the other embodiments or parts thereof. In certain embodiments, for example, depositing energy may comprise depositing in the range of 5-50 mJ per 10 cm of guide path per 1 mm diameter of weft yarn, for example in the range of 5-8 mJ, 8-10 mJ, 10-15 mJ, 15-20 mJ, 20-30 mJ, 30-40 mJ or in the range of 40-50 mJ, or at least 8 mJ, at least 20 mJ, or at least 40 mJ. In certain embodiments, for example, the weft yarn may have a diameter of in the range of 0.1-1 mm, for example a diameter in the range of 0.25-0.75 mm, or a diameter in the range of 0.5-0.7 mm, such as a diameter of 0.6 mm. In certain embodiments, for example, the weft yarn may travel through the guide path at a speed in the range of 100-500 m/s, for example at a speed in the range of 200-400 m/s, or at a speed of at least 200 m/s, for example at a speed of at least 250 m/s, 300 m/s, or at a speed of least 350 m/s. In certain embodiments, for example, the weft yarn may travel through the guide path at a speed in the range of greater than Mach 0.1, for example at a speed greater than Mach 0.3, Mach 0.8, Mach 1, or at a speed greater than Mach 1.5. In certain embodiments, for example, the textile may be formed at a rate in the range of between 500-60,000 picks per minute, for example 2000-50,000 picks per minute, 8,000-30,000 picks per minute, or at a rate in the range of 15,000-25,000 picks per minute. In certain embodiments, for example, the guide path may be cylindrical.

Certain embodiments, for example, may further comprise: propelling the weft yarn into the low density guide path with a burst of high pressure air. In certain embodiments, the burst of high pressure air may be synchronized with the energy deposition, In certain embodiments, the low density guide path may be formed downstream of the burst of high pressure air.

In certain embodiments, one or more than one (including for instance all) of the following embodiments may comprise each of the other embodiments or parts thereof. In certain embodiments, for example, a further portion of energy may be deposited downstream of a booster air supply to form a further low density guide path. In certain embodiments, for example, the weft yarn may be moistened with a quantity of water. In certain embodiments, at least a portion of the quantity of water may be vaporized in the low density guide path.

Certain embodiments may provide, for example, a weaving machine (for example, an air jet weaving machine, an intermittent air jet weaving machine, water-jet weaving machine, shuttle looms, picks loom, and/or high-speed loom), air jet weaving machine configured to form a textile, said machine comprising: i) an apparatus comprising plurality of profile reeds mounted on a sley, said apparatus configured to form a warp shed; ii) a directed energy deposition assembly, said assembly configured to generate a low density guide path across the warp shed; and iii) a weft yarn nozzle in communication with a pressurized air supply, said weft yarn nozzle configured to propel a portion of a weft yearn through the low density guide path. In certain embodiments, one or more than one (including for instance all) of the following embodiments may comprise each of the other embodiments or parts thereof. In certain embodiments, for example, the warp shed may be in the range of 3-30 m in length, for example in the range of 4-4.5 m, 4.5-6 m, 6-8 m, 8-10 m, 5-25 m, or in the range of 10-20 m in length.

Certain embodiments may provide, for example, a method of retrofitting a weaving machine (for example, an air jet weaving machine, water-jet weaving machine, shuttle looms, picks loom, and/or high-speed loom), comprising: installing a directed energy deposition sub-assembly, said sub-assembly configured to deposit energy on a path connecting a yarn dispensing nozzle of the loom with an electrode positioned on the opposite side of the loom and passing through the profiles of a plurality of reeds.

DETAILED DESCRIPTION OF THE DRAWINGS

Figure 1B:
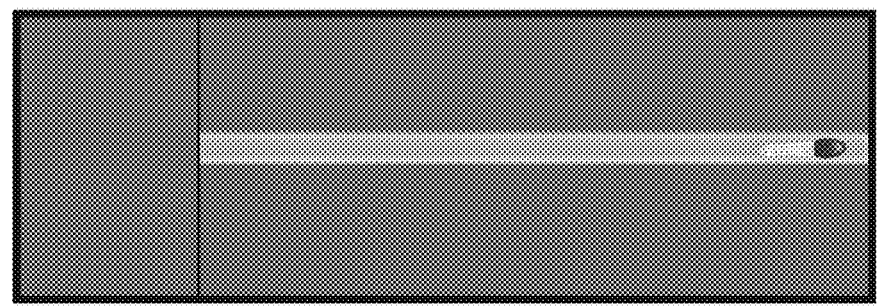

FIGS. 1A and 1B. A schematic cartoon contrasting (1A) the ineffectiveness of a bullet trying to propagate through water at high speed, compared to (1B) the same bullet propagating effortlessly, after the water has been laterally moved out of its way. In the brute force approach, the bullet's energy is very quickly transferred to the water (and material deformation). In our approach, the bullet propagates for a much longer distance, interacting with its surroundings through much weaker forces.

Figure 2A:
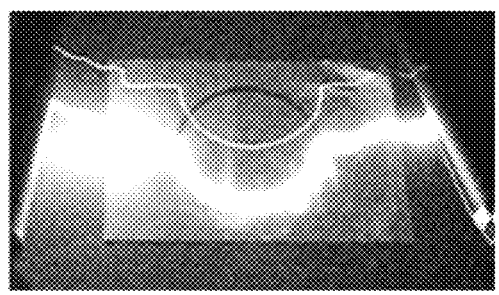
Figure 2B:
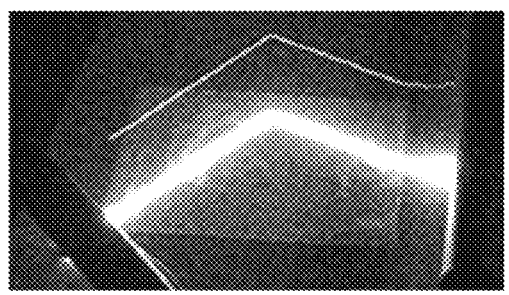

FIGS. 2A and 2B. Strong electric discharges can be used to deposit energy along arbitrary geometries on a surface, with examples depicted here of (2A) a semi-circular path and (2B) straight lines.

Figure 3A:
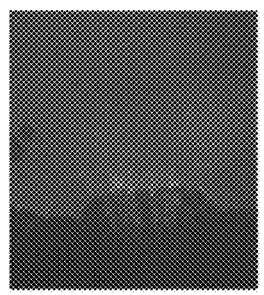
Figure 3B:
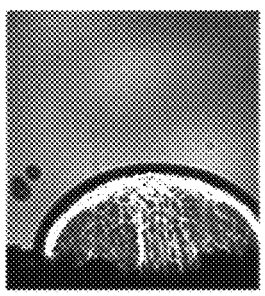
Figure 3C:
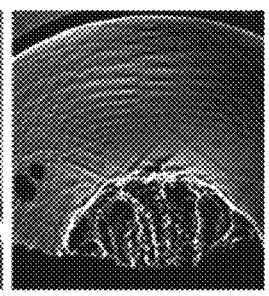

FIGS. 3A-3C. A time sequence of schlieren images which show a blast (supersonic shock) wave pushing open a region of hot, low-density gas (left (3A) and center (3B) images), as a result of energy being deposited along a with the shock wave propagating away at sonic speed after it has reduced in strength to Mach 1 (right image, (3C)), and can no longer drive/push open the low-density region.

Figure 4:
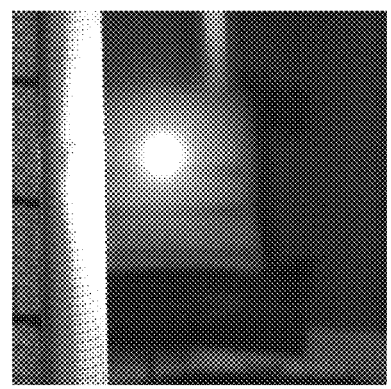

FIG. 4. Energy is deposited in the air, by focusing an intense laser pulse to a point in the air, with sufficient intensity to ionize the gas molecules, effectively instantaneously compared to the fluid response.

Figure 5:
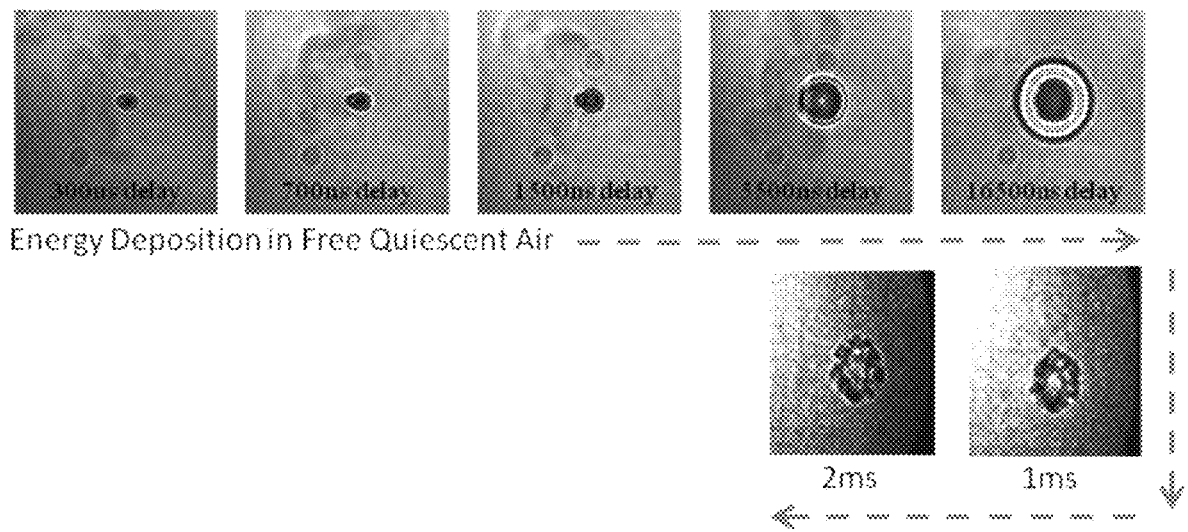

FIG. 5. Shadowgraph imagery demonstrates the blast wave from a laser "spark", such as the one shown in FIG. 4, driving open a region of low density gas, which stays behind for an extended period of time as a low-density region in the ambient gas.

FIG. 6. Laser filaments create straight ionized channels, along the path of an ultrashort laser pulse.

FIGS. 7A and 7B. Laser filaments from ultrashort laser pulses can be used to precisely trigger and guide electric discharges along their (7B) straight paths, vs (7A) the typically less controllable discharges in spatial and temporal terms.

Figure 8:
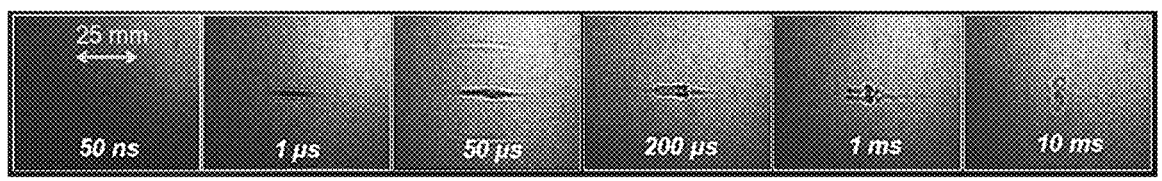

FIG. 8. A very small low-density "tube" is pictured here, to take the place of the much larger tubes.

Figure 9A:
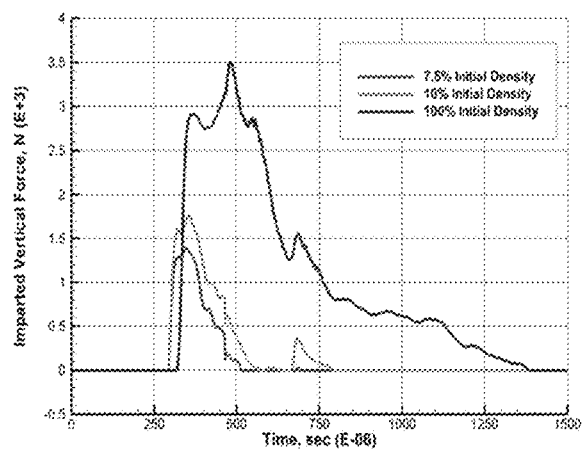
Figure 9B:
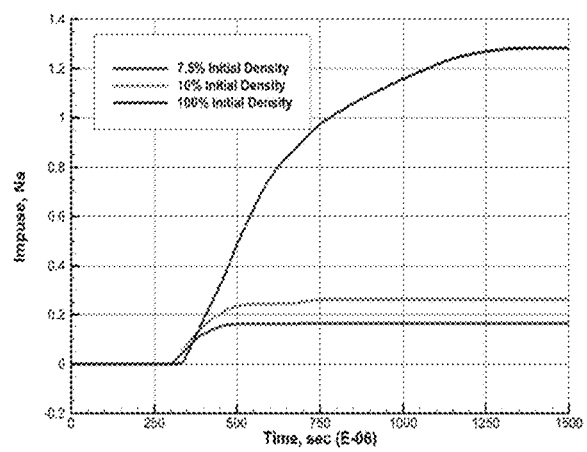

FIGS. 9A and 9B. (9A) Integrated force and (9B) impulse as a function of time, exerted by a blast underneath a test plate, with different initial densities underneath the vehicle (100%, 10%, and 7.5% of ambient density).

Figure 10:
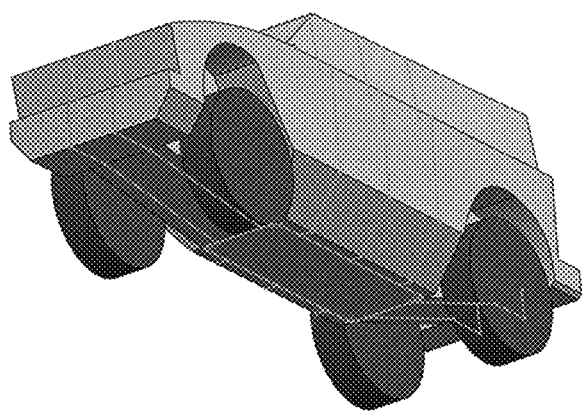

FIG. 10. Notional diagram of conductive paths along the surface of a vehicle to quickly channel high pressure gases out of the confined space beneath a land vehicle.

Figure 11:
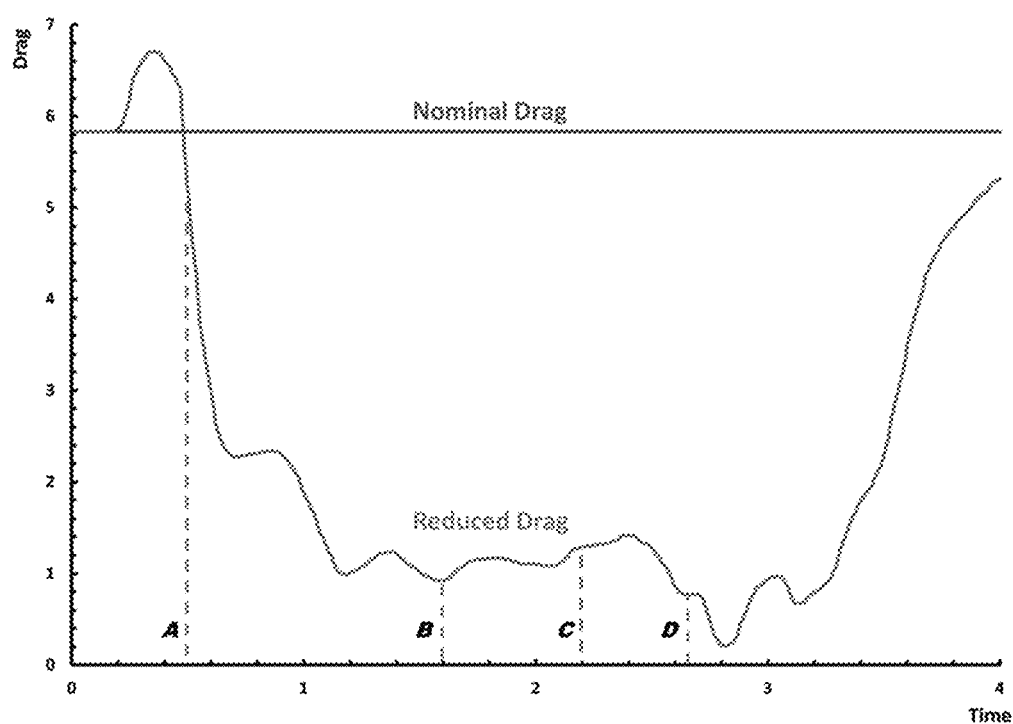

FIG. 11. The drag on a cone is significantly reduced when the cone travels through a low-density tube generated by depositing energy upstream, along the cone's stagnation line. The letters on the graph, correspond to the times marked by the vertical lines beside them, which correspond to the similarly labeled frames in FIG. 14.

Figure 12:
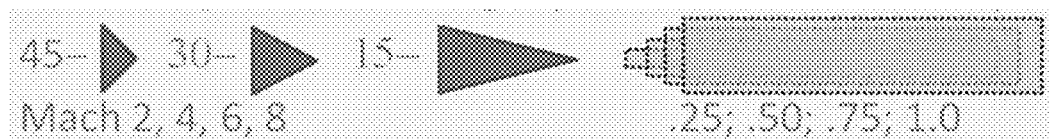

FIG. 12. The parameters varied for the study results shown in FIG. 13 include: four Mach numbers →=2,4,6,8; three cone half-angles→15°, 30°, 45°; and four low-density "tube" diameters→25%, 50%, 75%, and 100% of the cone's base diameter.

Figure 13:
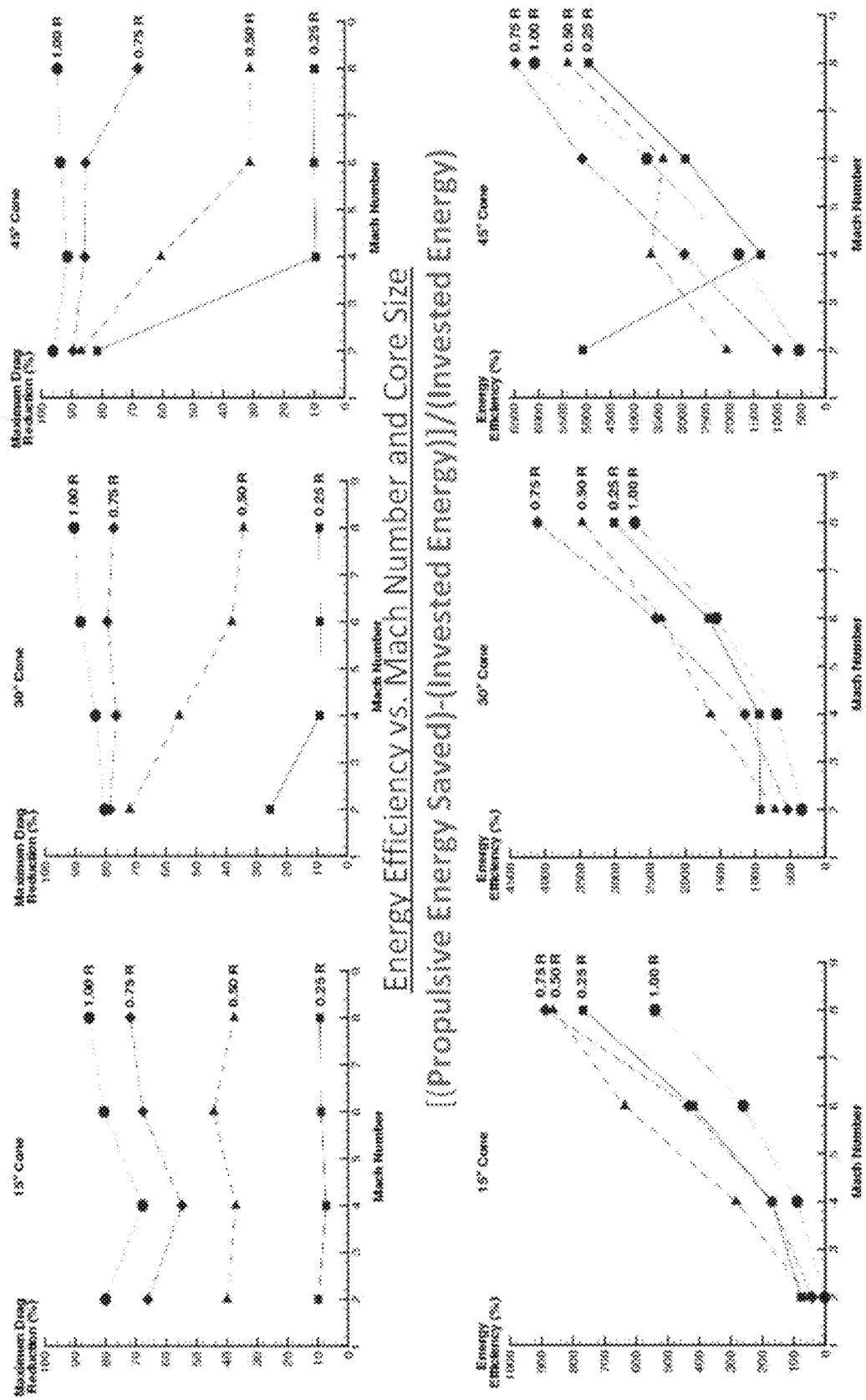

FIG. 13. Drag-reduction and return on invested energy is plotted for 15/30/45-degree cones propagating at Mach 2,4,6,8, through tubes with diameters of 25%, 50%, 75%, and 100% of the base diameter of the cone. In some cases, nearly all of the drag is removed, and in all cases, the energy required to open the "tubes" is less than the energy saved in drag-reduction, showing up to 65-fold return on the energy deposited ahead of the cone).

FIGS. 14A-14D. Density profiles, taken at times corresponding to the times marked in FIG. 11, showing the flow modification as a cone flies through a low-density "tube". The sequence from 14A to 14D demonstrates a strong reduction in bow shock (with its associated wave drag and sonic boom), as well as a strong re-pressurization of the base, indicating the removal of base-drag and increase in propulsive effectiveness of exhaust products at the base.

FIG. 15. An electrically conductive path 108 can be painted and directed in the air to allow the electric discharge required to control/modify the vehicle's shockwave(s).

Figure 16:
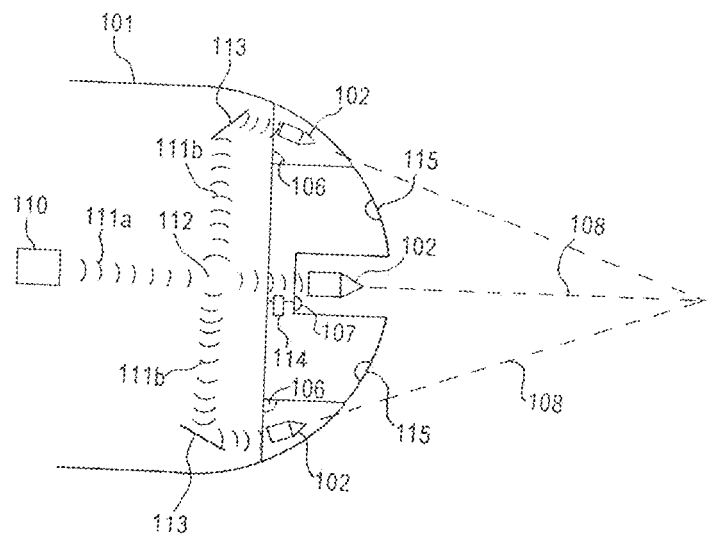

FIG. 16. A schematic of a laser pulse split through multiple electrically-isolated focusing/discharge devices.

Figure 17:
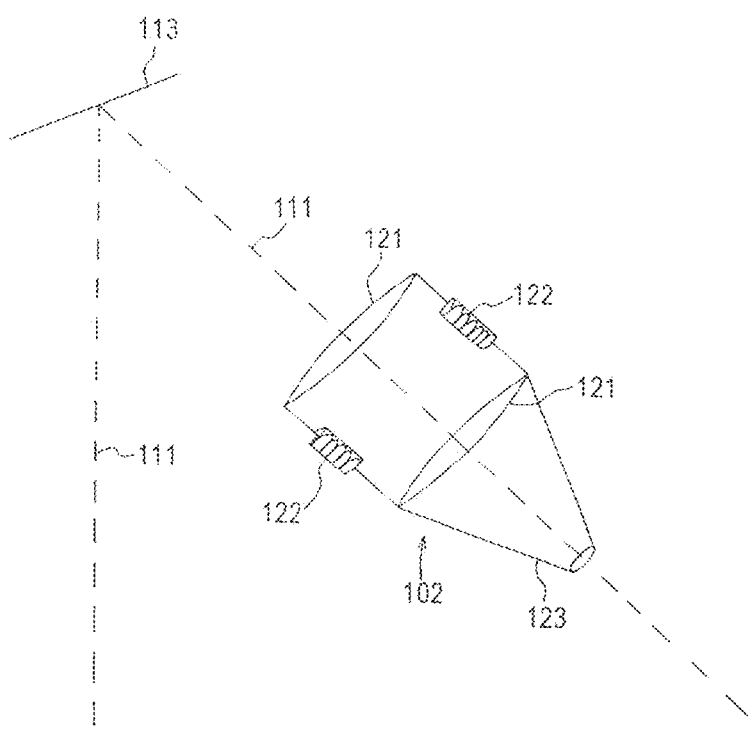

FIG. 17. A schematic showing the optical path/elements to focus the laser pulse through a conical-shell electrode (123).

FIG. 18. Schematic examples of how an array of discharge devices can be used to augment the energy deposition and create a much larger core by phasing a number of smaller discharges.

Figure 19:
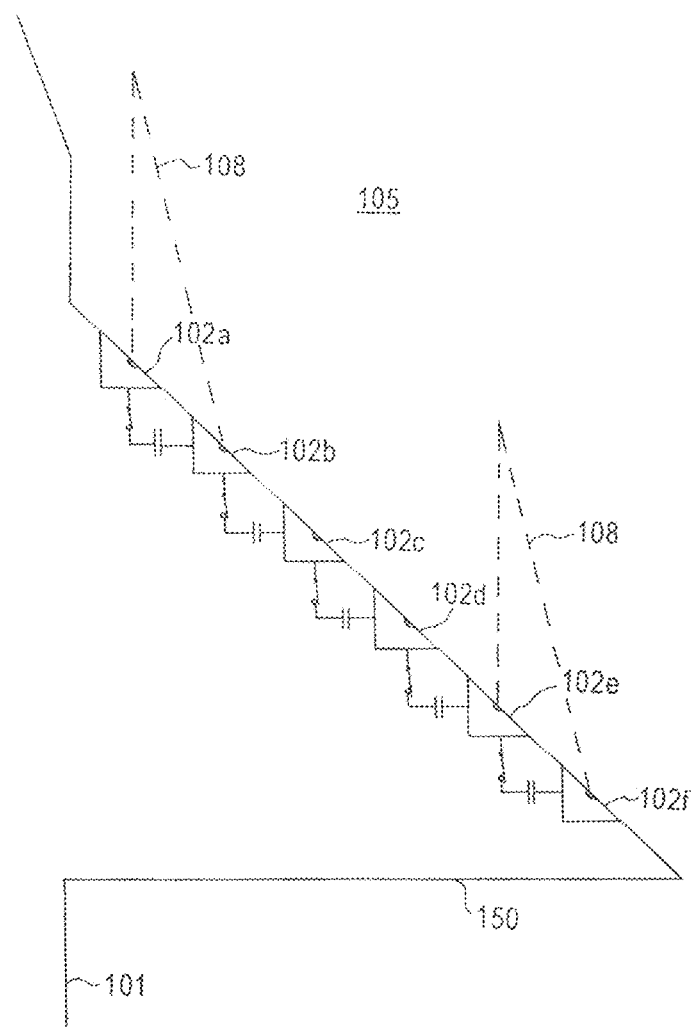

FIG. 19. A schematic example of how an array of discharge devices can be used to augment the energy deposition and "sweep" the flow in a desired direction by phasing a number of smaller discharges.

Figures 20A, 20B:
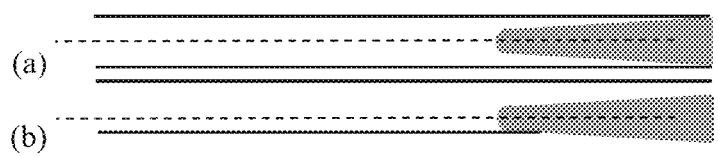

FIGS. 20A and 20B. In the 3-D runs, the initial core position is axi-symmetric with the vehicle (20a), yielding maximum drag-reduction and no lateral force or torque. The core is then gradually shifted upward as the run progresses, allowing a quasi-steady state value of control forces and torques to be monitored over this entire range of core positions. We characterized up to a shift of roughly ½ of the base radius (20b), FIG. 21 A-D. A frame of a test run using a standard cone to investigate the effects on heating, drag, and control forces when creating a hot low-density core ahead of a hypersonic vehicle's shock wave. (Top (20A)—density; Bottom left (20B)—pressure; Bottom right (20C)—temperature; Bottom right (20D)—drag, forces, and moments.)

Figure 22:
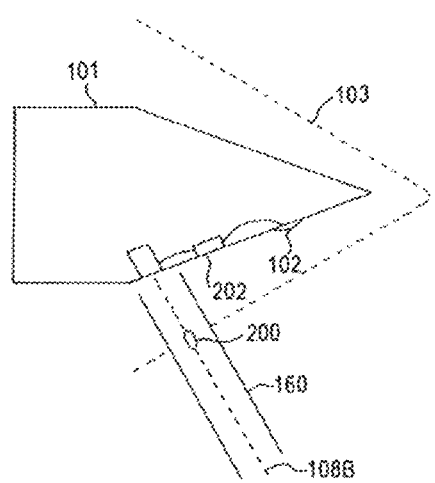
Figures 23A, 23B, 23C, 23D, 23E, 23F:
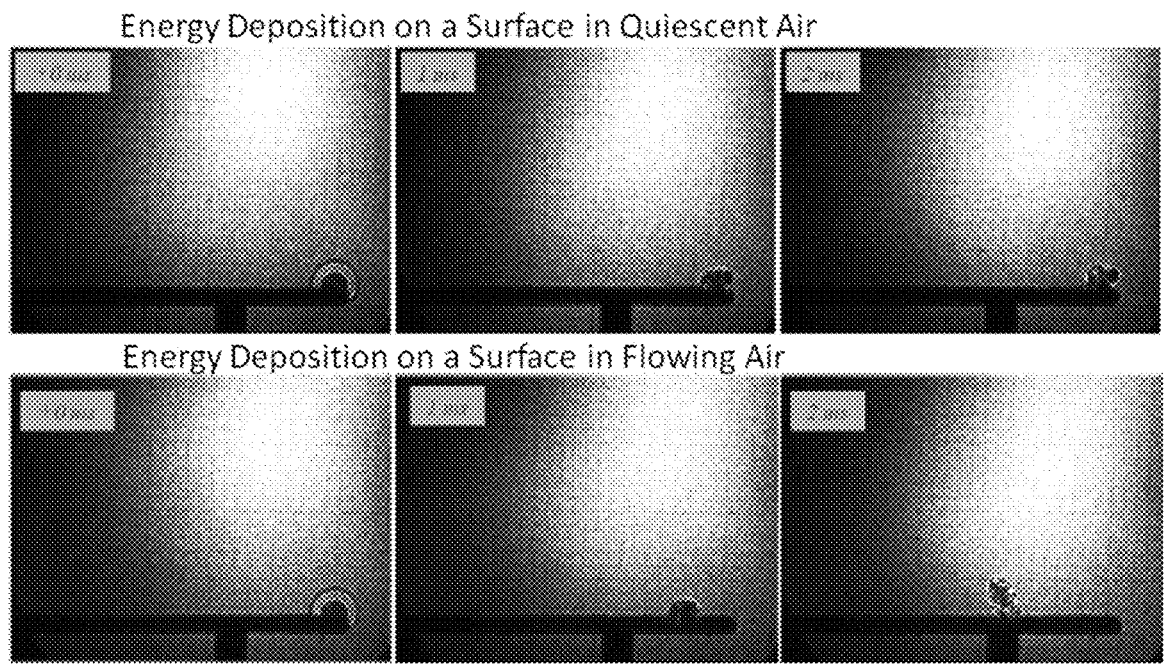
Figures 24A, 24B, 24C, 24D:
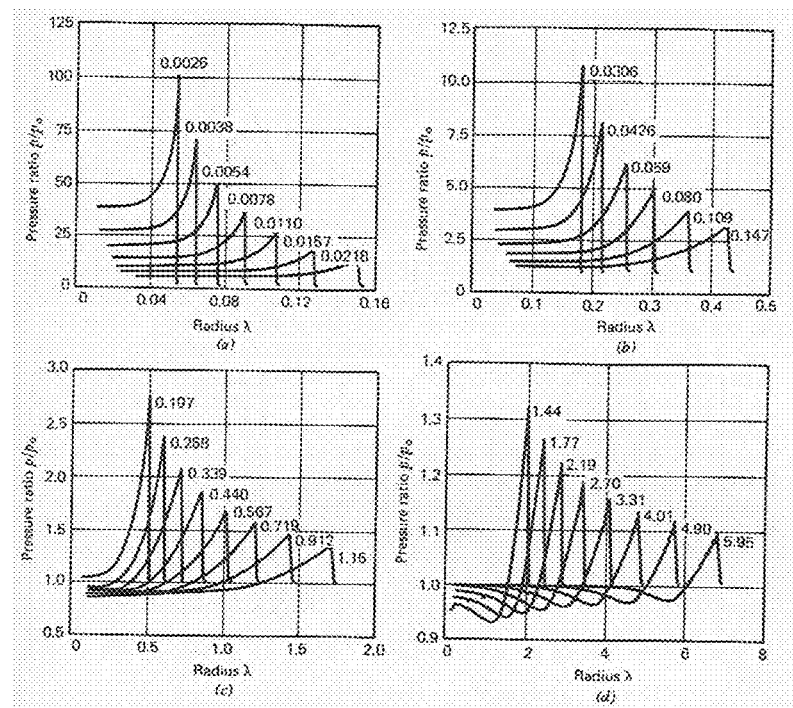
Figures 25A, 25B, 25C, 25D:
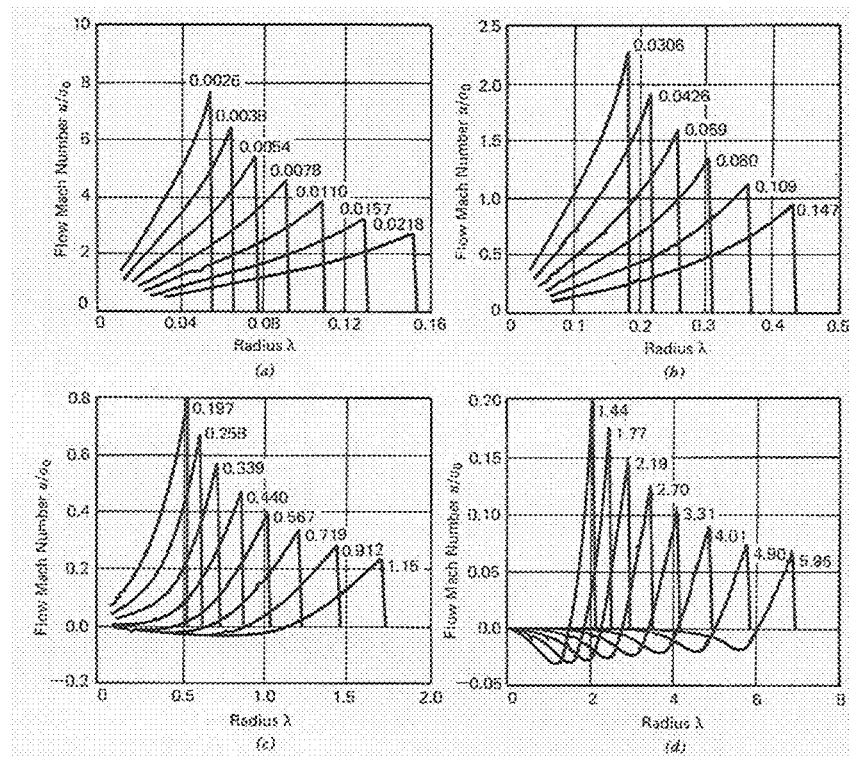
Figures 26A, 26B, 26C, 26D:
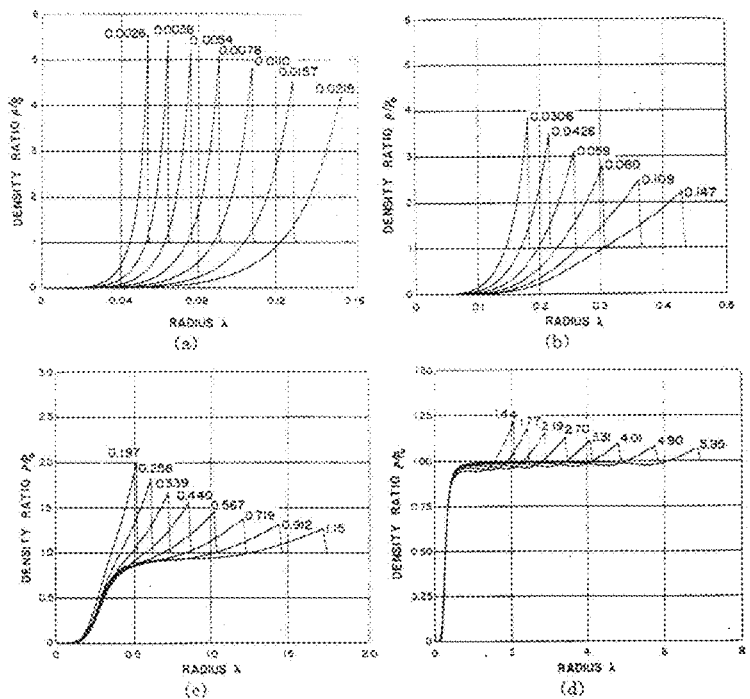

FIG. 22. A low-density tube can also be created from the side of a vehicle through an oblique shockwave to facilitate imaging and release of sub-vehicles without slowing the primary vehicle.

FIGS. 23A-F. Top row (left to right, 23A-C)—A shock wave opens up a low-density "half-sphere" on a surface in quiescent air, resulting from energy that was impulsively deposited using a laser pulse at a distance; Bottom row (left to right, 23D-F)—The same laser pulse is used to impulsively deposit energy and create a shock wave that opens up a similar low-density "half-sphere", which is shown being convected by air flowing along the same surface.

FIGS. 24A-D. Plots of relative pressure as a function of dimensionless radius for a cylindrical shock at different dimensionless times. The initial (undisturbed) gas pressure is $p_o$.

FIGS. 25A-D. Plots of flow Mach number as a function of dimensionless radius for a cylindrical shock at different dimensionless times. The sound velocity ahead of the shock is $a_o$.

FIGS. 26A-D. Plots of relative density as a function of dimensionless radius for a cylindrical shock at different dimensionless times The initial (undisturbed) gas density is $\square_o$.

Figures 27A, 27B, 27C:
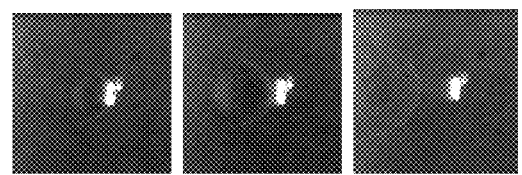

FIGS. 27A-C. Time sequenced (from left to right, 27 A-C) schlieren images of Nd:YAG laser discharge in Mach 3.45 flow. The laser incidence is from bottom to top and the spot remains visible, because the CCD pixels are saturated. The freestream flow direction is from right to left.

Figures 28A, 28B, 28C:
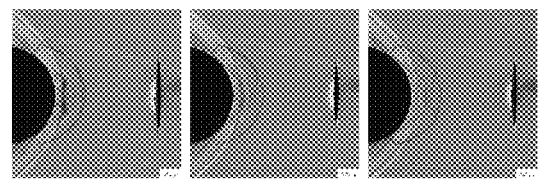

FIGS. 28A-C. Time-lapse schlieren photography of an expanding heated spot, as it flows to the left in a supersonic windtunnel to interact with the standing bow shock of a spherical model. The measured pressure baseline and instantaneous data along the sphere are also both depicted in this figure as a line around the sphere.

Figure 29:
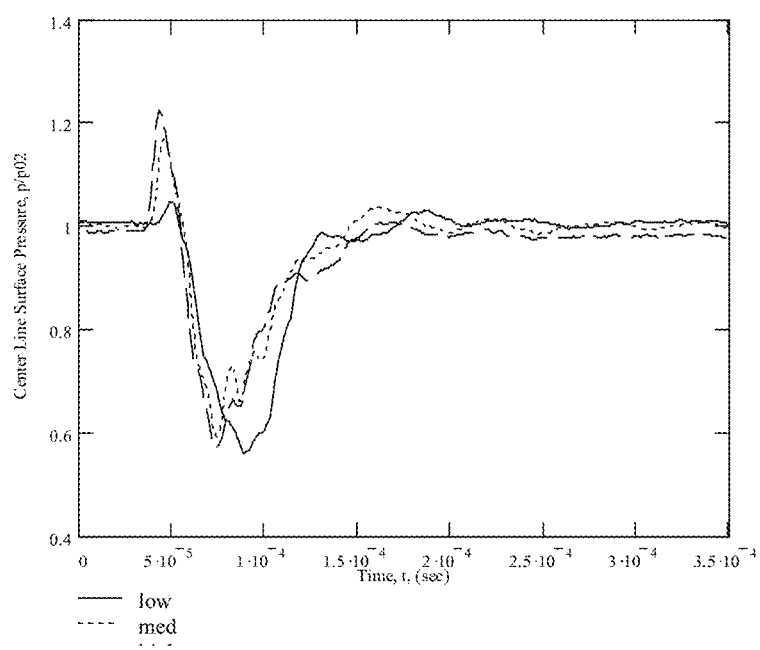

FIG. 29. Time history of the pressure at the model's stagnation point for three energy levels FIG. 30. Simulation results of filament diameter and electron concentration as a function of propagated distance, for an initial power of 49.5 MW. Significant photoionization is seen only to occur over short lengths for which the beam confinement is maximum.

Figure 31:
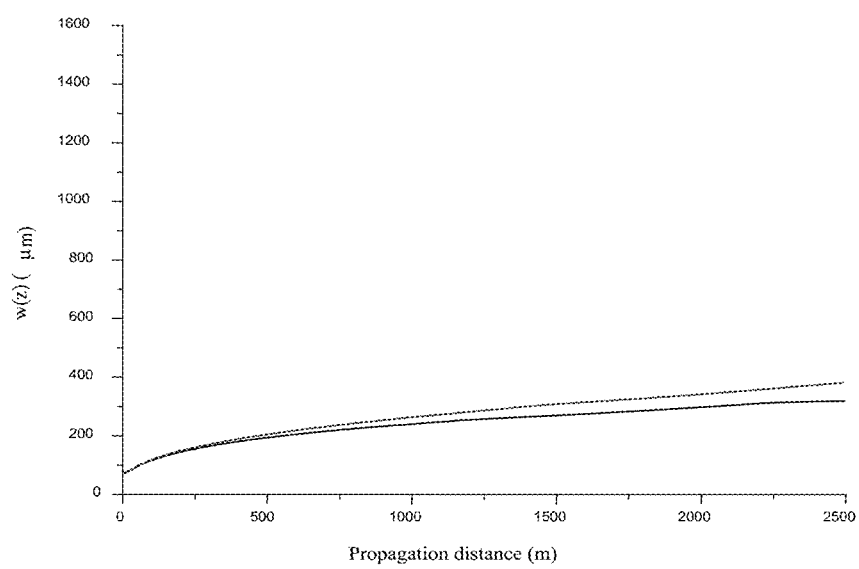

FIG. 31. Simulation results of filament envelope diameter as a function of propagated distance, for an initial power of 160 MW The filament diameter remains confined roughly within 100 microns over thousands of meters.

FIG. 32. A laser-initiated/guided electric discharge across 30 cm. The ionizing UV laser pulse is sent through the hole of the bottom electrode, through the hole of the top electrode.

Figures 34A, 34B:
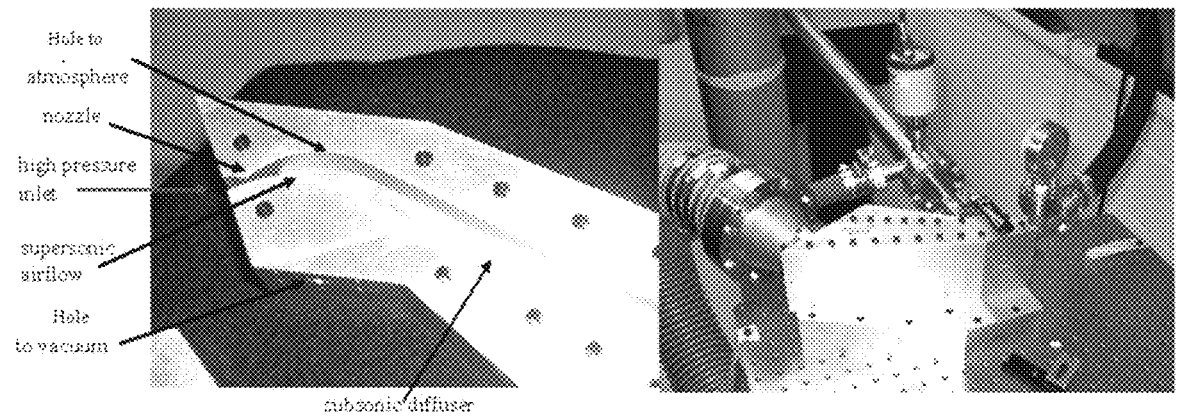

FIGS. 33A-D. FIG. 33A is a single laser-ionized path; FIG. 33B is an electric discharge following the path created by the laser-ionized path; FIG. 33C are two ionized paths, generated by two separate laser pulses; FIG. 33D is an electric discharge following the v-shaped path created by the two laser pulses FIGS. 34A and 34B. FIG. 34A is an aerowindow, designed under the supervision of Dr. Wilhelm Behrens, of the former TRW. FIG. 34B is the complete setup with high pressure inlet, aerowindow, vacuum tube and exhaust line.

Figure 35:
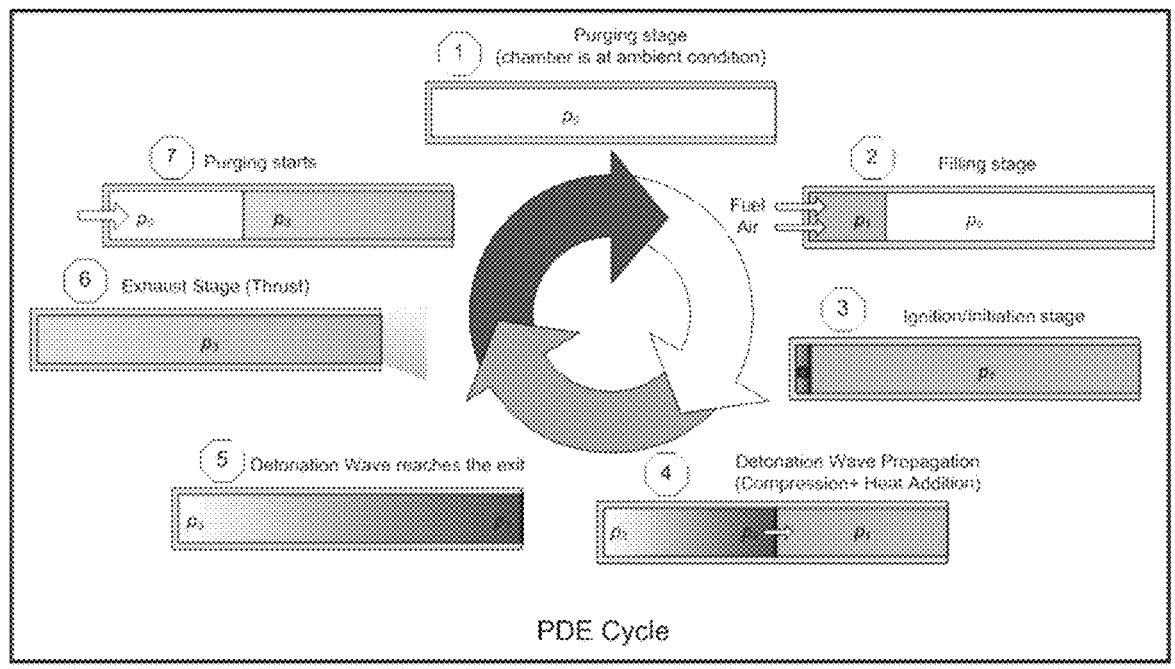
Figure 36:
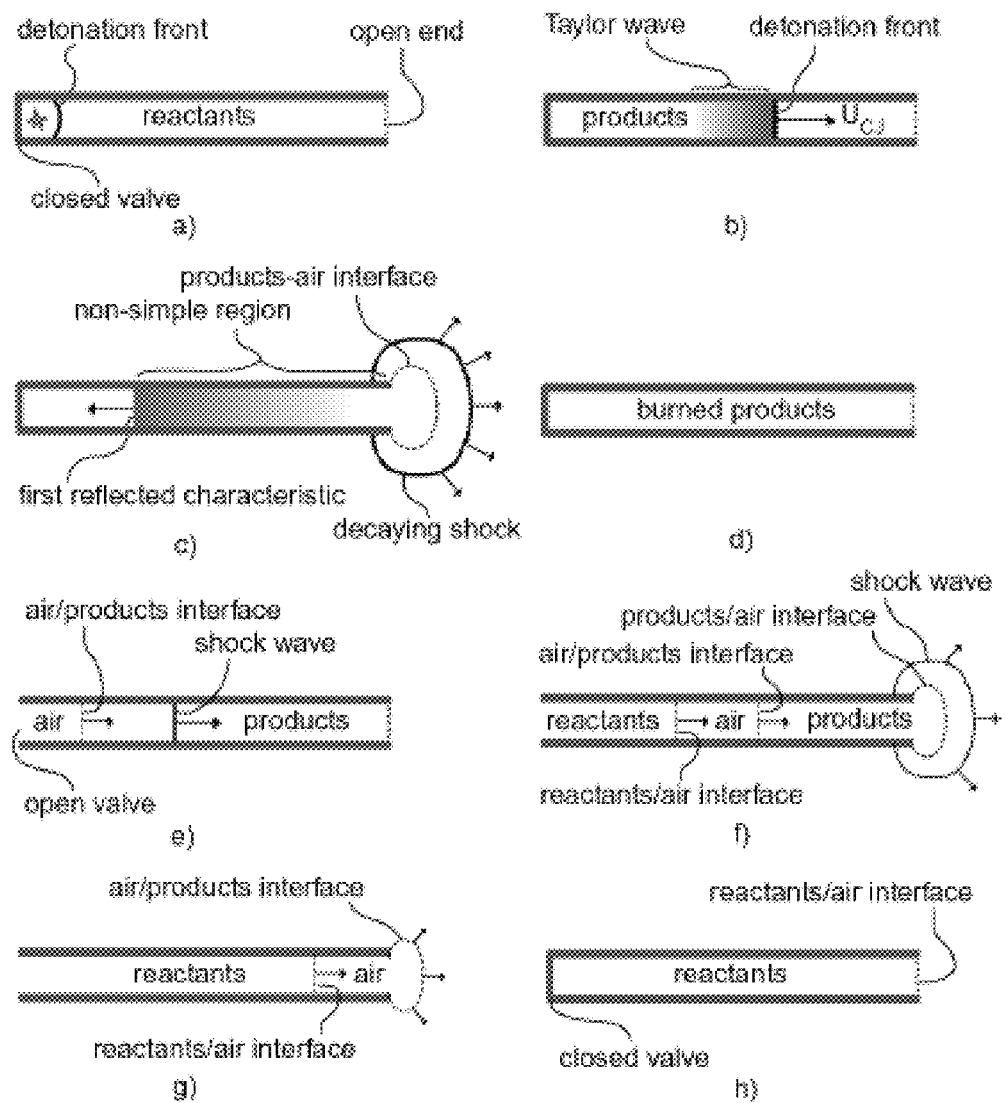

FIG. 35. Schematic of the Pulse Detonation Engine Cycle.

FIGS. 36A-H. A second notional depiction of the dynamics in a pulse detonation engine.

Figure 37:
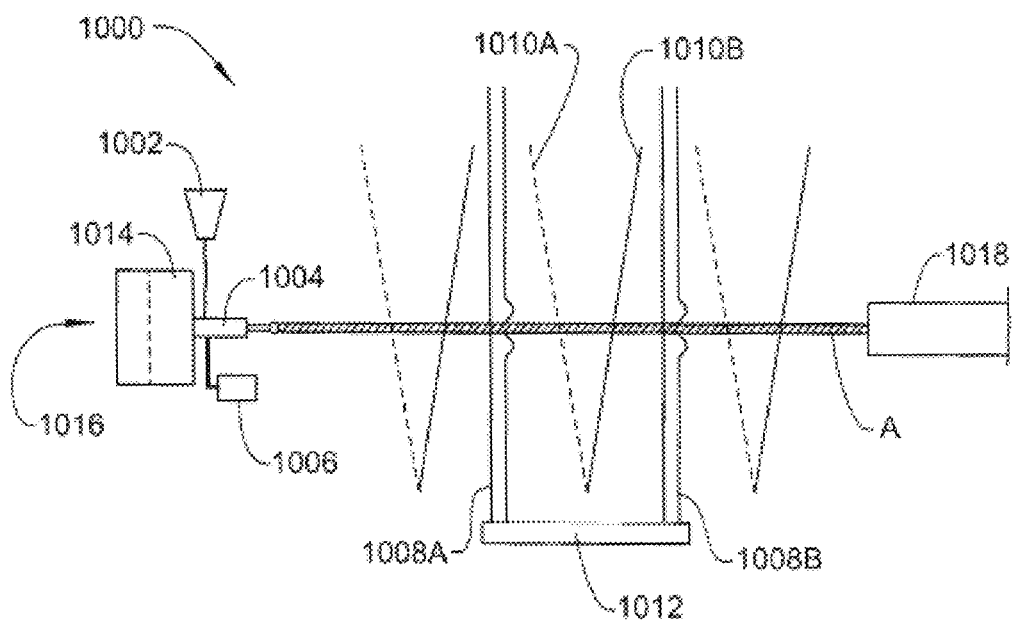

FIG. 37. Schematic depiction of an embodiment of an air jet loom having an integral directed energy deposition device.

Figure 38:
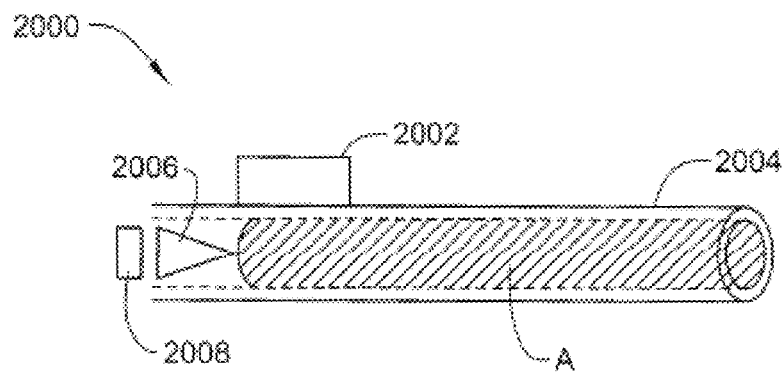

FIG. 38. Schematic depiction of an embodiment of a firearm subassembly having an integral directed energy deposition device.

Figure 39:
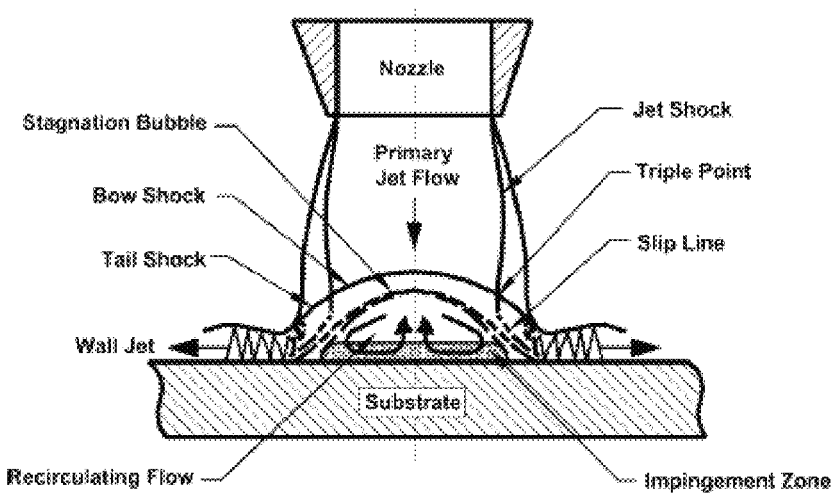

FIG. 39. Schematic diagram, depicting a notional example of a supersonic impinging jet flow field, that may arise in a continuous supersonic multi-phase flow application, such as spray or powder coating, among others.

Figure 40:
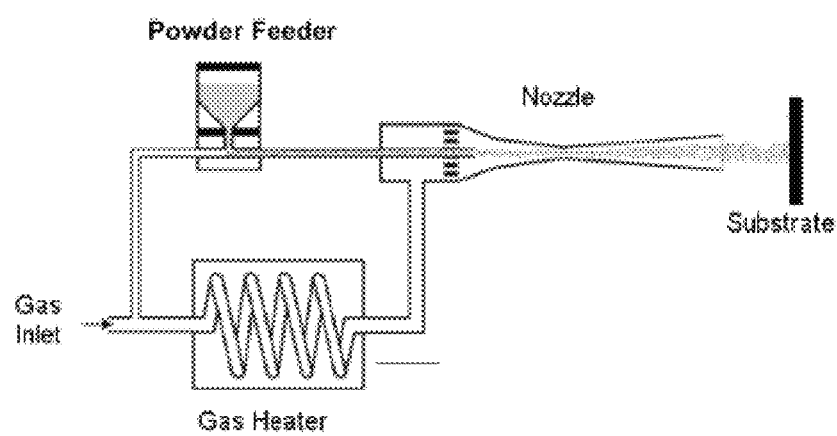

FIG. 40. Schematic diagram depicting a notional example of a cold-gas dynamic-spray coating system.

Figure 41:
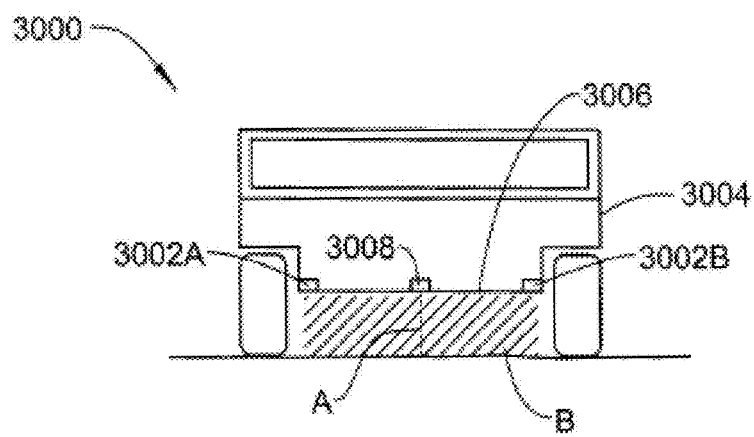

FIG. 41. Schematic depiction of an embodiment of a vehicle equipped with a blast mitigation device.

Figure 42:
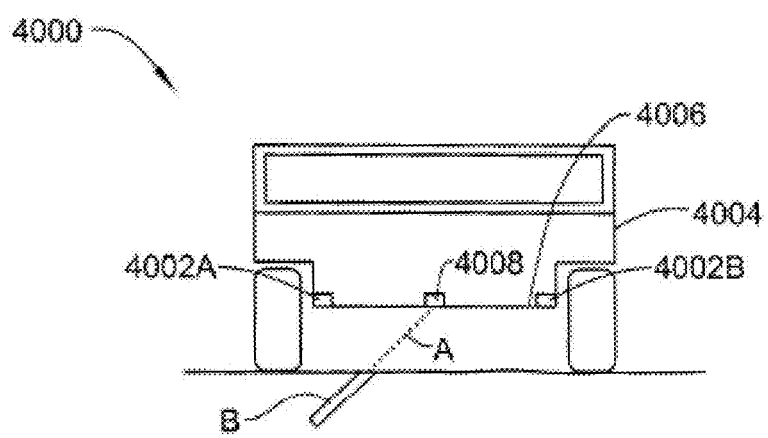

FIG. 42. Schematic depiction of an embodiment of a vehicle equipped with a ground modification device.

Figure 43:
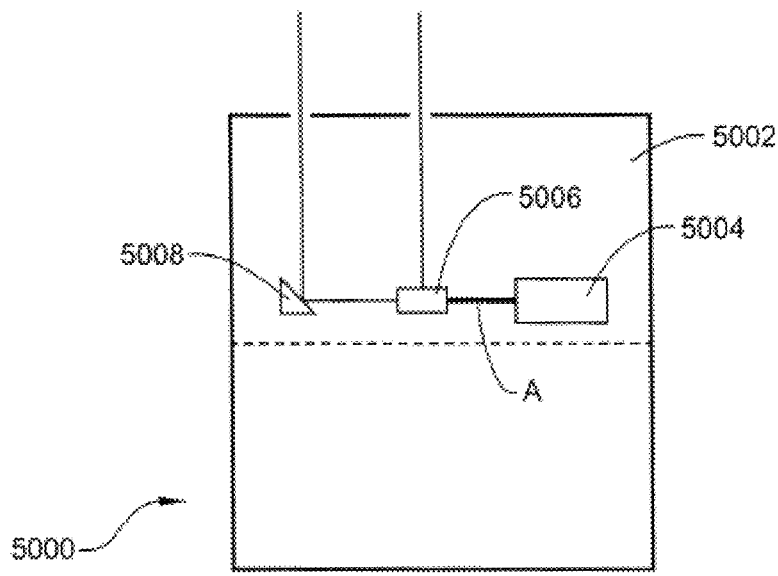

FIG. 43. Schematic depiction of an embodiment of a directed energy deposition device having a pulse laser subassembly.

Figure 44:
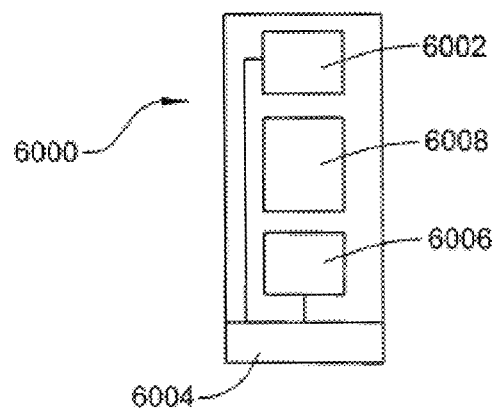

FIG. 44. Schematic depiction of an embodiment of a firearm cartridge having an integral directed energy deposition device.

DETAILED DESCRIPTION OF THE INVENTION

The basic idea behind our energy-deposition approach is that we are able to redistribute/sculpt the air's density by quickly ("impulsively") depositing energy into it. It is important to note that in order to effectively "part" the air, the energy must be deposited into the air much faster than the gas can expand (e.g. in the form of a short laser- or microwave-pulse, and/or an electric discharge, among other techniques). Any heating that allows the gas to propagate away as it is heated, even if using very high temperatures, will not yield the highly effective results we describe here. Generally, the "sudden"/"impulsive" heating process will generate a "snap" or "bang".

In order to: i) tailor the intensity and spatial distribution of specific modes of energy deposition; ii) maintain specific paths and channels for proper transmission; and iii) achieve the coupling of energy into the flow; a variety of energy deposition techniques may be applied to address a variety of atmospheric and flow conditions possible, in the broadest range of applications. The most effective energy deposition approaches, either: to form a nucleating/guiding/initiating region (e.g. an initial path), into which to deposit further energy; or to deposit further energy into such an initial region or path; will depend on the atmospheric conditions (including all represented media and mixed phases, such as gases, liquids, solids, plasmas), within/through which they are to be formed, as well as the associated operational flow conditions. Certain atmospheric and flow conditions may call for an initial path to be formed via depositing energy, into which more energy can be coupled as a following step. Other atmospheric and flow conditions may call for energy to be deposited in a single step. In certain applications, the energy may be deposited: along one or more surfaces; in one or more regions in the atmosphere/flow; and/or some combination of these. The one or more energy deposition steps can include combinations of one or more of, although not limited to, the following energy deposition techniques: electromagnetic radiation (ranging from xrays to microwaves); RF plasma discharges; as well as electrical current in the form of electron beams, charged particle beams, electric discharges, and corona discharges; with the temporal duration of these energy deposition techniques ranging from continuous beams to ultrashort pulses (e.g. pulse widths of: attoseconds; femtoseconds; picoseconds; nanoseconds; microseconds; milliseconds; seconds; and longer, up to continuous deposition). These timescales may differ for different embodiments and different modes of energy deposition, with the deposition of the different modes taking place at their respective time scales. In addition to utility in its own right, continuous or long-duration energy deposition can also facilitate shorter-pulse impulsive energy deposition, in certain regimes. Furthermore, applications, involving pulsing/phasing/synchronization of certain processes with energy deposition, can also incorporate longer-pulse and continuous processes The above embodiments of differeing energy deposition applications and techniques may facilitate applications at various altitudes and flight conditions. It can also be phased/ synchronized into different types of spray-coating techniques, under different operating atmospheres/conditions and media, including but not limited to: thermal spraying; plasma spraying; detonation spraying; wire arc spraying; flame spraying; high velocity oxy-fuel coating spraying; warm spraying; cold spraying; among other spray-coating techniques. Similarly, the above embodiments of differeing energy deposition applications and techniques may be applied (over a range of possible operating atmospheres and conditions) for looms, barrels, trains, engines, vehicles, blast mitigation, ignition, detonation, among other embodiments and applications.

To illustrate the following explanation, it is best to first look at FIG. 2 and FIG. 3 as examples of the expansion being described. Once the energy has been "effectively instantaneously" ("impulsively") deposited in a specific region of the air (e.g. along a line or at a point), the surrounding air is driven outward from the heated region by an expanding blast wave. Until the blast wave, resulting from the deposited energy, decays/slows to sonic speed, the surrounding gas is swept outward, leaving behind a region of hot, pressure-equilibrated gas, whose density is much less than the original/ambient density (in some cases less than 15%, for example less than 10%, 8%, 5%, 3%, 2%, or less than 1.5% of the ambient density, with the other 98.5% having been pushed outward). Once the expanding shockwave has slowed to sonic speed, it continues to expand out sonically, no longer pushing gas outward and no longer expanding the low-density region. The low-density region (generated when the blast wave was expanding supersonically) remains behind, pressure-equilibrated with the surrounding ambient pressure (e.g. it survives as a "bubble" of atmospheric-pressure, low-density, hot gas, which does not collapse back onto itself . . . i.e. it is a region in which "the air has been parted"). The volume of this pressure-equilibrated low-density region is directly proportional to the energy that is deposited in the gas and also proportional to the ambient pressure (e.g. the resulting low-density volume is doubled if the initial atmospheric pressure, before depositing the energy, is halved). An example of this expansion and resultant low-density region along a surface is shown in FIG. 3, which provides an end view of a single straight leg of an electric discharge, such as those shown in FIG. 2(*b*), yielding a schlieren photograph, looking along the path of the electric discharge.

The simplest example of expanding a low-density "bubble" can be seen when depositing energy at a point in the air (FIG. 4), from which the gas expands spherically-symmetrically, in order to open up a low-density sphere (FIG. 5).

A similarly simple geometry occurs when energy is deposited along a straight line (FIGS. 6, 7 and 8). This leads the gas to expand and open up a low-density cylindrical volume (or "tube"), centered around the original line/axis, along which the energy was originally deposited.

The fact that the hot, low-density geometries equilibrate to ambient pressure and remain for long periods of time, compared to the flow dynamics of interest, allows the low-density regions (e.g, spheres and "tubes" in air and half-spheres and half-"tubes" along surfaces, as well as other more complex geometries) to stay "open" sufficiently long to execute the intended flow control.

One of the simplest ways to envision the benefits of this approach is when looking at a confined blast. The intuition that this affords can be directly applied to other high-speed flow applications (such as high-speed flight and propulsion systems). In particular, we are able to (nearly instantaneously) reduce pressures and direct gases, upon detection of an undesirable pressure build-up and/or shockwave. These problems from the field of blast mitigation are the same concerns that arise in high-speed flight and propulsion systems, so this initial example can be extended to apply the fundamental concepts to a broad range of hypersonic applications. In one particular example of blast-mitigation, when high pressure blast gases are confined between the bottom of a vehicle and the ground, the air is impeded from exiting from under the vehicle by the formation of a shockwave in the ambient gas.

The longer the high pressure gas resides under the vehicle, pressing up against its bottom, the greater the integrated impulse presses the vehicle upward. The goal in this application is to vent the high pressure gas from under the vehicle as quickly as possible, thereby relieving the pressure underneath the vehicle and minimizing the integrated impulse transferred to the vehicle. To accomplish this, the high pressure gas can be quickly vented out from under the vehicle, by opening low-density paths along the bottom surface of the vehicle to rapidly direct the gas out from under the vehicle. This can be achieved by incorporating our technology (for example, a directed energy deposition device) into a ground vehicle, to create low-density paths, along which a nearby blast (e.g. under said vehicle) can quickly escape, thereby strongly reducing the force and time over which the blast gases press on the vehicle, thereby minimizing the total impulse imparted to the vehicle by the blast. FIG. 9 shows an example indicating the reduced force and impulse that can result from a blast, when first reducing the air density below the vehicle.

To create the high-speed channels, through which the high-pressure gas can more quickly escape from under and around the vehicle, we add conductive paths (similar to those pictured in FIG. 2) along the surface of the vehicle (schematically depicted in FIG. 10). These can be used to nearly instantaneously vent high pressure gases in confined volumes, and for high-speed propulsion, such as isolators, combustors, diffusers, exhaust systems. It may be useful anywhere in which it is advantageous to quickly mitigate deleterious pressure increases.

One reason that vehicles inefficiently fly through the air at high speeds is that they are effectively accelerating a column of air (from origin to final destination) to a significant portion of the speed of the vehicle. In addition to the resulting large fuel cost, the large amount of energy imparted to the air is associated with additional problems, such as: a strong sonic boom; damagingly strong shockwaves impacting the vehicle behind the nose; and undesirable pressures and heating along leading edges and stagnation lines, due to the frictional forces generated when accelerating the stationary air to match the speed of the vehicle.

When a vehicle instead travels through the low-density "tube" opened up by a directed energy deposition device along a long (e.g. laser-filament-guided) line, the drag is dramatically reduced, with a commensurately dramatic savings in total energy consumption. An example of the instantaneously calculated drag curve is shown in FIG. 11. In this graph, a small rise from the baseline drag is observed, as the cone passes through the higher density gas at the edge of the "tube". The drag then decreases dramatically, as the cone flies through the low-density region of the "tube". As the cone exits the low-density region, and the shock wave begins to re-form, the drag begins to rise up again to the nominal, original/unaltered drag value. In practice, after a vehicle or projectile has propagated through the low-density "tube", another low-density "tube" can be opened, to allow the vehicle/projectile to enjoy continued drag-reduction. The exact point at which the ensuing "tube" is initiated is a matter of optimization for a given application. The degree to which the drag is consistently allowed to rise, before again reducing it by depositing energy to generate another "tube", will govern the intensity of the pressure modulation being driven at the same repetition rate of the energy-deposition, which will be roughly equal to the vehicle speed divided by the effective tube length (adjusted to accommodate how far the vehicle/projectile actually travels before depositing energy again). This modulation will lead to an additional source of airplane noise, and can be tuned by adjusting the "tube" length, in order to avoid vehicle resonances and nuisance frequencies. Each successive "tube" also presents an opportunity to slightly re-direct the "tube's" orientation, to steer the vehicle (this will be further addressed below).

The drag-reduction and energy saved when implementing this technique, was studied to assess the dependence on different parameters, such as Mach number, cone angle, and "tube" diameter compared to the cone base. These parameters are depicted in FIG. 12, with the understanding that Mach number is referenced to the nominal, unaltered flow. Once energy is deposited upstream, the conventional definition and concept of a uniform Mach number no longer applies. This results, because the speed of sound inside the "tube" is many times higher than that outside the tube in the nominal unaltered free stream. By conventional definition, the Mach number inside of the "tube" is significantly lower than that outside of the "tube". In fact, in many cases, the flow inside of the tube is subsonic, compared to supersonic/hypersonic flow outside of the tube, allowing for dramatically different flow-fields than those observed when flying through uniform air, which has not been modulated by depositing energy. Some of these dynamics are described here, and can only be achieved by depositing energy into the flow.

The results in terms of maximum drag reduction and energy savings (return on invested energy) for the various cases shown in FIG. 12 are summarized in FIG. 13, including drag-reduction in excess of 60%, for example between 80 and 95% and even up to 96% and more than 30 fold, for example more than 50, or 65-fold return on invested energy in the total energy balance (i.e. for every Watt or Joule deposited into the air ahead of a cone to open the low-density "tube" along the cone's stagnation line, 65 times this "invested" energy was saved in the propulsive power or energy that was otherwise required to counter the much stronger drag experienced when not depositing energy ahead of the cone).

Some interesting trends are observed in the results, with the most basic observation being that opening larger tubes increases the drag-reduction for all of the Mach numbers and cone angles. A more nuanced and interesting observation is that the energy-effectiveness (i.e. [(propulsive energy saved)—(invested energy)]/(invested energy)) appears to have two regimes. This energy-effectiveness describes how much energy is saved out of the propulsion system for each unit of energy deposited ahead of the vehicle to open up a low-density "tube". One regime occurs at higher Mach numbers with narrower cones, in which the bow shocks tend toward oblique/attached. In this regime, the energy-effectiveness increases with Mach number and the most efficient "tube diameter" transitions in a clear and understandable fashion from smaller to larger diameters, with increasing Mach number. Removing the gas along the stagnation line always provides the greatest benefit, whereas the benefit of removing gas further out from the stagnation line is a function of the vehicle speed, with increasing benefit being gained at higher Mach numbers. In the lower Mach number regime, where the bow shocks tend to normal stand-off shocks, a strong rise is observed in efficiency for small diameter "tubes", which can effectively serve to "puncture" the bow shock, allowing the high pressure gas behind the normal shock to be relieved, since the flow within the "tube" can now be subsonic (in the high-speed-of-sound "tube") and no longer confined by the cone's bow shock (FIG. 14).

Although efficiency studies can help identify the energy one can deposit to achieve optimal performance, it is also worth noting that the effects scale, and that the amount of energy one deposits in a specific platform can also be determined, based on what the platform/vehicle system-considerations can accommodate. Even if a smaller diameter "tube" is opened than the optimum, it will nonetheless yield better vehicle/projectile performance, in terms of increased range and speed, lower fuel consumption, and decreased emissions and noise/sonic boom (with some other benefits noted below). It is particularly favorable, that significant benefit can be obtained when depositing energy, even much smaller than the optimal amount. The actual amount of energy-deposition capacity and power that is incorporated into a system, can be determined by the amount of room that can be accommodated for it, in terms of available size, weight, and power, and how much of these same parameters are improved after incorporating the technology. This flexible iterative process affords the luxury of incorporating the technology into any system that can benefit from it. In addition, given that the energy required to open a given volume of low-density gas scales with the ambient pressure, a given amount of energy deposited in the air will open increasingly larger volumes at the lower pressures encountered at increasing altitudes. This effect also works well in a scenario, in which a given range of energy pulses will open increasingly large "tube" diameters as a vehicle/projectile climbs in altitude. Instead of increasing the "tube" diameter, the increased low-density volume at higher altitudes can be used to increase the tube- length, or to distribute the greater volume across an increase in both length and diameter, An increase in "tube" length lends itself to increased speeds, and as seen in FIG. 13, larger "tube" diameters can help maximize efficiency at higher Mach numbers.

Representative density-contour frames from the dramatically modified flow dynamics, resulting from flying through a low-density "tube" are shown in FIG. 14. The letters A, B, C, D correspond to the times marked on the drag-curve in FIG. 11 (with D representing when the cone has traveled the original extent of the "tube", not accounting for the tube's deformation/extrusion, resulting from its interaction with the cone).

Contrasting the differences evolving from the nearly unperturbed density distribution in frame A, and the ensuing dynamics, we note several points:

- in regular flight, there is a strong bow-shock and associated sonic boom, whereas flying through the low-density "tube" strongly mitigates both the bow-shock and its associated sonic boom;
- in regular flight, the gas accelerated laterally and forward by the cone, leaves behind a low-pressure/low-density region at the cone's base, whereas when the gas is moved laterally from in front of the cone, by depositing energy to form a low-density "tube", the gas accumulated at the perimeter of the "tube" is recirculated behind the cone, and serves to re-pressurize the base;
- this repressurized base mitigates base drag;
- the significantly higher gas density at the base can also provide a level of confinement of the propulsion products, which can strongly enhance the propulsive effectiveness of the exhaust system, and increase its effective impulse many-fold . . . this results from the recirculated atmospheric gas backstopping the propulsion products to exploit their high pressure for longer times, versus having the high-pressure products simply exhaust unconfined into the otherwise low-density, low-pressure base region.

Phased Implementation of Propulsion and Energy Deposition, to Optimize the Dynamics Given the multitude of beneficial dynamics, embodiments discussed herein may be flexibly applied to improve efficiency and leverage/synchronize symbiotic effects/benefits of the various steps/processes. This may entail the optimization of a number of possible parameters, including length scales, ignition, air-fuel ratio, timing, repetition rates, chemical processes, electrical discharges, laser pulses, microwave pulses, electron beams, valving/throttling, among others. Some emobidiments include:

- Laser-launching: In laser-launch applications, one embodiment entails one or more ground-based lasers as the propulsion source, firing at the back-end of a launch vehicle, that refocuses the propulsive laser-light via a rearward facing optic to heat and expand gas or ablation products out the back end of the launch vehicle. Designing the laser system and launch vehicle to:
  - allow some laser energy to be deposited ahead of the vehicle to open a low-density "tube" and reduce drag;
  - size and throttle the vehicle body and internal paths to allow sufficient propellant air to be heated by the driving laser-pulse(s);
  - size the vehicle body to ensure that the modulated gas ahead of the vehicle flows around to establish a high-density back stop, against which the propellant gas can more effectively push;
  - deliver driving laser pulses to allow the vehicle to fully exploit the low-density "tube" and propulsive push, before the ensuing laser pulse repeats the process.
- PDE/Chemical lasing/Pulsed Power: This type of system calls for the same types of phasing/timing optimization considerations as listed above. In this case, however, the driving energy is a series of pulsed chemical detonations that take place inside of the vehicle. The timing of this detonation can be controlled via properly-timed valving and ignition, and the detonation may actually be able to drive the processes required to deposit the upstream energy.
- Industrial and Transportation Applications: In these cases, similar timing and system optimization as in the above applications can be applied to achieve the desired level of phasing, with additional potential considerations of different propulsion, such as electric propulsion, as well as magnetic levitation. Each element can be timed/synchronized, not only to ensure optimal fluid flow, but also to reduce the amount of energy is used in the on-board systems, such as the propulsion and levitation systems.

As stated earlier, electric discharge is one possible technique capable of realizing flexible geometries that can be used to not only generate the dramatic benefits, but also control and phase the aerodynamics to ultimately exact powerful and efficient control on the vehicle. If electric discharge is to be used, a conductive path must be created to allow a current to flow. The ability to "paint" a conductive path using a laser pulse (FIG. 6) and guide/initiate an electric discharge (FIG. 7) was demonstrated elsewhere. Filamenting lasers are able to form such ionized paths with sufficient accuracy and length to flexibly trace out any number of desired patterns.

An example is shown in FIG. 15, in which a conductive path (108*a,b*) is created to connect electrodes 106 and 107, intersecting at point $P_j$. A second example in FIG. 16 and FIG. 17 depicts more detail of the actual discharge device. In this example, a laser pulse 111 is directed to three separate electrically-isolated lens/electrode assemblies 102 (FIG. 17).

The adjustable (122) optical elements 121 focus the different pulses through their respective metal cones 123 to ensure that filamentation begins as close as possible to the tips of the metal cones. This will ensure the best electrical connection possible. The metal cones are electrodes connected to the appropriate poles of a capacitor bank. Upon creation of the ionized path, the capacitors will discharge their energy along said path. As a result, the electrical energy that was stored in the capacitors will be deposited into the air along the conductive pathways in the form of ohmic heating.

Another embodiment may achieve the desired flow control using several energy discharge devices arrayed/phased to achieve any number of objectives (FIGS. 18 and 19).

An array of energy discharge devices is illustrated in FIG. 18. An array of energy emitting mechanisms or elements 106*a*, 106*b*, 106*c* is arranged on a body 101. The body 101 includes a central element 106a surrounded by an inner annular array of elements 106b and an outer annular array of elements 106c. The total array of elements 106 can be used to increase the effectiveness and magnitude of the energy deposition by firing the individual elements 106 or groups of elements 106 in succession. This can be achieved by using the array of elements 106 to continue to push the fluid 105 cylindrically outward, after the fluid has expanded outward from the central heated core, generated by the central element 106a. In this example, when electrical discharge is implemented, it follows ionized paths 108 that complete separate conducting circuits between elements 106b and 106a. The next set of conductive paths and discharges could then be between 106c and 106a (or 106b).

In operation, as illustrated in FIG. 18 (top), the central element 106a and one or more elements 106b of the inner array may be fired to create a central heated core 160a. This heated core would expand outward, possibly bounded by a cylindrical shock wave, which would weaken with the expansion. To add energy to the weakened cylindrical expansion, elements 106b could be fired, as illustrated in FIG. 18 (bottom). Upon further expansion, elements 106c of the outer array would then also be fired to maintain a strong continued expansion of the heated core 160b.

A schematic representation of a similar application, involving a linear array of energy discharge devices 102, is illustrated in FIG. 19. The energy discharge devices 102 are mounted on a vehicle 101 to push incoming fluid 105 outward along the wing 150, in a wavelike motion, by firing sequentially from the innermost energy discharge device 102a to the outermost energy discharge device 102f furthest from the centerline of the vehicle 101.

The energy discharge devices 102 would typically be electrically isolated, as with the connecting charging units and switches. Additionally, neighboring energy discharge devices can be fired effectively simultaneously to create an electrically conducting path 108, as previously discussed with regard to FIG. 16 and FIG. 17. The energy discharge devices 102 can also be fired successively in pairs to use the electric discharges to sweep the fluid 105 outward toward the tips of the wing 150. This method of sweeping fluid toward the wingtips also directs the fluid over and under the wing 150. Environmental sensors can also be included to monitor performance and be coupled to the energy discharge devices to modify the different parameters of the energy deposition.

In addition to drag-reduction, there are a number of associated benefits that accompany use of the described energy-deposition technique.

To explore the control forces and moments associated with this technique, the Cobalt CFD solver was used to perform 3-D simulations, in which low-density cores were generated to impinge on the vehicle over a continuous range of off-axis positions. The offset in core position is depicted as upward in FIG. 20. In these runs, the core's initial position was co-axial with the vehicle, and was then slowly moved upward (remaining parallel to the cone axis with no angle of attack). This allowed quasi-steady state assessment of the effects of the core, when offset by an amount ranging from co-axial (no offset) to an offset of roughly one half of the base diameter. This is schematically depicted in FIG. 20. We performed this series in order to explore the full range of responses, resulting from cores aligned with the direction of flight.

Figures 21A, 21B, 21C, 21D:
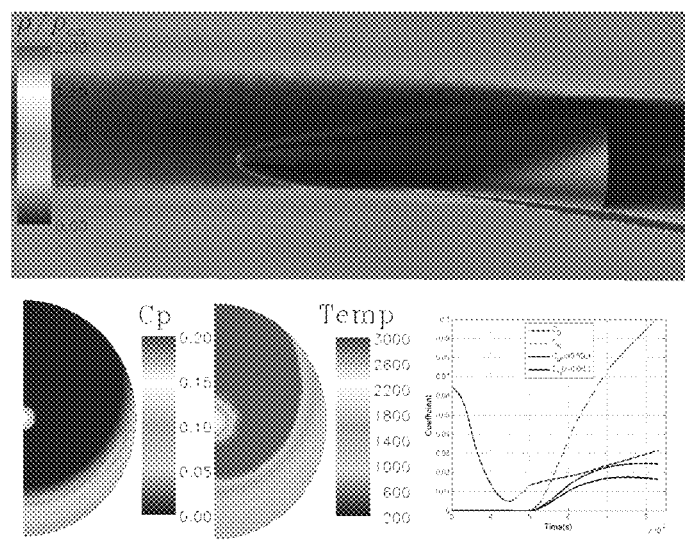

FIG. 21 depicts density, pressure and temperature on the body surface. The moments and forces are listed as coefficients on the same graph. The two moments are calculated as examples of different centers of mass that yield stable flight for different payloads/missions. We also demonstrated that otherwise unstable vehicles (center of mass aft of the center of pressure) are stabilized when flying through the low density cores. This is because the higher density gas at the outer edges of the base shifts the center of pressure significantly to the rear of the vehicle and behind the center of mass. This benefit of stabilizing otherwise unstable designs can result in far greater flexibility in ensuring stable hypersonic vehicles, removing conventional constraints on the location of the center of mass. The other benefits of this technology further reduce the design constraints by allowing much broader performance envelopes, using much lower-cost materials, as well as a significant reduction in fineness requirements of the body, as well as significant weight reductions due to reduced thermal protection system (TPS) requirements, easier inlet (re-)starting and greatly reduced control/actuator hardware.

The analytical upper bound estimates and computed lower bounds on a generic cone yielded control forces from several G to many tens of G, depending on the altitude and Mach number. These upper and lower bounds provide helpful limits in assessing the utility of this technique in different applications. In some embodiments, for example a launch vehicle with a 1 m base, may employ a deposited power of 480 kW to produce a useful effect over the entire range of Mach 6-20. This power allows: ⅕ diameter cores to be opened ahead of the hypersonic vehicle at 15 km; ½ diameter cores to be opened at 30 km; and full-diameter cores to be opened at 45 km altitude. If only 10% of this power is available, then we can open "tubes" roughly ⅓ of the cited diameters, and still obtain tremendous benefits in terms of efficiency, control, and greatly facilitated designs.

One of the current limiting factors in hypersonic vehicles is mitigation of the thermal effects of sustained hypersonic flight. In addition to reducing drag and enabling vehicle-control, our approach reduces the temperature on the vehicle surface, as well as the resulting heating. This allows significant reduction in TPS weights and specialty materials required at leading edges. It also allows for greatly improved vehicle performance before encountering material limitations. Opening small diameter "tubes" ahead of a vehicle demonstrate great benefit, and help guide a vehicle, similar to how a pre-drilled hole can help guide a large nail. Despite this, it is instructive to think in terms of the extreme case of opening a "tube" that can fit an entire vehicle. This makes it intuitive to see the vehicle as locked into the "tube" similar to a luge sled in the Olympics. If the vehicle begins to bump into a "tube" wall, it will experience very strong forces pushing the vehicle back to center. This works in the vertical direction, as well as all the others, and the vehicle will find a position, in which its weight is balanced by the upward resistive force. As a result, the entire body can serve as a lifting surface, uniformly distributing the associated forces and temperatures. Similarly, the entire body can serve as a control surface, in that the same phenomenon that balances gravity will consistently exert restoring forces to constrain the vehicle within the tube. On the one hand, this makes control very attractive, since it entails simply directing the "tube" (which can be as easy as directing the initiating/guiding laser pulses) in the desired direction, and the fluid forces will ensure that the vehicle follows, distributing the control forces across the entire body, as appropriate. This suggests that further weight and volume requirements can be traded to help accommodate the hardware required for our approach, by obviating heavy hypersonic actuator/control-surface systems. In certain cases, each flap has a sizable associated volume and can weigh roughly 20 kg. These actuators can require gas bottles or power from the vehicle, which have additional weight, volume demands, and risk, the elimination of which can be used to offset the requirements for the energy-deposition system.

As described above, the best approach to fully take advantage of the technology described in this paper is to design a vehicle completely around the fluid dynamics, allowing full exploitation of the many benefits they afford, including drag-reduction, flight-stabilization, reduced design constraints, enhanced lift/control/inlets/propulsion, and dramatic gains in speed, performance, range, payload, and fuel-efficiency. This being said, there are a large number of ways, in which this technology can incrementally "buy its way" onto existing platforms, by enabling incremental gains in performance that can't otherwise be achieved in otherwise optimized systems. Some examples of this include: depositing energy along a surface to mitigate the drag of unavoidable protrusions (e.g. vertical tail-sections, joints, rivets, wipers, seams, etc), as well as depositing energy at or ahead of leading edges. In addition to the performance gains these can afford, they can also enable otherwise unachievable capabilities. One set of applications includes the ability to puncture a tube from the side of the vehicle through an oblique shockwave, as sketched in FIG. 22, to facilitate passage of projectiles/sub-vehicles, as well as optical imaging and communication.

Puncturing the main vehicle's shock wave in this fashion can be of particular interest in certain hypersonic flight applications, since it enables creation of a path, through which images can be more clearly recorded, and through which secondary bodies can be launched from the primary vehicle without the strong interaction they would otherwise experience with the unpunctured shock wave.

Additional examples of high-speed flow control and facilitation of supersonic/hypersonic propagation/travel include propulsion and internal flow applications, in particular starting supersonic inlets and mitigating engine/augmentor noise, including screech and other resonances. These involve surface discharges, which we achieve using a variety of electrode types, either with or without lasers, depending on the specific details. We are also applying energy-deposition along surfaces and/or in the open air to ground-based applications to improve wind tunnel performance, industrial/manufacturing processes, and transportation.

For the above flight applications, our primary concern is to enable dramatic gains in capabilities and efficiency. In ground-based industrial/manufacturing/transportation applications, the constraints on size, weight, and power can be more relaxed. A desire to control uncooperative vehicles from a distance has also led us to deposit energy on remote platforms. For this application, the fluid dynamics resulting from depositing energy remain the same. However, instead of carefully engineering one's own platform to most efficiently deposit energy into the flow, while reducing the size/weight/power demands, the primary task now becomes delivering the energy to the remote platform, in order to control its dynamics. In this case, instead of depositing energy via efficient electric discharges, we wind up using less efficient laser (and/or microwave) energy to quickly/impulsively deposit energy at or near the remote platform's surface. The cost of this energy (in terms of its generation-efficiency) is much higher than simply using an on-board electric discharge as the primary energy deposition source. However, in return, one obtains the ability to remotely deliver this energy over large distances, in order to exert significant control over remote projectiles/vehicles by locally modifying the drag and lift on them. FIG. 23 shows schlieren images of laser energy being deposited on a remote surface in both quiescent and flowing air. In our wind tunnel tests, we were able to measure a sizable effect on both lift and drag on an air foil, associated with our ability to interrupt the surface flow and boundary layer.

Quickly/impulsively depositing energy into the flow, faster than the fluid can mechanically respond, can be accomplished using any number of embodiments and mechanisms, including lasers, electric discharges, microwaves, electron beams, etc, to generate a blast wave that rarefies a certain volume of gas. This energy can be deposited in a variety of useful geometries to significantly modulate/sculpt the density of the fluid and achieve tremendous control. This control may result from the strong difference in forces experienced when a body interacts with the ambient fluid density vs. with the regions of dramatically-reduced density. Common geometries are combinations of spherical and cylindrical low-density regions ("tubes") generated off-body, and "half-spherical" and "half-cylindrical" low-density regions generated along surfaces. These geometries enable dramatic increases in speed, efficiency, control, and overall performance, resulting directly from the strong reduction in drag, heating, pressures, and shock waves when traveling through very low-density fluid (vs. ambient density). The most advantageous exploitation of our revolutionary approach will be to design a system around the beneficial dynamics, by tailoring: inlets; timing; and propulsion, to maximize the effects over the full range of desired operation. Less extensive efforts can also be pursued, by incorporating these benefits in a way that "buys" the technology's way onto existing or near-term platforms, and/or to enable specific capabilities. Such efforts can include: point-wise mitigation of strong shocks/drag/heating/pressure; internal flow-control of high-speed propulsion units; inlet (re-) starting at lower Mach numbers; among many others; ground testing; manufacturing; ground transportation; and puncturing the shock wave generated by a supersonic/hypersonic platform to facilitate passage of optical signals and sub-vehicles.

A number of the fundamental physical mechanisms underlying the various embodiments in depositing energy to achieve the dramatic advances they afford in high-speed flow-control. Our approach to revolutionizing high speed flight and flow control is that we preferentially move air to optimize how it interacts in certain embodiments. When energy is deposited, effectively instantaneously ("impulsively") at a point, a spherical shockwave will result, pushing open a low-density sphere, within which only 1-2% of the ambient air density remains behind. When energy is impulsively deposit along a line, then this same expansion takes place to open a low-density cylinder, containing ~1-2% of the ambient air density. The volume we wind up "opening" is directly proportional to the energy we deposit, and directly proportional to the ambient air pressure, therefore requiring less energy to open a given low-density volume at high altitudes (where hypersonic flight typically takes place) than at low-altitudes. The benefits of flying through 1-2% of the ambient density vs. flying through ambient density are many, including: strong drag-reduction; enhanced stability; greatly-reduced energy use; no sonic boom; reduced stagnation temperature and pressure; reduced noise; re-pressurization of the base (eliminating base-drag and strongly enhancing the propulsive effectiveness of the propulsion system); reduced emissions; and a dramatic increase in flight envelopes at every altitude.

The primary effect we take advantage of when developing new applications is our ability to impulsively add energy into the air and sculpt its density. Over the decades, the evolution of large amounts of energy concentrated along point and line sources have been thoroughly characterized. In his meticulous computational study, Plooster provides his data in dimensionless units for an infinite line source of instantaneously deposited energy (FIG. 24 through FIG. 26). In all of his graphs, the energy is deposited at r=0, and the distance from this origin (in 1-D cylindrical coordinates) is described using the dimensionless radius $\lambda$. In each graph, $\lambda$ is plotted along the abscissa, and represents the ratio of the true distance r to a characteristic radius $R_o(E_o/b\gamma p_o)^{1/2}$, where $E_o$ is the energy deposited per unit length, $p_o$ is the pressure ahead of the shock, $\gamma=1.4$ and b is taken to be 3.94. Several plots are drawn on each graph, with numbers above each individual line. These numbers represent the dimensionless time $\tau$, which is the ratio of the real time t to a characteristic time $t_o=R_o/a_o$, where $a_o$ is the speed of sound in the ambient atmosphere ahead of the shockwave. All of the fluid parameters are plotted with respect to the fluid parameters in the ambient atmosphere ahead of the cylindrical shockwave, including the pressure $(p/p_o)$ in FIG. 24, radial velocity $(u/a_o)$ in FIG. 25, and density $(\rho/\rho_o)$ in FIG. 26.

Additional utility of these results comes from the fact that Plooster verified them for a variety of initial conditions (e.g. slight variations on an ideal line source). The long-term dynamics (of interest to us) are basically identical for initial conditions, ranging from ideal line-sources, to more diffuse sources, such as a finite extent of the deposited energy, including multiple line sources. The results are assumed to be sufficiently robust to further encompass any method we can conceive to deposit energy along an extended region ahead of the shockwave we would like to mitigate/control.

As the cylindrical shockwave propagates radially outward, FIG. 25 shows the expanding shockwave turning sonic at roughly $\tau=0.147$. This corresponds roughly to the time that the expanding cylinder relaxes from a blast wave pushing open the low-density tube to a sonic wave, developing a characteristic compression and rarefaction, which begins to become apparent in the pressure traces of FIG. 24 at approximately $\tau=0.2$. As a result, it is at roughly this same time that the low density tube stops expanding rapidly and remains roughly stationary from approximately $\tau=0.14$ to well beyond $\tau=6.0$. FIG. 26 shows that the very low density core remains effectively stationary and unchanged from radius $\lambda=0$ to approximately $\lambda=0.5$, as the sonic shock wave continues to propagate radially outward. The beauty and utility of this long, low-density cylindrical core is that it persists for a very long time, and can be used as a low-density channel, through which a vehicle (and/or the high-pressure air being pushed forward by that vehicle, and/or a build-up of high-pressure gas that must be relieved) can pass with effectively no resistance.

The parameters and scales from Plooster's results were used to estimate the energy required to open various radii of low-density tubes in order to perform a parametric study to characterize the effect of the low density tubes on a body in flight. In particular, the simulations are intended to show the compelling advantage in shock-mitigation and drag-reduction when suddenly depositing heat along a streamline (in this case, along the stagnation line) ahead of the bow shock generated by a supersonic/hypersonic cone. The sustained benefit, demonstrated in the line-deposition geometry, results in extended periods of shock-mitigation/drag-reduction, without continual energy addition. This allows the impulsive energy-deposition mechanism to be repeated in the form of successive pulses. Once the energy is quickly/impulsively deposited, the air expands, as described above, to open the low-density "tube". The two mechanisms that work to erode this idealized, stationary low-density tube (as well as spheres or any other shapes, formed by the expansion of deposited energy) are: i) thermal buoyancy; and ii) thermal diffusion. In practice, both interfacial and volume fluid instabilities also arise, as these two mechanisms act on the inhomogeneous density distribution.

Similar to a hot-air balloon (with no balloon), thermal buoyancy is driven by the buoyancy of the hot, lower density gas inside the "tube" or "bubble". Neglecting viscosity, instabilities, other dissipative forces, as well as a very low terminal velocity for objects as light as air, the highest upward acceleration that the low-density gas can experience is that of gravity (at 9.8 m/s$^2$). For the length-scales, in which we are generally interested, 1 cm can be considered to be a small, yet significant motion for the low-density gas. At the unrealistic upper bound of full gravitational acceleration, the gas would move 1 cm in roughly 0.05 seconds, which is generally much faster than thermal diffusion would significantly act on a sizeable low-density feature, on the order of cm's or larger. To account for the many assumptions, which make our upper bound too fast, we assume that a significant low-density feature will remain viable for at least 0.1 seconds. During this time, even a Mach 0.9 vehicle will travel roughly 30 m, which provides ample time for any vehicle of interest to finish its interaction with any low-density structure we intend to create.

For reasonably-sized low-density features (e.g. features of several cm in size and larger), the timescales over which these features will be dissipated by thermal diffusion are much longer than those approximated above for thermal buoyancy. Thermal diffusion basically results from the flow of thermal energy along a temperature gradient to ultimately reach thermal equilibrium (i.e. heat being conducted from hot gas to neighboring cold gas). As can be seen from FIG. 26, the interface of the "tube" has a very strong density gradient, which corresponds to a very strong temperature gradient. This results in thermal diffusion at the interface of the low-density "tube". Since this effect takes place at the surface and acts over small length scales, it is most significant for extremely small features, such as very small diameter spheres or very small diameter "tubes".

The primary instance, in which small low-density features play a significant role, occurs when the energy deposited in the air by a laser pulse creates a very small diameter low-density tube, as a precursor to guiding/triggering an electric discharge. In this case, the diameter of the low-density tube can be on the order of tens to hundreds of microns, or greater, depending on the pulse parameters. In such instances, we imaged the "tube" dynamics, and assessed their longevity to be between 100 µs to 1 ms (FIG. 8), and used additional diagnostics to corroborate these timescales.

The primary role played by such very small low-density "tubes", formed by intense laser pulses, is to help guide and trigger electric discharges, which can deposit significantly more energy along the path. These discharges form along the small precursor channel at a speed, on the order of 10$^6$ m/s or faster, resulting in the "tube" lifetime being easily sufficient to propagate an electric discharge for tens of meters.

One additional concern that may be raised, regarding the ionized path and small "tube" created by the laser, is the influence of turbulence. In practice, this has been shown to not be of great concern for several reasons: i) to propagate the laser pulse requires tens of nanoseconds; ii) the filaments and focused pulses have been demonstrated to survive propagation through, not only turbulence, but also through complicated high-speed shocked/turbulent flows (an example of which is described in more detail in our section on aerodynamic windows); iii) development of the anticipated electric discharges requires microseconds. For these time-scales and dynamics that are fundamental to forming larger, operationally useful "tubes" using electric discharges, turbulence does not present a significant impediment, due to the much slower timescales over which it evolves.

The standard feature, which we will use to discuss the aerodynamic benefit is the low-density core, which Plooster showed to extend to approximately $\lambda=0.5$ (FIG. 26). If we would like the radius of this core to be some value, we can calculate the necessary energy deposition per length ($E_o$) using the definition of $\lambda=r/R_o$, where $R_o=(E_o/5.34*p_o)^{1/2}$ and $p_o$ is the ambient air pressure (the constant 5.34 is derived using a value for $\gamma$, which differs slightly from 1.4, to account for water vapor, and can be calculated for dry air, as well). This gives us the energy per length necessary to create a low-density core of radius r. First we rearrange to get $E_o=5.34*p_o R_o^2$. Then, expressing $R_o$ in terms $\lambda$ and r, we obtain: $E_o 5.34*p_o*(r/\lambda)^2$. The main value of $\lambda$, about which we care, is $\lambda=0.5$, because this is the approximate dimensionless width of the low-density core. A primary dimension, which provides us with physical information, is the actual radius r of the low-density core we would like to create. As can be expected, the energy per length required to create a given low-density core is proportional to the square of its radius (i.e. proportional to its cross-sectional area) $E_o 21.5*p_o*(r)^2$. When accounting for an extra factor of ½ (squared), the equation to calculate the actual energy/length is $$E_o=5.34*p_o*(r)^2$$

To obtain the total energy required, we must simply multiply $E_o$ by the length of the heated path. This length is one of the system parameters to be optimized in the testing phase, and it also plays a role in determining the pulse repetition rate (which must also be optimized). However, we will choose some nominal values here, in order to discuss ranges of pulse energy and average power, allowing us to determine some nominal gas-heating requirements.

One approach of heating the gas ahead of a vehicle is to prevent "breaks" in the hot path by creating each new low-density "core", so that its front is butted up against the preceding core's back. However, a way to save on power and total energy deposition is to leave a break of unheated air between the successive individual cores. This will allow us to exploit some of the time required for the bow shock to actually re-form ahead of the vehicle. As the vehicle's bow shock is re-forming, the next heated core will serve to dissipate it again. The actual distance to re-form an effectively impeding shock, after the vehicle comes out of a low-density core, depends on the vehicle shape, angle of attack, and flight parameters, but whatever this length, we can accommodate it by tailoring the energy-deposition length and repetition rate. As an example, if we tailor these values to ensure that we create a tube, whose length is the same as the distance required to build up a new bow shock, we can halve the power requirement of energy deposition (since we will have a 1:1 ratio of unheated:heated gas along the stagnation line). A similar phenomenon was demonstrated when using spot-heating ahead of a vehicle. In practice, the optimal ratio of the hot-core length to the unheated length will be determined with wind tunnel tests and more detailed simulations. Our primary motivation for very carefully testing this parameter to best exploit it, is that it appears to require a particularly long time to "re-form" a shock after a vehicle exits the preceding low-density "tube". In the cited notional case above (which is consistent with the simulations we have performed), such an approach could save 50% of the energy we deposit, enabling us to double the present efficiency (by halving the energy input to yield the same benefits).

The reason for discussing the above method(s) to heat an extended path of air is for its applicability to the control/mitigation of a shockwave. We will begin by looking at time resolved studies of point-heating in front of a shockwave, then summarize the experiments we have performed to date with regions of extended heating.

The beautiful time-resolved windtunnel studies of Adelgren et al. (FIGS. 27 and 28) allowed the observation of energy-deposition effects on a spherical model's bow shock at Mach 3.45. The region of laser heating is approximately a point source, however, it is somewhat elongated along the direction of pulse propagation and occurs transverse to the tunnel's air-flow (the beam enters from the side of the tunnel). The resultant heating can effectively be approximated as a point source, whose evolution as an expanding spherical shockwave has been extensively treat. The main signature of this expansion is the spherical blast wave driving a high density/high pressure wave outward, leaving a hot, low-density "bubble" in the center. This low-density "bubble" expands to a given size (depending on the amount of energy deposited in the air) and then stops, as the sonic shockwave continues outward and weakens.

FIG. 27 shows the addition of approximately 10's of mJ into the flow with a 10 ns IR pulse. The expansion of the resultant spherical shockwave is observed, as it is advected downstream. The low-density "bubble" can be seen to keep its effectively-constant radius, as the weakening sonic shockwave continues to expand. This low-density "bubble" is the spherical analogue to the cylindrical low-density "tube/core" generated when energy is deposited along a line, as quantified by Plooster.

FIG. 28 shows the same geometry with a spherical windtunnel model placed in the flow, behind the energy-deposition. Superimposed on the schlieren images, the pressure distribution is shown as the laser-induced spherical expansion interacts with the model's shockwave. Using the model's surface as the zero-axis, the "circular" line in front of the model is the baseline surface pressure (measured during undisturbed flow). The other line is the surface pressure measured at the time the photograph was taken. These three frames demonstrate a momentary pressure reduction, as the low-density, laser-heated "bubble" streams past the pressure ports at the model's surface.

FIG. 29 shows the time-evolution of the pressure at the model's stagnation point (the point with the greatest pressure fluctuation). As the low-density "bubble" interacts with the model and its shockwave, a rise in pressure is seen as the high-density of the expanding shockwave first interacts with the model's shockwave and pressure sensors. The pressure dip then results as the low-density "bubble" follows. This results in the outward plume in FIG. 30, which then perturbs the rest of the bow shock structure, and results demonstrate the straightforward nature of the laser-heated gas interaction with a supersonic object's bow shock and flow field.

To investigate the more effective cylindrical geometry, PM&AM Research performed some exploratory experimental work to assess what will be needed in wind tunnel experiments, and we also performed analytical calculations and numerical simulations on a shock-tube geometry with a normal shock impinging on various low-density geometries. These considerations indicated the great advantage of employing a tube-shaped geometry. A given amount of energy was deposited either at a point ahead of the shock wave, or along a line ahead of the same shock wave (oriented in the direction of the shock wave's propagation). The point heating resulted in some mixing of the gas, and the overall impact on the shock was minimal. In terms of a supersonic vehicle, very little air is pushed out of a vehicle's path with a "point-heating" geometry. Nearly half of the gas expands toward the vehicle and impinges "head-on" with the vehicle's shock wave, while the other half moves away from the vehicle, only to be "caught up to" and absorbed by the vehicle's shock wave. In contrast, for the case of sudden line heating, nearly all of the cylindrically expanding gas is pushed laterally out of the way of the vehicle's path (or at least off of its stagnation line). The vehicle is observed to travel preferentially along the low-density tube, enjoying a long-lived reduction in temperature, pressure, and density at the leading edge and along the vehicle's front surface as a whole. Furthermore, when the gas is moved to the side before the vehicle encounters it, then instead of being accelerating by the vehicle forward and laterally, the gas instead is in a position to be recirculated behind the vehicle. This recirculation repressurizes the otherwise evacuated base, thereby not only removing base drag, but also providing a higher-density medium from which the propulsion system can push, thereby dramatically enhancing the propulsive effectiveness. These dynamics are depicted in FIG. 14, and a parametric study of the dramatic drag reduction and energy savings are reported in the accompanying paper in this compendium, as well as in references.

Once a vehicle has fully exploited a heated path (core), another impulsively heated path can be created, resulting in a repetition rate based on the vehicle's size and speed, as well as the length of the heated core and any unheated space that is allowed to remain between the successive cores.

Our proposed technology depends critically on coupling electromagnetic energy into air in a precisely defined, extended geometry ahead of a vehicle's shockwave. Laser "discharges" or "sparks" have been researched since the 1960's with great success. Scaling relations have been obtained for various wavelengths, and contributing mechanisms such as dust and carrier-diffusion have also been identified. For our application, however, we require more than simply a spark in the air. We require a well-controlled extended swath of air to be heated as efficiently as possible. These methods can still be optimized, and one of our primary interests is the ionization and energy-deposition resulting from laser pulses propagating through the atmosphere.

A benefit of using UV wavelengths is controllable ionization and energy-deposition. Many researchers have deposited energy into air using IR lasers, which also has its merits. One of the benefits is the great range of available IR laser-amplifier materials, another is the capability of intense heating and ionization. Conversely, the significantly greater amount of secondary light, created by the IR-absorption, results in less energy available to heat the air.

When comparing UV and IR laser-induced ionization, the actual mechanisms are quite different. One main difference is that the higher frequency of the UV light allows it to penetrate a greater range of plasmas. This occurs because, in order to not be reflected by an ionized gas, a laser's frequency must exceed the plasma frequency of the ionization. Therefore, once a (low frequency) IR laser starts to ionize a gas, it is not long before it is strongly reflected, scattered, and absorbed by the plasma it has just created. The result is, generally, either a single ionized spot, which prevents the remaining energy in the pulse from propagating forward, or a series of plasma "beads" along the path of the pulse. In the case of a single ionized spot, a general elongation can result along the pulse path due to a variety of mechanisms associated with a laser-driven detonation wave, which propagates backward toward the laser. This detonation wave can propagate at speeds of $10^5$ m/sec, making it a candidate-method to create an extended hot path ahead of a vehicle. Unfortunately, we have only seen reports of relatively short paths (on the order of centimeters), which would, at best, only be good for applications much smaller than currently conceivable. The IR-induced formation of a series of plasma beads, however, has been observed over several meters and even this "dotted" line may serve as an approximation to generating our required "extended hot path".

Another difference in the ionization mechanism of IR vs. UV radiation is the competition between "avalanche" or "cascade" ionization and multi-photon ionization. The result of their analyses is that shorter wavelengths, shorter pulses, and lower-pressure gas all encourage multi-photon ionization, whereas, longer wavelengths, longer pulses, and higher gas pressures encourage cascade ionization. Cascade ionization occurs in the presence of high photon densities, through inverse bremsstrahlung. This process is assisted by a gas atom/molecule and accelerates an electron forward, after it absorbs the momentum of a laser photon. The momentum build-up of the free electron continues until it has enough kinetic energy to impact-ionize another electron bound to a gas atom/molecule. This results in two electrons now absorbing photons and building up their kinetic energy. Continuing these dynamics, a single electron can multiply itself many times, as long as it has sufficient photons, sufficient gas molecules to interact with, and sufficient time for the many steps involved. An estimate of the threshold intensity needed to achieve breakdown in this fashion is:

$$I_{th} \sim (\omega^2 + v_{eff}^2) * (\tau_p * v_{eff})^{-1}$$

where $v_{eff}$ is the effective rate of momentum transfer between an electron and a gas particle (proportional to the gas pressure); $\omega$ is the laser frequency; and $\tau_p$ is the pulse width. It is apparent that $I_{th}$ is lower for lower laser frequencies, higher pressures, and longer pulse lengths.

In the case of multi-photon ionization, a higher-order collision takes place among a non-ionized gas atom/molecule, and n photons (enough to supply the ionization energy). As an example, the first ionization potential of molecular Nitrogen is 15.5 eV, while 248 nm KrF radiation has a photon energy hv of 5 eV. Since at least 4 such photons are needed to provide 15.5 eV, the ionization is considered to be a 4-photon process (i.e. n=4). For 1.06 μm photons, hv=1.165 eV, resulting in n=13, and for 10.6 μm photons, hv=0.1165 eV, resulting in an n=134 photon process (an extremely unlikely collision). An additional rule of thumb can be used to indicate the pulse lengths, for which multi-photon ionization will be dominant:

$$P * T_{\tau_p} < 10^{-7} (\text{Torr} * s)$$

This implies that at atmospheric pressure, $\tau_p$ should be below 100 ps for multi-photon ionization to be dominant while longer pulses with more energy can be used at lower pressures (higher altitudes).

As discussed earlier, the cascade ionization occurring in a long IR pulse will strongly reflect and scatter most of the light in the pulse. For a UV pulse, the ionized region can remain relatively transparent to the pulse, and an extended region of gas can be ionized. In fact, a region centered around a system's optical focus can be ionized, extending one "Rayleigh range" ($z_R$) in either direction, where:

$z_R = \omega_o/\Theta = \omega_o * f/d = \pi * \omega_o^2/\lambda$ (for a Gaussian beam)

where $\omega_o$ is the beam waist (minimum focal spot width), f is the lens focal length, d is the lens diameter, and $\lambda$ is the laser wavelength. Using f=1 m and 1.5 m lenses, it is possible to ionize extended paths of several cm. Using negative optics to decrease the lens f/#, it was possible to obtain an ionized channel of $2*Z_R=24$ cm in length.

Comparing the energies required by the two different ionization mechanisms, we see that short UV pulses are much more efficient/effective at creating a conductive path. Using 248 nm radiation to create a 1 $cm^2$ diameter, 1-meter long channel of air, ionized to $10^{13} e^-/cm^3$, only requires 2.4 mJ of pulse energy. On the other hand, if the plasma reflection problem could be circumvented, and an IR laser could be used to ionize the same channel, it would do so almost fully ($2.7 \times 10^{19} e^-/cm^3$) and require approximately 6.4 J of pulse energy. Using this full amount of energy from a laser is very expensive, due to the generally inefficient conversion of electricity to laser light. If, instead, a laser filament is created in the air, which couples energy into the gas to open a very small diameter low-density channel, this low-density channel can then be used to conduct a high-energy electric discharge, which will couple its energy into the air far more effectively than a laser. The energy emitted by the electric discharge is also more cheaply generated than that emitted by a laser. To mix and match the most useful elements of each deposition method, we note enhanced ionization of air, by 1.06 μm laser pulses, in the presence of pre-ionization. One possible exploitation of this phenomenon is to couple the IR radiation strategically in the air, using the ionization from a UV seed laser to dictate where the IR energy-deposition takes place. To facilitate the process, the UV light may be generated as a harmonic of the IR light. Beyond the ionization generated by the laser pulse being electrically conductive, it has great significance, in that it also couples energy to the air and generates a low-density channel. In this low-density channel, charges can be more easily accelerated, leading to much easier formation of electrical discharges along the path of the ionizing laser pulse. The short timescales involved also increase the facilitating effects that metastable species, such as metastable oxygen, can have in forming the electric discharge. A potential alternative method of coupling lower-cost energy into a pre-ionized and ensuingly rarefied region of gas is the use of microwave energy. This study of this coupling is currently in its early stages.

The main development in laser pulse technology, which significantly broadens our options for heating an extended path, is that of filament formation. Filaments have been investigated by a number of researchers and most of this work has been on IR filaments. UV filaments have been suggested to overcome/complement many of the shortcomings of using IR wavelengths. According to theory, the UV filaments can be kilometers in length, can contain several Joules of energy, have radii of approximately 100 μm, and ionize the gas between $1 \times 10^{12} e^-/cm^3$ and $1 \times 10^{16} e^-/cm^3$. In contrast, the IR filaments can not contain more than a few mJ of energy, and once this energy is depleted (through the losses of propagation), the filament breaks up and diffracts very strongly. Brodeur has suggested, and it has later been shown through simulations, that much of the filament energy is intermittently moved to a larger penumbral diameter of 1 mm, as it diffracts off of the more highly ionized inner core. This light remains as a reservoir for the formation of new filaments as the earlier filaments break up.

Comparing UV and IR, UV filaments have been shown to lose approximately 400 μJ/m, and yield approximately $2 \times 10^{15} e^-/cm^3$ ionization. This has been reported to be 20 times greater than the ionization measured in IR filaments, resulting in a 20-told increase in conductivity. Another advantage is that the UV filaments do not lose energy through "conical emission" of light, and therefore use their energy more efficiently to ionize and heat the gas, which translates to more efficient formation of the small low-density tubes that facilitate formation of the electric discharge.

Figure 30:
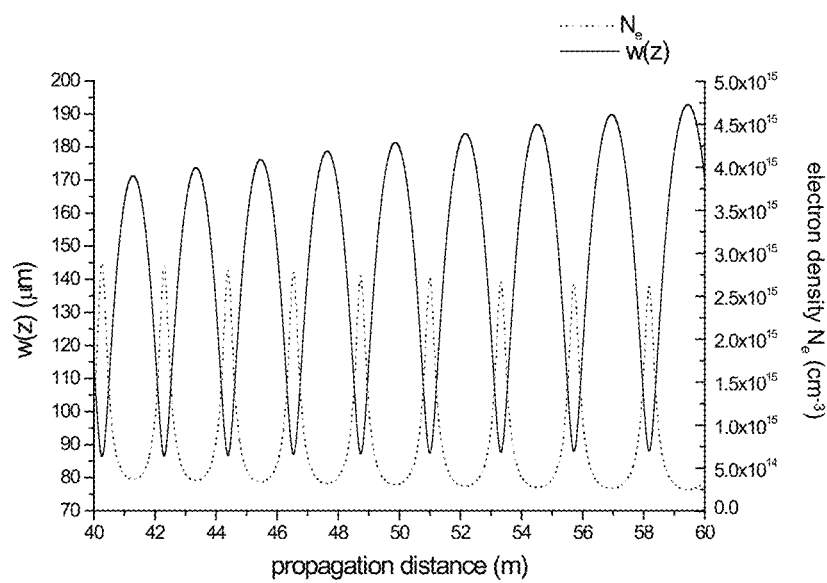

Theoretical results are shown in FIG. 30, demonstrating an oscillatory exchange, over lengthscales of meters, between the field intensity and the ionization. These oscillations take place within an envelope that can extend for kilometers, given sufficient initial energy and pulse width. In both FIG. 30 and FIG. 31, the vertical scale is in μm, and the horizontal scale is in meters. The lines in FIG. 31, which represent the filament boundaries for 160 MW of initial power, show effectively no spread of the beam and the predictions of this model agree well with experiment. The similarity to the IR filaments, in the oscillation between ionization and photon density suggests potentially interesting interactions among filament arrays. In this case, the individual "penumbral" fields would overlap, allowing cross-talk or energy exchange between the arrayed filaments. Such an array would be created by constructing the initial beam profile, to have local intensity maxima at certain points to nucleate filaments. An array of meter-long filaments would be an effective way to deposit energy in a very concentrated and controlled fashion. One possibility of coupling the two would be to use a UV filament array to serve as a waveguide for IR light. The IR light intensity could be lower than otherwise necessary to ionize the gas, however the ionized region between the UV filaments would help couple the IR radiation to the gas. This would allow efficient coupling of the IR radiation to the gas, without the otherwise necessary high field intensities, Such a complementary approach could mitigate the (typically too strong) IR ionization and associated wasteful bright light generation. The low-density channels created by the UV filaments could also more effectively guide the IR light.

The method, onwhich we have initially focused, of cost-effectively scaling up heat deposition is to use the low-density region, generated by a laser-ionized swath of gas or filaments, to nucleate and guide an electric discharge.

This was performed by directing an 80 mJ, Ips laser pulse through two toroidal electrodes to create an ionized path between them. The electrodes were kept at a voltage, below their regular discharge voltage, and when the laser-ionized path generated a low-density path between them, it nucleated a discharge and guided it in a straight line (FIG. 32). This precursor laser pulse was able to reduce the threshold breakdown voltage by 25-50% (which is normally on the order of 20-30 kV/cm at sea level). The enhanced breakdown results from a number of mechanisms, with the primary benefit deriving from the small low-density region/tube opened up by the small amount of energy that is deposited by the laser pulse itself. Longer filament-initiated/guided discharges have been demonstrated, with an intermediate length of 2 m being generated, as shown in FIG. 7.

We have also generated electric discharges (FIG. 33) by connecting multiple paths, generated by multiple laser pulses, as shown in FIG. 6.

To further approach practical implementation of this technology on real platforms, filamenting lasers were propagated through an aerodynamic window. Aerodynamic windows have historically been used to "separate" two regions, between which high intensity laser energy must propagate. This is required if the laser intensity is sufficiently high that the energy cannot pass through a solid window without catastrophic disruption of both window and beam. Instead of separating the distinct regions with a solid window, an aerodynamic window separates them with a transverse stream of air. High pressure air is expanded through a nozzle/throat to create a shock and rarefaction wave on either side of the window. This sets up a strong pressure gradient across the window (transverse to the direction of flow. If the respective high and low pressures are matched to the external pressures on either side of the window, little to no flow will occur across or into/from the window if small holes are drilled to allow a laser pulse to pass through. (see FIG. 34).

Using an aerodynamic window allows a clean separation between an energy discharge device and arbitrary external atmospheric conditions. This can range from stationary applications at sea level to supersonic/hypersonic applications at various altitudes. In fact, the flow within the aerodynamic window can be adjusted to accommodate changing external conditions (e.g. external pressure variations due to altitude and vehicle speed/geometry).

In our demonstrations, filaments were formed by a pulse propagating from the vacuum side of the aerodynamic window (FIG. 34) into the ambient atmosphere. They have also been propagated from atmosphere through the turbulent/shocked flow inside the aerodynamic window into a range of pressures from 4 torr to 80 torr. In these low pressures, the filament defocused and exited the low pressure chamber through a solid window. It was then reported to regenerate into a filament under atmospheric conditions. These geometries demonstrated the robust nature of UV filaments, eliminating concerns that they are too fragile to implement in and deploy from any range of platforms, including supersonic/hypersonic applications.

Similar to our technique to couple electric discharges into laser plasmas, as a cost-effective method of depositing larger amounts of "lower-cost" energy into air, microwave energy is also more cost-effective than laser-energy, and can similarly serve as a cost-effective method to increase the energy deposited into the air along the plasma geometries set up by a laser. Two related advantages of using microwaves to more efficiently couple energy into the air via a laser-generated plasma are: i) it is not necessary to close a circuit to couple the energy; ii) the energy can be deposited with a stand-off, which can be beneficial at higher speeds. Combining multiple energy-deposition techniques can provide yet greater flexibility, including laser pulses and/or filaments at various wavelengths, electric discharges, microwave pulses, and/or electron beams, among others. Some notional coupling geometries and results are reported, and we are also exploring the details of coupling short microwave pulses to laser plasmas and filaments.

For the various individual mechanisms that occur in succession, in order to achieve the desired aerodynamic benefits, Table 1 summarizes notional timescales involved in each step of a notional application to provide the appropriate context, within which to consider the response times of any sensors and electronics used in the overall system. In the table, the two mitigating mechanisms of thermal diffusion and thermal buoyancy are indicated, compared to the regimes in which they dominate. For the very small "tubes" created by the filament itself (which enable the electric discharge to form), thermal diffusion is the fastest mechanism working to erase the hot, low-density tube. In this case, the tubes survive over timescales longer than the few microseconds required to form the electric discharge. For the larger "tubes" created by the large amount of energy deposited by an electric discharge, thermal diffusion (which acts at the interface of the low- and high-density gas defining the tube) is negligible, with the governing mechanism disrupting the tube being thermal buoyancy and instabilities, which does not significantly impact the tube for milliseconds, which is ample time for even the slowest vehicles to propagate through the tube. The timescale required to actually open the tube is also estimated, and it is sufficiently fast for the tube to be open in sufficient time for even the fastest vehicle to gain the benefit of flying through it. Many applications are possible, including flow control through depositing energy at a surface (oftentimes obviating the need for a laser), during which the applicable timescales remain roughly the same. Table 1 does not address the timescale of coupling microwave energy to a laser plasma, since this timescale has yet to be definitively quantified.

TABLE 1

Fundamental timescales for a notional application

Ultrashort Pulse Laser Forms a Filament with plasma density of ~$10^{13}$-$10^{16}$e$^-$/cc
a. Speed of Light: ($3 \times 10^8$ m/s) → 1 ft/ns
   Electrons Recombine: Transfer Energy to (i.e. Heat) Gas
b. Plasma Recombines in ~10 ns (up to 100 ns)
   Small-Scale Low-Density Channel Opens (Enables Discharge)
c. Opens in tens of nanoseconds (disruption begins, due to thermal diffusion over 100 μs to 1 ms)
   Electric Discharge Forms
d. $10^6$-$10^7$ m/s → 10 ft/μs
   Electric Discharge Lasts for Several μs
e. Current Flows & Ohmically Heats the Gas (Straight Lightning Bolt)
   Large-Scale Low-Density Channel Opens
f. 10's-100's of μs (disruption due to thermal buoyancy after 10's of ms, which allows low-drag propagation over 10's of meters for a vehicle traveling at 1 km/s)
   Total Time of this entire process is ~Equal to the time to open the big tube (~100 μs)
g. Sufficiently Fast Compared to Flight Speeds (a vehicle traveling 1-3 km/s only travels 10-30 cm in the time it takes the large tube to open, through which the vehicle can travel for 10's of meters in the course of 10's of ms)

In discussing various applications, hardware and latencies are important factors to consider, and are indicated here to emphasize their consideration in determining a timing chain for a specific application, since these hardware timescales must be considered (in addition to the fundamental timescales summarized in Table 1), in order to perform realistic estimates and build a working system. E.g. in mitigating inlet unstart, the physical timescales are important, however, the sensors, signals, and any processing (which we prefer to obviate by employing purely hardware solutions, when possible) can add latency (in particular, pressure sensors, since the other hardware items are typically faster). Stepping through specific system examples highlights the fast response time of our flow control approaches, compared to other techniques currently available.

We have discussed some fine points of depositing energy into the flow, including mechanisms to couple lower-cost electric discharge and/or microwave sources. A number of details are addressed to help provide a more physical/intuitive understanding of the dynamics and to fuel future development of this broad array of revolutionary technologies to fundamentally transform how we fly.

In the past, approaches have been disclosed to reduce drag by depositing energy in a way to laterally move a fluid, such as air, out of the path of an object, thereby facilitating said object's forward motion. Energy deposition was further disclosed to control flow, in a variety of other applications [cite Kremeyer patents]. In one drag reduction embodiment, energy is deposited to create a low-density region, through which an object propagates. This low-density region is of finite extent, and additional low-density regions can be created as the object propagates, in order to continue the benefit of propagating through the low-density region. If these regions are created in immediate proximity to one another, a nearly continuous low-density region can be generated to enjoy nearly continuous benefit. Because the low-density regions require energy to establish, it is of further benefit to optimally exploit their benefit. The definition/goal of "optimal benefit" can vary, based on the application and the relative value of the associated benefits and resources. These benefits may include, but are not limited to speed, range, energy, weight, acoustic signature, momentum, time, power, size, payload capacity, effectiveness, accuracy, maneuverability, among many other possibilities. These benefits vary from one application to the next, and specific parameters must be adjusted for a given embodiment and its specific conditions and goals. We disclose here, the concept of tailoring a specific embodiment, and incorporating the pulsed energy deposition, synchronized with other pulsed or singular events in a way to optimize the desired benefits. Some examples are given below.

Synchronized Pulsed Operation for High Speed Air Vehicle/Projectile Applications In past disclosures, the dynamics of a vehicle traveling through a low-density tube have been described, demonstrating a pulsed effect, starting as the vehicle enters the low-density tube. The effect persists for a certain period of time, which depends in part on the length of the low-density tube and the vehicle speed. FIGS. 14A-D are sequentially ordered, with their approximate relative time demarked on the inset drag trace. One aspect of the dynamics to note is that the drag on the cone-shaped notional vehicle increases slightly as it penetrates the higher density sheath of air surrounding the low-density tube created by the deposited line of energy. This higher density sheath contains the gas that was pushed cylindrically outward to rarefy the low-density tube. Upon entering the low-density portion of the tube, the vehicle experiences greatly reduced drag. At time D, the vehicle has traversed the original length of the tube, and it is apparent from the drag curve, that additional time is required for the steady state flow conditions to re-establish. An additional point to note is the seemingly complete elimination of the how shock and associated far-field sonic boom during the vehicle's passage through the low-density tube.

Beyond these aspects of great interest, one critical facet of the dynamics is the pressure distribution around the vehicle, resulting from the re-distributed density.

As observed in FIG. 14A, before the vehicle penetrates the low-density portion of the tube, the density at the vehicle's base is extremely low. This rarefied low-density/low-pressure region at a vehicle's base is a consequence of typical supersonic/hypersonic fluid dynamics. This region results from the gas in the vehicle's path being pushed forward and laterally from the vehicle, similar to a snow plow hurling snow from the snow plow's path (leaving behind a region clear of snow). The dynamics are also similar to the dynamics we employ to create a low-density region when we depositing energy. In both cases, the gas is pushed outward, leaving behind a rarefied region. However, in contrast to the typical case of supersonic/hypersonic flight in which no energy is deposited ahead of the vehicle, the mechanical energy imparted by the vehicle to the upstream gas results in a high pressure region and shockwave ahead of the vehicle, exerting what is known as wave drag with the high pressure behind the shock wave pushing the vehicle backward. Also, the vacuum, left behind after the vehicle mechanically pushes the gas forward and laterally outward from the vehicle, results in the evacuated low-pressure region at the vehicle's base, yielding base drag that furthermore pulls the vehicle backward. Both of these forces are strongly mitigated when we deposit a line of energy ahead of the vehicle to push the gas laterally out of the vehicle's path. The degree to which these forces are mitigated is determined by the amount of energy we deposit per length ahead of the vehicle. Removal of gas from in front of the vehicle reduces the wave drag and also minimizes the gas that is mechanically propelled outward when pushed by the vehicle (which also minimizes the sonic boom). As described above, base drag typically results from the low pressure region left behind when the vehicle or projectile mechanically propels the gas outward from it. In contrast, when the gas ahead of the vehicle/projectile is pushed to the side by depositing energy ahead of the vehicle/projectile, then instead of being "hurled" away laterally, leaving a low-density region behind the vehicle/projectile to result in base drag, this gas can reside in a more stationary fashion just outside of the vehicle's path, or if it is in the vehicle's path, it is not mechanically accelerated as much by the vehicle itself, resulting in less lateral momentum imparted to the gas by the vehicle/projectile. The less lateral momentum is imparted to the gas, the lower the sonic boom, and the less the base is rarefied. In the limit that the gas from in front of the vehicle is completely removed to the edge of the vehicle (e.g. opening a tube whose radius is the same as the vehicle radius), the high-density region of gas that was pushed out from the low-density tube is now most fully recirculated behind the vehicle to repressurize the base. In addition to this repressurized base being a significant contribution to the overall drag-reduction on the vehicle, this effect can be combined with a pulsed propulsion process to maximize the overall efficiency of the vehicle operation. In the past, we considered primarily the aerodynamic properties of the vehicle. Considering the propulsion, and in fact considering a pulsed propulsion process, allows yet greater optimization of the vehicle, particularly in compressible flight regimes, most notably supersonic and hypersonic regimes, as well as high-subsonic/transonic regimes. In one embodiment, the optimal benefit is to design an aircraft around this concept, in order to make the simplest and most cost-effective vehicle possible. Other optimal benefits may include those listed earlier, such as the shortest possible flight time. In addition to depositing energy in front of the vehicle to reduce drag and steer the craft, we can synchronize these dynamics with a pulsed propulsion system (which is much more efficient than steady propulsion, e.g. a pulse detonation engine, among other pulsed propulsion options), in order to achieve the desired effect(s). Other, and/or additional processes can also be synchronized with these dynamics, in order to achieve yet further benefit, and we will first consider pulsed propulsion, using the example of a pulse detonation engine. Two notional representations of pulse detonation engine dynamics are depicted in FIG. 18.

One very important aspect of pulsed propulsion is the pressure at the exit/exhaust plane of the system. In the typical case of very low base-pressure resulting in very low pressures at the exit/exhaust plane of the propulsion system, the detonation tube (combustion portion of the pulse detonation engine) fills very quickly with reactants. Given the very low back-pressure, the high pressure portion of the propulsion cycle (the blow-down time) also does not last very long. The typical propulsion cycle time depends on the design of the engine, and the geometry can be varied, in order to change the cycle time. Additional critical factors influencing the cycle time are: the mass flow at the inlet (more specifically, the mass flow and pressure at the inlet plane of the detonation tube, which is typically opened and closed with a valve), influencing the speed at which the tube fills with reactants; and the pressure at the exit/exhaust plane, which influences the residence time of the high-pressure detonation products and their resulting thrust. Under typical tight conditions, these pressures at the inlet and exit planes are dictated by the flight parameters. When we add the energy-deposition dynamics described above, it becomes possible to very favorably modify the conditions at both the inlet and exit of the pulse detonation engine.

The basic approach will be to time the energy deposition pulse ahead of the vehicle with a propulsive pulse, such that the air from the front wraps around the vehicle to repressurize the exit(s) of the one or more propulsion units, with higher density air, providing augmented confinement of the exiting gases, coincident with the propulsive portion of the pulsed propulsion (e.g. pulse detonation) cycle. In other words, the dynamics include the synchronization/phasing/timing of the increased base pressure (i.e. the increased pressure at the propulsion unit's/units' exit/exhaust plane(s)) resulting from the energy deposited ahead of the vehicle to optimize the propulsion/thrust generated by one or more pulse detonation engine cycles. The added confinement provided by the increased density at the propulsion unit's or units' exit(s) will significantly increase the propulsive effectiveness over the unaugmented operation.

Similarly, the establishment of the low base pressure, as the vehicle's bow shock is re-established (after having been mitigated by a low-density tube) can be synchronized/phased/timed, in order to facilitate the purging and filling stages of a propulsion cycle. The lower base pressure will allow for faster purging of the combustion products and filling with the new combustion reactants. This can be done in air breathing or rocket modes (in which the oxidizer is carried on board and the outside air is not used). Rocket modes may be applied when maximum power/thrust is desired, regardless of the external conditions, in particular when speed and power are valued over reduced vehicle weight and volume.

In cases where the propulsion process is air-breathing, we can also time the energy deposition to preferentially direct some amount of the air displaced from in front of the vehicle into an inlet. All of these details are timed together, and are dictated by the vehicle's design, which can be optimized to take advantage of the various dynamics. Matching the period of repressurization with the period of maximum exhaust pressure, can be dictated by respectively varying the length of the low-density tube we create and the length of the PDE, as well as adjusting the timing between the two, and all of these parameters, among others, can be adjusted in order to optimize a vehicle's performance for a given application. Similarly, the inlet can be designed, such that the air enters to feed the propulsion cycle which will be specified to some degree already by the earlier matching conditions. To add flexibility, we don't have to match the same cycle (e.g. if the slug of high-density gas around the body to repressurize the base travels too slowly due to skin friction, then we can size the vehicle and time the dynamics in such a way that the high-pressure period we create at the base coincides with theh thrust generation phase of some PDE cycle, not necessarily one beginning when the low-density tube was initiated). Further flexibility can be afforded, e.g. if we want shorter low-density tubes or shorter engines (or shorter detonation tubes in the engines), by applying one approach of creating multiple engines that operate sequentially like a gattling gun (or in whichever pattern provides the most advantageous forces and dynamics). Each detonation tube can have its own inlet, which can be supplied by a similar sequential application of a ring of electrodes, that take turns arc-ing to the central electrode. These discharges make a laser-initiated/-guided v-shape, which not only reduces overall drag by removing air from in front of the vehicle, but also compresses the air between the legs of the V, to facilitate its ingestion through a smaller inlet than would otherwise be required. In order to provide higher pressure and oxygen for the engines at their inlets, the inlets will fire in the same sequence as the detonations in the multiple engine tubes, although delayed by the amount of time, determined to best align the benefits of the base-repressurization, coupled with the presentation of high-density gas at the inlet, together with the overall engine cycles designed into the platform. It's common to consider a valve in the engine, which is open when ingesting air, and closed during detonation. By adding a rotating valve (following, for example, the same spirit of a gatling gun concept), its rotation can be adjusted/shifted to properly facilitate the propulsion sequence. Such a rotational motion can similarly be employed to facilitate creation of the laser filaments.

The timing of the upstream energy deposition and engine cycles can influence the system design and operational parameters to size the engine tube lengths and diameters, as well as dictate the number of engines themselves, to result in propulsive pulse cycle times commensurate with the energy-deposition cycle times. These can range from less than 1 ms to several ms. In particular, one range of interest can be for short lines of energy-deposition (notionally in a range of 10 cm to 40 cm) at high speeds (notionally in a range of Mach 6 to Mach 12), resulting in cycle times ranging from 0.025 ms to 0.2 ms). To match these energy-deposition cycle times with comparable propulsive cycle times, it is possible to use shorter engine tubes, with appropriately-tuned diameters, with an appropriate number of such tubes, to accommodate said matching. The tubes can also be adjusted, to generate propulsive pulses shorter than this cycle time, in order to take advantage of both the high and low pressure cycle resulting from the drag-reducing tube dynamics. Full matching of the energy deposition and propulsive cycles may also be foregone, if the timing requirements become overly constrained. An additional variable to help achieve the best possible matching, with or without matching the duration of the propulsive pulse with the base-pressure cycle of the energy deposition, is the degree to which air is modulated into the potential array of inlets, potentially driving the potential array of engine tubes. In order to better match the dynamics, there is also flexibility to either have each of the potential multitude of engine tubes discharge in its own separate exhaust plane, or have the engine tubes discharge into one or more common exhaust planes. At the other end of potential cycle times, longer cycle times can result when flying at lower speeds (for example Mach 0.8 to Mach 6) and using longer tubes of deposited energy (for example, ranging from 1-10 m), yielding a range of drag-reduction and base-pressure cycle times (to be matched to the propulsive cyle time) of ~40 ms to 0.5 ms). This range of longer cycle times can be matched using a smaller number of engine tubes, including a single engine tube, with the details depending critically on the design and operating conditions of the vehicle and engine (tubes(s)).

Similar to using electric discharges along a closed path, guided and initiated by ionizing laser pulses (such as laser filaments), energy can also be deposited further ahead of the vehicle, using more remote deposition techniques, such as depositing microwave energy, whose deposition is seeded/facilitated by creating an ionized region in front of the vehicle, again, potentially using a laser plasma. This microwave energy can also be preferentially guided upstream using laser plasmas, such as laser filaments. High microwave energies, resulting from sufficiently short microwave pulses can also be used with or without seeding to increase the coupling of the microwave energy into the air, Three benefits of depositing energy further upstream, among others, are that: i) no return path is required, simplifying and reducing the energy investment of any guiding/seeding path or region; ii) the energized volume has more time to expand, which is beneficial when flying at very high Mach numbers (e.g. Mach 9-25), although the laser-guided electric discharges still display tremendous benefits at these speeds; iii) for ionizing shockwaves, typically occurring above Mach 12 or 13, the more distantly focused microwave and/or laser energy can penetrate the ionized shockwave, mitigating any complications that may arise from an electric discharge interacting with the ionized shock wave. Accounting for this consideration when using an electric discharge requires that the laser-path is more favorable than other potential paths containing various levels of ionization at the ionizing Mach numbers.

In addition to depositing energy in the air ahead of the vehicle, to modulate the air encountered by the vehicle (and ingested into the inlet(s) for air-breathing applications), it is also possible to employ surface discharges in phasing/synchronizing energy-deposition, both internally and externally, to control internal and external flows to enhance the propulsive effectiveness, performance, control, and/or overall efficiency of the vehicle.

Similar to the high-speed air vehicle/projectile application disclosed above, energy can be deposited ahead of a high-speed ground vehicle, and phased/synchronized/timed with various other operational processes, in order to optimize certain benefits. In the case of an electrically-powered high-speed train, the bulk of the infrastructure is already present to deposit energy. Electrical pulses are already directed to the track, in order to levitate, propel, monitor, and/or control the ground vehicle. This existing infrastructure greatly facilitates the use of grid power to provide the energy that must be deposited to create a low-density region ahead of the vehicle, to dramatically reduce drag, and facilitate much higher-speed operation. In certain embodiments, no laser pulses will be required, since a track already exists to guide the vehicle, defining the vehicle's path. Energy can be deposited ahead of the vehicle, along the vehicle's path, using high-energy electric discharges, and opening a low-density region or tube that precisely follows the track. The size of the low-density tube can be controlled, in order to generate the desired level of drag reduction, while also facilitating the aerodynamic stability of the ground vehicle. As when depositing energy ahead of a flight vehicle, the diameter of the tube will be determined by the energy deposited per length, as well as by the ambient atmospheric pressure. In the case of depositing energy along the ground or along a track, instead of the low density tube's ideal shape being a cylinder centered around the line of deposited energy (as when depositing energy along a line in the open air), the tube shape when depositing energy along a line on an ideal flat surface will be a half-cylinder.

If the half-cylinder were replicated like a reflection across the ideal flat surface, it would appear to be a full cylinder, identical to the case of deposition in the open air. Because only half of a cylinder is rarefied, only half of the energy to achieve the full cylinder in open air is required to open a half-cylinder along the ground (along the track) of the same diameter. In actuality, the geometrical deviations of the track from being a perfectly flat surface and the interactions, between the shock wave generated by the deposited energy and the ground and true geometry of the track, will result in deviations from ideality. However, the low-density volume opened up ahead of the vehicle will be roughly the same as the volume of the ideal half-cylinder on an ideal flat surface, and its actual shape can be adjusted/controlled by shaping the track. In fact, the level of insensitivity to the deposition details allows for a number of favorable features to be incorporated in the process. One of these features is the ability to deposit the energy in the electric discharge (to create the low-density tube) in the form of multiple sub-pulses, instead of one larger single pulse. This can reduce the size/capacity of many of the circuit elements and conductors and allow for better leveraging of existing circuitry, for example when there are multiple propulsion and levitation magnets engaged at a given point in time or at a given point along the track, then the energy from these individual circuits can be redirected/recycled individually and fed forward to drive the electric discharge(s) along a segment of the track, achieving the same benefit that would be achieved if all of the energy were harvested and consolidated from the temporally proximately- or overlappingly-engaged propulsive and levitation circuits. Each of the driving circuits for these propulsive and levitation circuits can also be configured to independently drive the electric discharge circuit, again instead of first being consolidated. As disclosed in an earlier patent and incorporated by reference, the conductive paths along the track (along which the electric discharge is generated to deposit energy to displae the air) can be comprised of slightly better conductive paths than the less conductive medium in which they are embedded (such as concrete or other potential electrically poorly conductive track materials). The slightly preferentially electrically conductive paths can also be comprised of "dotted lines" of conductive material, such as pieces of electrode material embedded in the less conductive track material. Similar to the flexibility afforded by temporally breaking up the discharge into multiple separate discharges in time that will consolidate into a single low-density tube, the electric discharge can further be comprised of spatially different discharges, which can consolidate into one overarching low-density tube. This spatial separation may take place as examples, between different pieces of electrode material, with different segment of this "dotted line" being independently energized. The spatial separation may also take place in the form of electric discharges running roughly the same length, but following separate paths (one variation of this is depositing energy along multiple spatially distinct but parallel paths, from which low-density tubes expand and coalesce to form one larger overarching low-density tube. More realistically, such separate paths will likely be non-ideal and not necessarily perfectly parallel to one another, with slight diversions in their individual paths. This flexibility in spatial and temporal frequency can furthermore be combined by depositing the energy along different paths at different times, as long as they are sufficiently proximate in time and space to allow them to coalesce into an overarching low-density tube, In addition to accommodating a great deal of natural fluctuation, this flexibility reduces the tolerances and also allows existing circuitrty to be more completely exploited, without adding unnecessary circuitry to consolidate the energy from multiple power feeds (e.g. those feeding the multiple propulsive and/or levitator coils) or the recycling/recovery of energy from the multiple propulsive and/or levitator coils. Another feature is the ability to place a small canopy over the one or more preferentially conductive paths in the less conductive track material, affording protection for the path(s) and electric discharge(s) from debris, weather, and environmental insults, such as bird droppings, among many others. To protet against water-accumulation from rain, gutters can also be installed with no deleterious effect on the opening of the tube, and a canopy can be installed above the entire track as further environmental protection, possibly with multiple layers, perforated in a way to minimize reflection, and screening or mesh can also be installed around the track, as desired to exclude wild-life, as desired. An additional operational feature may be to have the passage of the vehicle clean the track, for example dragging a light brush at the very back of the vehicle. The electric discharges themselves will also help clear away any potential contamination.

For propulsion, the electrically propelled high-speed ground vehicle designs (for example magnetically levitated vehicles) can use a linear synchronous motor, with power supplied to windings on the guideway(i.e. on the "active guideway"). After an electromagnet has been energized for both propulsive and levitation purposes, the inductive energy stored in the loop/circuit must be dissipated. A great deal of effort is typically spent to minimize arcs resulting from dissipation of this energy, due to the generation of a large voltage after the train passes, with the natural tendency being for this large voltage to generate a strong arc which has historically been seen as a problem to mitigate. In contrast, this energy can be productively employed by depositing it ahead of the vehicle to remove the air from in front of the vehicle, instead of being dissipated in circuit elements intended to dissipate this energy over longer time scales. Furthermore, since at high speed, the propulsive energy required to propel the vehicle is on the same order or greater than the energy required to push the gas out from the path of the vehicle, the power and energy being delivered to inductive propulsion elements is already appropriately sized to deliver the pulsed electrical energy needed to reduce the vehicle drag (this available power, energy, and circuitry from the propulsive elements is augmented by those from any levitation elements). To convert the inductively stored electrical energy to an electrical discharge suitable for drag-reduction and stability-enhancement will require certain circuitry unique to the overall vehicle and power-delivery/-conversion design, and this circuitry can be either installed at every inductive magnet along the track, or it can be included on the actual vehicle, thereby saving cost. A hybrid approach may also be employed, in which part of this electric-discharge circuitry is distributed along the track, and some portion of the electric discharge circuitry is included in the vehicle, ensuring that the discharges only occur ahead of the vehicle, during normal operation. This can serve as a beneficial and natural safety feature. In terms of energy, for lower speeds, for example 100 m/s-280 m/s, energy pulses can be deposited ahead of the vehicle in the form of electric discharges to allow greater speed and stability, of magnitude roughly 50% to 300% of the propulsive pulses used to move the vehicle forward against frictional and resistive forces. At higher speeds, for example 250 m/s-600 m/s, energy pulses can be deposited ahead of the vehicle in the form of electric discharges to allow greater speed and stability, of magnitude roughly 20% to 200% of the propulsive pulses used to move the vehicle forward against frictional and resistive forces. At yet higher speeds, for example 450 m/s-1200 m/s, energy pulses can be deposited ahead of the vehicle in the form of electric discharges to allow greater speed and stability, of magnitude roughly 15% to 150% of the propulsive pulses used to move the vehicle forward against frictional and resistive forces. In one embodiment, the hardware along a track is anticipated to be standardized and capable of generating the same maximum energy propulsive (and levitating, as appropriate) pulses, and electric discharge energies ahead of the vehicle between the propulsion magnets. Given this ample availability of power, there will always be sufficient electrical power to deposit energy in the form of electric discharges ahead of the vehicle that will afford greater speed and stability. Using this flexibility, the energy of these electic discharge pulses can be adjusted to optimize the efficiency of the vehicle, and/or facilitate higher speeds otherwise not possible, and/or increase the vehicle stability. These energies and energy ratios will be adjusted based on the vehicle and circuit configurations, as well as its operating conditions.

The high-speed trains do not need to be electrically propelled or magnetically levitated in order to benefit from depositing energy ahead of them to reduce drag and improve their stability and guidance, and any high-speed ground vehicle can benefit from these dynamics. The electrically-propelled vehicles lend themselves particularly well to incorporating this technology, including the magnetically levitated ones. Regardless of the propulsion or suspension approach, since the aerodynamic forces serve to center the vehicle in the low-density tube created along the track, this technology serves to increase the vehicle's stability, control, and simplicity, as well as the speed at which it can travel when the track deviates from a straight path.

When weaving fabric in a loom, it is necessary for the weft thread (or filling or yarn) to be propelled by some method through the warp, in order to form the weave. A number of methods are used to propel/insert the weft, including but not limited to a shuttle, a rapier (single rigid, double rigid, double flexible, and double telescoping), a projectile, an air jet, and a water jet. In addition to the more traditional single weft insertion (or single pick insertion), multi-phase weft insertion (or pick insertion) is also employed. For all of these applications, one of the limiting factors of loom performance is the speed at which the weft can traverse the warp. This speed tends to be limited by a number of factors, including but not limited to the drag force and the turbulence/stability experienced during the traverse process. These limitations can be strongly mitigated by synchronizing (or phasing or timing) energy deposition ahead of any of the moving objects listed above (shuttle, rapier, projectile, air jet, water jet) to reduce the drag force, increase stability, and increase the speed at which the weft/pick can traverse the warp. In particular, this energy-deposition can be in the form to yield a low density tube or series of low-density tubes to hasten and guide the weft across the warp. This increased speed and stability can facilitate faster throughput for any of the single or multi-phase weft/pick insertion approaches. In addition to increasing the loom productivity by increasing throughput in terms of speed, the enhanced stability that can be achieved when propagating through a low-density tube enables the weft to stably travel much longer distances (which allows a loom to produce a final product of greater width). In addition to the cost savings in building a longer loom (that produces a greater width of finished weave), an additional benefit of the weft traveling a longer distance is that the acceleration and deceleration time and energy is better leveraged, in that more weft is laid down for each initial acceleration and final deceleration event. Either of these improvements (greater speed or greater width) will increase the productivity of the loom, and their combination can yield yet larger productivity increases, in terms of greater fabric area being produced in a shorter amount of time. As a result, phasing/synchronizing/timing energy deposition ahead of any of the methods used to propagate the weft across the warp can increase loom output and cost-effectiveness.

When using a physical object, such as a rapier, shuttle, or projectile, the dynamics of energy deposition are very similar to the dynamics described for reducing drag on an air vehicle or ground vehicle, in that lines of energy are deposited ahead of the object, minimizing its drag and increasing its stability. These same concepts hold when an air jet or water jet is employed, and these are described in greater detail here. Air- and water-jets are typically used when high throughput is desired, because there is no added inertia beyond that of the thread/filling/yarn itself. The added inertia of a shuttle, rapier, or projectile, increases the time required to accelerate and decelerate the weft and leads to additional unwanted stresses on the thread/filler/yarn itself. In the case of an air jet, profiled reeds can be used to provide a path for the propagation of the weft. An initial burst of air launches the weft, which rapidly slows due to drag, and whose speed is limited, due to the instability it suffers due to turbulence and drag forces at higher speeds. (In the case of a water-jet loom the weft is propelled via a water jet instead of an air jet, and the same considerations hold for water-jet looms that we discuss for air-jet looms.) Booster jets are used to re-accelerate the weft, after it has slowed down between the booster jets, always remaining below the maximum speed the weft can maintain in its standard atmosphere. One approach to mitigate the problems due to air resistance is to propagate the weft through a vacuum, low-pressure, and/or high-temperature environment. This technology has been developed for a number of industries (e.g. coating of mylar films for the packaging industry, among many others). Instead of operating in a vacuum, low-pressure, and/or high-temperature environment, an added benefit of using energy deposition is the tremendous stability gained by the weft and its propelling jet when propagating through the low-density tubes, enhanced by the ability to excellently match the tube length- and time-scales with those of the weft and its propagation. Because the warp must be free to articulate back and forth, it is not possible to install a physical evacuated tube, down which we can propel the weft with compressed air booster jets. Depositing energy, in order to temporarily create low-density tubes in the air, which can guide the weft and allow it to be more easily propelled by the compressed gas boosters, provides the benefit of a rigid, evacuated, guide tube, without introducing a physical obstruction to block the warp motion. Much of the current designs can remain the same when implementing our energy-deposition approach. The boosters will still propel the weft, and their support structures (for example, profiled reeds) can also serve as the support structure for the energy-deposition, which will consist of either optics or high-voltage electrodes or some combination of both, each of which, including their combination, are much simpler than the current high-pressure boosters. If only laser energy is used to deposit the energy, then only optical elements will need to be positioned on the booster support structures. If only electric discharge energy is used, then only high voltage electrodes will need to be positioned on the booster support structures. If both types of energy are used, then both optical elements and high voltage electrodes will need to be installed on the booster support structures. The fact that there is much less wear and fraying of the weft due to turbulence and drag , and the fact that the weft is much better supported, with much less drag, when propagating through the low-density tube, will both allow the weft to be propagated over much longer distances.

In one embodiment, matching the low-density tube diameter with a thread of 0.6 mm diameter calls for depositing roughly 6 mJ of energy for every 10 cm length. Instead of the typical peak weft speeds ranging from 1200 meters/minute (~20 m/s) to 4800 m/min (~80 m/s), if the speed of the weft traveling through the low density tubes is significantly higher at 300 m/s, it is traveling 4 to 12 times faster than in the unmitigated case. At this speed, the weft is traveling 4 to 15 times faster than it does without energy deposition. Also, if the loom can now be made 3 times longer (wider), due to the added stability of the weft trajectory and increased speed, 3 times more fabric is being generated with each pass of the weft, As a result, if the speed and width are both increased according to this example, the total loom output will be increased by a factor ranging between 12 to 45 times over the output of a loom that is not improved through the use of energy deposition to facilitate weft travel. If a range of extended/improved/enhanced loom widths is considered from 2 to 4 times longer, then the improvement in loom output by depositing energy ahead of the weft is extends from 8 times to 60 times. For larger weft diameters, larger diameter low-density tubes will be created to facilitate their propagation. Since the required energy scales with the volume of the low-density tube it opens up, the energy per unit length scales as the square of the tube diameter, which will therefore scale roughly with the square of the weft diameter, since we will tend to open tubes of slightly larger diameter than the weft diameter, in order to minimize wear on the weft/fiber/material.

To provide additional confinement for ionic solution in the water-jet application or for electrically-conductive fibers in either the air-jet or water-jet application, a strong magnetic field can be aligned with the desired propagation direction of the high-speed thread, in order to more accurately constrain the path of said conductive solution and/or thread.

Depositing Energy in the barrel of a gun, firearm, or breather, among other types of barrels used to propel a projectile, in order to force air out of the barrel. The decreased drag on the projectile will enable a greater muzzle speed with the same amount of driving energy (e.g. the propellant in a conventional gun or the electrical driving energy in a rail gun). The reduced drag will also allow attainment of speeds, comparable to the speeds attained without modification, by using less driving energy. In a conventional gun, this means that the same performance can be achieved with less propellant, The lower propellant requirement then leads to a reduced muzzle blast when the projectile exits the barrel. This reduced acoustic signature is useful to minimize deleterious effects on the hearing of nearby individuals, including the operator(s). This reduced acoustic signature can also mitigate detection by acoustic means (similar to an acoustic suppressor).

The energy deposition to force air out of the barrel can be applied in any form. Two such forms are: i) deposition of electromagnetic energy in the interior of the barrel; or ii) it can be chemical in nature; as well as some combination of these two energy deposition approaches. The electromagnetic energy can be in the form of an electric discharge in the interior of the gun barrel. One embodiment, in which this can be accomplished, is to ensure the separation of two electrodes that can be discharged across a non-conductive gap, or one charged electrode discharging to the conductive barrel or other portion of the structure housing the barrel. The chemical energy can be in the form of additional propellant which expands in front of the projectile when ignited, to drive the gas from the barrel (as opposed to the traditional role of the propellant, which expands behind the projectile to propel it out of the barrel). This additional propellant can be incorporated on the round itself, and one embodiment is to incorporate a conductive path in the round, which conducts an electrical ignition pulse to ignite the propellant at the tip of the round. This path can be a closed circuit, fully-contained in the round. It can also incorporate conductive support structure and/or barrel to close its circuit. One embodiment among many for igniting the barrel-clearing propellant is to incorporate a piezo-electric structure into the round, such that it generates a high voltage when the round is struck by its usual firing mechanism. This high voltage can then ignite the barrel-clearing propellant at the tip of the round, in order to clear the barrel of air, to facilitate better acceleration of the round's projectile or load, when propelled by the charge used to accelerate it.

In either case, the total energy deposited ahead of the round, either through an electric discharge, chemical propellant, or a combination of the two, should be such to significantly clear the barrel of air before a load or projectile is accelerated from the round. This energy should be sufficient to clear the volume of the barrel, and as such should be on the order of $3*p_o*V$, where V is the barrel volume, and $p_o$ is the ambient pressure. Assuming ambient pressure of a standard atmosphere, the energy needed to clear the barrel of a 16" 12-guage shotgun is roughly 12 J of energy. This is particularly helpful for breacher rounds, which benefit greatly from greater velocity of the breaching load and reduced propellant requirements to minimize the acoustic impact on personnel. This same calculation can be performed to substantially clear the air from any size barrel, simply calculating the energy requirements based on the volume. This energy requirement can be increased in order to counter any cooling that the heated gas may experience as it propagates along the barrel. In other words, larger amounts of energy may be deposited, including 2, 3, 4, 5, and even up to 10 times as much energy to accommodate different considerations while still achieving the desired clearing of the barrel.

The devices to achieve this can be built to achieve the above dynamics, including the barrels and/or support structures (e.g. fire arms, cannons, mortars, among others), as well as any round, including but not limited to small, medium, and large caliber rounds, including conventional and non-conventional rounds, such as breacher rounds.

In multi-phase flow applications, including but not limited to powder coating and supersonic spray deposition applications, phasing energy deposition with other processes including, but not limited to: bursts of powder; bursts of aerosolized spray; bursts of different gasses at different pressures; bursts of plasma; application of heating; application of electric discharge; application of laser pulses; among others can yield a number of benefits to said multi-phase flow applications when synchronizing energy deposition with such other processes, compared to the applications when not synchronizing energy deposition with such other processes. Among other forms of energy deposition, similar to the other applications disclosed here, an electric discharge can be used to deposit energy into the flow and open a low-density tube from the nozzle to the substrate, more effectively channeling the particles toward the substrate at higher speed. The electric discharge can be initiated/guided by a laser plasma, such as a laser filament. The particle stream can also help conduct the electric discharge, or a preferentially conductive path can be employed to guide the electric discharge along a line extending from the nozzle to the substrate. For applications at a small scale, small diameter low-density tubes (commensurate with small nozzle exits) can be opened using laser plasmas/filaments alone.

In particular, supersonic spray deposition of various materials can be enhanced by depositing energy in conjunction with application of other pulsed processes in order to achieve more effective impact speeds, and obtain improved effects, depending on the desired outcome, such as coating quality coating uniformity, surface abrasion, adhesion, crystalline properties, coating strength, corrosion resistance, among others. When depositing energy into the supersonic flow, we can also modulate the pressure and gas density to generate more effective plasmas for plasma deposition. It is also possible to modulate the flow temperature and density, allowing for much higher particle speeds because the pulsed conditions allow for these higher particle speeds to be subsonic in the much higher speed of sound environment we create. Depending on the geometry of the deposited energy, we can eliminate shockwaves that otherwise cause the particles to segregate within the flow, resulting in more uniform gas flow, particle distribution, and deposition. Elimination and mitigation of these shock waves also mitigate the deceleration the cause for the particles, thereby ensuring higher and more uniform impact speeds of the particles with the substrate surface. If it is desired to modulate the radial particle distribution within the jet, we can deposite energy down the center of the flow, in order to push particles out toward the edge of the flow. Alternatively, we can deposit energy at the edge of the flow stream to push particles toward the center of the flow stream. By pulsing the gas feed that drives the multi-phase material, such as powder, we can also synchronize the energy deposition with the pulsed particle flow. This allows us to create a low-density tube by depositing energy down the axis of the flow from the nozzle exit to the substrate. The higher speed of sound in this low-density tube enables the pulse of particles to subsonically propagate down the low-density tube, at speeds that would otherwise be supersonic, had we not deposited energy to create a low-density tube. In cases where the flow down the low-density tube is not fully subsonic, its Mach number is reduced, and the negative effects of supersonic flow (such as the impingement shock structures at the substrate) are minimized because of the reduced Mach number we achieve. In addition to modifying and syncrhonizing the particle density distribution with energy deposition, we an also coincide various forms of energy deposition to influence the interaction of the particles with the target surface. For example, synchronized with the modulated particle distribution and low-density tube formation, we can impinge one or more laser pulses onto the target surface, one or more electric discharges, modulated gas temperature, as well as plasma, among other modalities. In performing this deposition, many parameter ranges are feasible, with their effectiveness depending on the atmosphere, flow conditions, geometry, particles, feed rate, target material, and desired effects. As an example, we can apply electric discharges synchronized in such a fashion that the low-density tube they create is followed by a particle feed that populates the low-density tube to achieve much higher speeds. The particle feed is started when the discharge is initiated, (which can last some number of microseconds). The particle feed is released in a burst fashion to coincide with the establishment and exhaustion of the low-density tube. This timing and repetition rate is dictated by the flow conditions and geometry, and the discharge energy is dictated by the diameter of the spray nozzle and distance to the substrate. In particular, the discharge energy can be, as described earlier, on the order of three times the product of the pressure inside the flow and the volume V dictated by the cross-sectional area of the spray nozzle exit and the distance to the target surface (roughly $3*p_o*V$). The repetition rate is dictated by the flow velocity divided by the distance to the target surface and the period of flow-feed is pulsed to be less than or equal to the period during which the low-density tube can be populated and filled with multi-phase flow before being exhausted and building up stronger deleterious shock structures at the substrate surface. To remain less than the period during which the low-density tube can be filled with multi-phase flow before building up unfavorable shock structures, the multi-phase flow can be synchronized/injected over 20%-95% of the period of the low-density tube propagation. It can also be flowed for slightly longer than the period of the low-density tube propagation (e.g. from 95-160% of this period), to account for the time required to build up the unfavorable shock structures at the substrate surface. The remaining particle stream, as the shock structure begins to re-form within the jet, can also help conduct an electric discharge, as an energy-deposition source, to the substrate, as a ground. In principle, the energy deposition can also serve to modulate the particle flow, forcing it laterally away from the substrate into decelerating high-density gas when the jet stream density begins to rise, and after the energy deposition has created a low-density tube, the particles are preferentially entrained within it and guided to the substrate at high speed. In such a geometry we can ensure much greater impact speeds, with muh more uniform deposition, with the stream much better confined in the low-density tube created by the deposited line of energy. In addition to the particles that we stream down this low-density tube we can also initiate much more effective plasmas in the lower density, either using corona from a high voltage source we use for the energy deposition, or with an RF source. Similarly, a laser pulse or stream of high-repetition rate laser pulses can be synchronized with the particles impacting the target surface. These forms of additional energy injection to the process (e.g. plasmas and lasers, among others) can be applied for all or some portion of the duration of the particle's impact with the surface, possibly including this additional energy-injection before and/or after the particles' impact, in order to additionally process/affect either the surface before impact, and/or the particles after impact, and/or both, in particular as the coating builds up. This process during a single period of a low-density tube can be repeated, after the low-density tube and modulated/sychrnonized particle stream has been exhausted.

This synchronization is effective for a broad range of particle sizes and material densities, as well as broad ranges of flow conditions, resulting in more flexible, capable, and cost-effective high-speed spray processes, such as coating, cleaning, and peening, among other surface treatments. The particle density can range from 0.8 to 23 g/cc, the driving pressure can range from 1 to 60 atmospheres (bar), the unmitigated flow Mach number ranges from 1-12, with the particle velocity ranging from 150-3000 m/s and the ratio of particle velocity, depending on the conditions, can range from 0.1 to 1.0. Example particles, include but are not limited to abrasives, peening materials, dielectrics, and metals. As a specific example, using a powder densities, ranging from 2-10 g/cc, and flow Mach numbers from 2-5, with particle velocities ranging from 400-1200 m/s, a nozzle can have an exit area of A and be positioned a distance L from the substrate (such that the area of the jet column between the nozzle and substrate is roughly equal to the product of $A*L$). To open up a low-density tube within this column requires an amount of energy roughly equal to $3*A*L$ times the pressure within the column, which can be higher than atmospheric, depending on the conditions. To open a continuous stream of low-density tubes, end-to-end would call for application of this energy at a repetition rate of the gas flow speed divided by the distance L. A notional example may be a nozzle exit area of 50 square mm, with a distance L of 10 cm, and a notional pressure of ~2 bar, resulting in an energy requirement of roughly 1 J to open up the tube. For a distance L 1 cm, this energy would be reduced to 100 mJ, however the repetition rate would adjust to require the same power, since the repetition rate is inversely proportional to L. The useful repetition rate can fall in a range of 0.2-3 times the simply calculated end-to-end repetition rate of gas speed/L, more typically 0.8 to 1.6 times this simply calculated repetition rate. Similarly, the useful amounts of energies to deposit fall within a range of 0.2 to 3 times the simply calculated energy of $3*A*L$ times the pressure within the column (which is difficult to generalize since it varies within the column and this value is best to assess for each application, operational geometry, and set of conditions). The benefit returned on the added power investment is improved coatings and processing outcomes, as well as the ability to achieve outcomes that are otherwise not possible. Since the particle velocities can be increased and materials processes enhanced with the deposited energy, the total power requirements can be mitigated via the energy-deposition, with increasing efficiencies being returned at increasing driving pressures and gas flow speeds.

Depositing energy along a vehicle surface to open low-density (high-temperature) channels with high speed of sound has been disclosed in the past. In general, clearing the air out from under a vehicle will allow high-pressure blast gases to escape more quickly, thereby reducing the residence time of the high pressure gases under the vehicle, and thereby minimizing the force and impulse transferred to the vehicle by the high pressure gases. Similar considerations can be applied to any surface subject to a blast wave. In addition to this general concept and application, we are further disclosing the deposition of energy into the earth or other material beneath the vehicle, underneath which the blast is originally resident and confined. This energy deposition is used to disrupt the confining soil/material, allowing the blast products to vent more gradually and be more rapidly evacuated from under the vehicle through the low-density, high speed-of-sound region beneath the vehicle, also evacuated when the energy was deposited into the soil or other material confining the blast. Were the blast gases not released, they would very effectively transfer momentum to the cover material confining them, which would in turn very effectively transfer this momentum to the vehicle. When energy is deposited to puncture the cover material and relieve the pressure beneath said cover material, not only is the high pressure gas vented and quickly evacuated through the low-density, high speed-of-sound region beneath the vehicle (resulting from the energy deposition in the soil also generating a blast wave through the air that effectively clears the gas out from underneath the vehicle), but the soil or cover material which would otherwise have been more uniformly accelerated into the vehicle is now distributed in more of a column surrounding the puncture, and this column of material impacts the vehicle more gradually than the impact in the unmitigated case. As a result, in both the cases of depositing energy beneath the vehicle to clear out the gas from under the vehicle (typically using an electric discharge to impulsively/suddenly heat the gas to generate a blast wave that drives the ambient air out from under the vehicle) and depositing energy into the soil or cover material, confining a buried explosion/blast beneath the vehicle, in order to disrupt said soil or cover material and release the blast gases (typically using an electric discharge, laser pulse, or combination of the two to deposit the energy into the soil or cover material), the total momentum transferred to the vehicle from the blast can be reduced by at least 30% and the average acceleration experienced by the vehicle and its contents is can be reduced by at least 70%. In order to clear out or rarefy the gas from underneath the vehicle, an energy of roughly $3*p_o*V$ can be used, where $p_o$ is the ambient atmospheric pressure underneath the vehicle, and V is the volume under the vehicle to be cleared/rarefied. The amount of energy required to breach or puncture the soil or other cover material depends on the cover material and how much of it must be breached. As a result, it is best to simply deposit an amount of energy that can be effectively carried and deployed, and is neither too strong nor too weak for the vehicle. All of these considerations depend on the vehicle itself and how it is configured. This number can, in general, be on the order of 10 kJ to 1 MJ. Assuming on the large end of this scale, an undercarriage area of ~8 m² with a vehicle clearance of ~20 cm, the energy required to clear out the air is ~0.5 MJ, leaving an additional 0.5 MJ to puncture/breach the soil/cover-material. Given that the energy content of most explosive devices can be hundreds of MJ, the investment of 1 MJ or less, in order to strongly reduce the resulting vehicle acceleration and eliminate over 30%) of the total momentum on the vehicle, in an example of a 300 MJ blast, an investment of <1 MJ in deposited energy can reduce the blast load on the vehicle by roughly 100 MJ.

FIG. 37 is a schematic depicting an embodiment of an air jet loom 1000 equipped with a directed energy deposition device 1016. Directed energy deposition device 1016 comprises a pulse laser subassembly 1014 configured to generate a straight path extending from weft yarn delivery nozzle 1004 to opposing electrode 1018 and passing through a portion of the span defined by warp threads 1010A-B (forward and aft positions) and the profiles of profile reeds 1008A-B attached to sley 1012. In operation, at a predetermined time directed energy deposition device 1016 deposits electricity along the straight path to create low density guide path A. Nozzle 1004 in communication with a high pressure air supply 1006 then propels a portion of weft yarn 1002 through low density guide path A.

FIG. 38 is a schematic depicting an embodiment of a firearm subassembly 2000 having an integral directed energy deposition device 2002. In operation, the directed energy deposition device 2002 may be utilized to clear fluid from the bore of the barrel 2004, creating a low density region A. While the low density region A persists, projectile 2006 may be discharged through the barrel by ignition of propellant 2008. The energy deposition device 2002 may comprise, for example, a power supply coupled to insulated electrodes exposed to the bore region of the barrel. In such an approach, energy deposition may comprise electrical arcing. In other bore-clearing approaches, the bore gases may be heated and thereby discharged by igniting a chemical pre-propellant prior to ignition of propellant 2008.

FIG. 41 is a schematic depicting an embodiment of a vehicle 3000 equipped with a blast mitigation device. The blast mitigation device includes sensors 3002A-B and directed energy deposition device 3008 positioned about the vehicle body 3004 and exposed to the vehicles undercarriage 3006. When sensors 3002A-B are triggered, energy deposition device 3008 deposits energy into the space between undercarriage 3006 and the ground along path A, creating a low density region B.

FIG. 42 is a schematic depicting an embodiment of a vehicle 4000 equipped with a ground modification device. The ground modification device includes sensors 4002A-B and directed energy deposition device 4008 positioned about the vehicle body 4004 and exposed to the vehicle's undercarriage 4006. When sensors 4002A-B are triggered, energy deposition device 4008 deposits energy into the ground along path A, resulting in penetration of at least the surface and resulting in breaking or separation (for example a hole) B in the surface material.

FIG. 43 is a schematic depicting an embodiment of a directed energy deposition device 5000 having a pulse laser subassembly 5002. The pulse laser subassembly 5002 comprises pulse laser 5004 aligned with splitter 5006, that is, in turn, aligned with reflector 5008. In operation, pulse laser 5004 may produce laser beam A which may be split into two beams and the two beams delivered to a fluid outside the directed energy deposition device 5000.

FIG. 44 is a schematic depicting an embodiment of a firearm cartridge 6000 having a directed energy deposition device 6002 integrated therein. The cartridge 6000 further comprises synchronizing controller 6004 configured to synchronize operation of directed energy deposition device 6002 with ignition of propellant 6006. Synchronizing controller 6004 may be configured to first trigger operation of directed energy deposition device 6002 followed by ignition of propellant 6006 and discharge of projectile 6008.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. A method of operating an intermittent air jet weaving machine in a medium to form a textile, said air jet weaving machine having a weft yarn and a span, comprising:
   i) reducing a density of a portion of the medium to form a low density guide path that passes through the span, comprising: depositing electromagnetic energy into the medium; and
   ii) passing the weft yarn through the low density guide path.

2. The method of claim 1, wherein depositing energy comprises depositing in the range of 5-50 mJ per 10 cm of guide path per 1 mm diameter of weft yarn.

3. The method of claim 1, wherein the weft yarn has a diameter of in the range of 0.1-1 mm.

4. The method of claim 1, wherein the weft yarn travels through the guide path at a speed in the range of 100-500 m/s.

5. The method of claim 1, wherein the textile is formed red at a rate in the range of between 500-60,000 picks per minute.

6. The method of claim 1, wherein the guide path is cylindrical.

7. The method of claim 1, further comprising: propelling the weft yarn into the low density guide path with a burst of high pressure air.

8. The method of claim 7, wherein the burst of high pressure air is synchronized with the energy deposition.

9. The method of claim 7, wherein the low density guide path is formed downstream of the burst of high pressure air.

10. The method of claim 1, wherein further energy is deposited downstream of a booster air supply to form a further low density guide path.

11. The method of claim 1, wherein the weft yarn is moistened with a quantity of water.

12. The method of claim 11, wherein at least a portion of the quantity of water is vaporized in the low density guide path.

13. An intermittent air jet weaving machine configured to form a textile, comprising:
   i) a machine comprising a plurality of profile reeds mounted on a sley, said machine configured to form a warp shed;
   ii) a directed electromagnetic energy deposition assembly, said assembly configured to generate a low density guide path across the warp shed; and
   iii) a weft yarn nozzle in communication with a pressurized air supply, said weft yarn nozzle configured to propel a portion of a weft yearn through the low density guide path.

14. The machine of claim 13, wherein the warp shed is in the range of 3-30 m in length.

15. A method of retrofitting an air loom, comprising: installing a directed energy deposition sub-assembly, said sub-assembly configured to deposit electrical energy on a path connecting a yarn dispensing nozzle of the loom with an electrode positioned on the opposite side of the loom and passing through profiles of a plurality of profile reeds.

16. The method of claim 1, wherein the electromagnetic energy comprises electrical energy.

17. The method of claim 1, wherein the electromagnetic energy comprises at least one laser beam.

18. The method of claim 1, wherein the electromagnetic energy is pulsed into the medium.

19. The method of claim 18, further comprising: synchronizing the timing of the pulses of the electromagnetic energy with the operation of the jet weaving machine.

20. The method of claim 1, further comprising: wherein the deposited electromagnetic energy generates a shock wave in the medium.

\* \* \* \* \*